(12) United States Patent
Ishikawa et al.

(10) Patent No.: US 8,897,509 B2
(45) Date of Patent: Nov. 25, 2014

(54) INFORMATION PROCESSING APPARATUS, METHOD, AND PROGRAM

(75) Inventors: Takamitsu Ishikawa, Kyoto (JP); Ryosuke Kono, Kyoto (JP); Tatsuya Adachi, Kyoto (JP)

(73) Assignee: OMRON Corporation, Kyoto-Shi (JP)

( * ) Notice: Subject to any disclaimer, the term of this patent is extended or adjusted under 35 U.S.C. 154(b) by 113 days.

(21) Appl. No.: 13/818,022

(22) PCT Filed: Mar. 23, 2011

(86) PCT No.: PCT/JP2011/056981
§ 371 (c)(1),
(2), (4) Date: May 31, 2013

(87) PCT Pub. No.: WO2012/042940
PCT Pub. Date: Apr. 5, 2012

(65) Prior Publication Data
US 2013/0236071 A1   Sep. 12, 2013

(30) Foreign Application Priority Data

Sep. 29, 2010 (JP) ................... 2010-218285
Feb. 18, 2011 (JP) ................... 2011-033854

(51) Int. Cl.
*G06K 9/00* (2006.01)
*G06Q 30/02* (2012.01)

(52) U.S. Cl.
CPC ................. *G06Q 30/0201* (2013.01)
USPC ........................................... 382/118

(58) Field of Classification Search
None
See application file for complete search history.

(56) References Cited

FOREIGN PATENT DOCUMENTS

| JP | 11-076577 A | 3/1999 |
|----|-------------|--------|
| JP | 2000-200357 A | 7/2000 |
| JP | 2007-094592 A | 4/2007 |
| JP | 2007-202993 A | 8/2007 |
| JP | 2007-252478 A | 10/2007 |
| JP | 2008-005986 A | 1/2008 |
| JP | 2008-287658 A | 11/2008 |
| JP | 2010-055594 A | 3/2010 |
| JP | 2010-113691 A | 5/2010 |

OTHER PUBLICATIONS

International Search Report mailed May 24, 2011 for Application No. PCT/JP2011/056981 (4 Pages).
International Search Report mailed May 24, 2011 for Application No. PCT/JP2011/057145 (4 Pages).

*Primary Examiner* — Stephen R Koziol
*Assistant Examiner* — Amandeep Saini
(74) *Attorney, Agent, or Firm* — Nutter McClennen & Fish LLP; John J. Penny, Jr.; Michael P. Visconti, III

(57) ABSTRACT

A mobile ratio of a customer is obtained to support a marketing strategy related to attracting customers. A population extraction unit extracts the number of persons, in which a game of one of the models of amusement machines installed in past times is recorded, as the number of persons of a population from pieces of information included in a biological information database. A mobile ratio calculation result output unit calculates a ratio of the number of persons, who use a model except the models of the amusement machines in which the population is obtained in the currently-installed amusement machines in the pieces of information included in the biological information database, to the population as the mobile ratio. The present invention can be applied to an apparatus that analyzes a trend of customers.

6 Claims, 43 Drawing Sheets

Fig. 13

| Amusement machine identification number | | Model name | Specification | Manufacturer |
|---|---|---|---|---|
| Installation period | Amusement machine number | | | |
| 20100310 20100410 | 0001 | A | M | X X X |
| 20100310 20100410 | 0002 | A | M | X X X |
| 20100310 20100410 | 0003 | B | M | X X X |
| 20100310 20100410 | 0004 | B | M | X X X |

⋮   ⋮   ⋮   ⋮   ⋮

| 20100510 00000000 | 0001 | A A | H | Y Y Y |
|---|---|---|---|---|
| 20100510 00000000 | 0002 | A A | H | Y Y Y |

| Product identification number || Trade name | Category | Manufacturer |
|---|---|---|---|---|
| Sales period | Product number | | | |
| 20100310 20100410 | 0001 | C | food | Q |
| 20100310 20100410 | 0002 | C | food | Q |
| 20100310 20100410 | 0003 | D | food | Q |
| 20100310 20100410 | 0004 | D | food | Q |

⋮ ⋮ ⋮ ⋮ ⋮

| | | | | |
|---|---|---|---|---|
| 20100510 00000000 | 0001 | C C | drink | R |
| 20100510 00000000 | 0002 | D D | drink | R |

| Attraction identification number | | Attraction name | Category | Manufacturer |
|---|---|---|---|---|
| Installation period | Attraction number | | | |
| 20100310 20100410 | 0001 | P | Z | X X X |
| 20100310 20100410 | 0002 | P | Z | X X X |
| 20100310 20100410 | 0003 | Q | Z | X X X |
| 20100310 20100410 | 0004 | Q | Z | X X X |

⋮ ⋮ ⋮ ⋮ ⋮

| 20100510 00000000 | 0001 | Q Q | H | Y Y Y |
| 20100510 00000000 | 0002 | Q Q | H | Y Y Y |

| Store identification number | | Store name | Category | Floor |
|---|---|---|---|---|
| Installation period | Store number | | | |
| 20100310 20100410 | 0001 | S | C L | 1 |
| 20100310 20100410 | 0002 | S | C L | 1 |
| 20100310 20100410 | 0003 | T | C L | 3 |
| 20100310 20100410 | 0004 | T | C L | 3 |

⋮  ⋮  ⋮  ⋮  ⋮

| 20100510 00000000 | 0001 | U | food | 9 |
|---|---|---|---|---|
| 20100510 00000000 | 0002 | U | food | 9 |

⋮  ⋮  ⋮  ⋮  ⋮

INFORMATION PROCESSING APPARATUS, METHOD, AND PROGRAM

TECHNICAL FIELD

The present invention relates to information processing apparatus, method, and program, particularly to information processing apparatus, method, and program, which can understand a trend of a customer to support a marketing strategy.

BACKGROUND ART

In an amusement industry, how many persons play games and how many persons visit stores are very important in terms of securing a sale. The same holds true for a pachinko (Japanese pinball game) industry of mass entertainment.

From the viewpoint of visiting the stores, it is important how the visitors are interested in the stores. Therefore, a large part of the amusement industry makes all kinds of efforts so that a new attraction is introduced and so that an event is introduced.

The same holds true for the pachinko industry. For example, in order to attract customer's attention new type machines are introduced and a service event is held.

A technology of counting the number of customers who visit the store is proposed in order to correctly understand increase and decrease of the number of customers who actually visit the store due to the effort to attract the customers (for example, see Patent Document 1).

Patent Document 1: Japanese Unexamined Patent Publication No. 2008-287658

SUMMARY OF THE INVENTION

For example, due to the efforts, the effect for attracting customers can be indicated from advance sales performance of event tickets. However, it is difficult to understand how the visiting person migrates from a store. Unless the visiting person can be identified, it is difficult to understand the migration except in the case of the sales performance of tickets.

For example, assuming that a population is the number of visiting persons who play a model of a predetermined amusement machine, migration means how much ratio of the population plays other models.

In the amusement shop, the model attracting a small number of customers, which is considered not to be a trigger of a visit to the amusement shop, is regarded to be unpopular, and removed or replaced. However, actually, the model of the amusement machine is hardly removed or replaced even after the number of players who play the model becomes zero. Generally, a decreasing trend is predicted from a change of the number of customers, and the model of the amusement machine is removed or replaced based on the prediction result. Although generally the model of the amusement machine is removed or replaced based on the prediction result, it is difficult to predict the decreasing trend of the customer, hence, the model of the amusement machine cannot be removed or replaced based on the predicted decreasing trend.

For example, in the case that the players who play the model attracting the small number of customers are customers having a high frequency rate, the customers having the high frequency rate will move to other amusement shops when the model attracting the small number of customers is regarded to be unpopular and removed or replaced. In this case, result of replacing the model is backfired even if the model is replaced in order to attract customers.

Therefore, when mobility of the customer is obtained, a trend of the customer can be understood in association with the removal or the replacement of the model, and the model that should be removed or replaced can be correctly selected.

However, it is difficult to understand the mobility of the customer, and it is difficult to select the model of the amusement machine that should properly be removed or replaced. For example, assuming that a population is the number of visiting customers who played a model of a predetermined amusement machine installed previously, the mobility means how much ratio of the population plays currently-installed models.

In order to understand the migration and the mobility, it is conceivable that a membership card is issued, and that the membership card is inserted in a dedicated device in playing the game to obtain the migration and the mobility. However, although the membership card has been issued, the membership card is actually rarely used, and frequently an intention of a service provider that effectively provides the service does not reach the customer. Even though there is understanding of a trend as a whole, a proper measure to attract customers is hardly carried out according to the individual trend of the player, as such the customer does not understand which model is an event targeted model.

In view of the foregoing, the present invention is aimed at analyzing correctly the trend of the customer to support the marketing strategy related to attracting customers.

In accordance with one aspect of at least one embodiment of the present invention, an information processing apparatus includes: storage means for storing a face image as a face image of an accumulator in an accumulator database; obtaining means for obtaining a face image of a matching target person who uses or purchases one of plural articles together with identification information identifying the article that is used or purchased by the matching target person; matching means for performing matching by calculating a degree of similarity between the face image of the matching target person, which is obtained by the obtaining means, and the face image of the accumulator, which is stored in the storage means; similarity determination means for determining whether the face image of the matching target person is the face image of the accumulator by comparing the degree of similarity, which is of a matching result of the matching means, to a predetermined threshold; recording means for recording detection of the accumulator, which is of the matching target person, in the accumulator database together with the identification information while correlating the detection of the accumulator with the face image of the accumulator, when the similarity determination means determines that the face image of the matching target person is the face image of the accumulator; population extraction means for extracting the number of face images, each of which is recorded together with identification information identifying a predetermined article registered in past times, as the number of persons of a population from pieces of information included in the accumulator database; and mobile ratio calculation means for, assuming that the number of persons of a target group is the number of face images for each article recorded together with the pieces of identification information identifying the currently-registered articles in the pieces of information included in the accumulator database, calculating a ratio of the number of persons of the target group to the number of persons of the population as a mobile ratio of the person who uses or purchases the predetermined article with respect to the currently-registered article.

Preferably the information processing apparatus further includes: image capturing means for capturing an image; face image extraction means for extracting the face image of the matching target person from the image captured by the image capturing means; and feature quantity extraction means for extracting a feature quantity from the face image of the matching target person, wherein the matching means calculates the degree of similarity using feature quantities of the face image of the matching target person, which is obtained by the obtaining means, and the face image of a registrant, which is stored in the storage means, and matches the face image of the matching target person, which is obtained by the obtaining means, against the face image of the registrant, which is stored in the storage means.

In the information processing apparatus, preferably the article is an amusement machine, the obtaining means obtains the face image of the matching target person who plays one of the plural amusement machines together with identification information identifying the amusement machine that is used by the matching target person, the population extraction means extracts the number of persons, in whom use of an amusement machine registered in past times is recorded, as the number of persons of the population from the pieces of information included in the accumulator database, and the mobile ratio calculation means calculates, assuming that the number of persons of the target group is the number of face images for each article recorded together with the pieces of the identification information identifying the currently-registered articles in the pieces of information included in the accumulator database, the ratio of the number of persons of the target group to the number of persons of the population as the mobile ratio of the person who uses or purchases the predetermined article with respect to the currently-registered article.

Preferably the information processing apparatus further includes display means for displaying proper selection of the model of the replaced amusement machine when the model of the amusement machine replaced with the model of the amusement machine, which is registered in past times and in which the use of the number of persons obtained as the population is recorded, is included as the model of the amusement machine in which the mobile ratio is higher than a predetermined order, the display means displaying improper selection of the model of the replaced amusement machine when the model of the amusement machine replaced with the model of the amusement machine, which is registered in past times and in which the use of the number of persons obtained as the population is recorded, is not included as the model of the amusement machine in which the mobile ratio is higher than the predetermined order.

In accordance with another aspect of at least one embodiment of the present invention, an information processing method for an information processing apparatus including: storage means for storing a face image as a face image of an accumulator in an accumulator database; obtaining means for obtaining a face image of a matching target person who uses or purchases one of plural articles together with identification information identifying the article that is used or purchased by the matching target person; matching means for performing matching by calculating a degree of similarity between the face image of the matching target person, which is obtained by the obtaining means, and the face image of the accumulator, which is stored in the storage means; similarity determination means for determining whether the face image of the matching target person is the face image of the accumulator by comparing the degree of similarity, which is of a matching result of the matching means, to a predetermined threshold; recording means for recording detection of the accumulator, which is of the matching target person, in the accumulator database together with the identification information while correlating the detection of the accumulator with the face image of the accumulator, when the similarity determination means determines that the face image of the matching target person is the face image of the accumulator; population extraction means for extracting the number of face images, each of which is recorded together with identification information identifying a predetermined article registered in past times, as the number of persons of a population from pieces of information included in the accumulator database; and mobile ratio calculation means for, assuming that the number of persons of a target group is the number of face images for each article recorded together with the pieces of identification information identifying the currently-registered articles in the pieces of information included in the accumulator database, calculating a ratio of the number of persons of the target group to the number of persons of the population as a mobile ratio of the person who uses or purchases the predetermined article with respect to the currently-registered article, the information processing method includes: an obtaining step of obtaining, in the obtaining means, the face image of the matching target person who uses or purchases one of the plural articles together with the identification information identifying the article that is used or purchased by the matching target person; a matching step of performing, in the matching means, matching by calculating the degree of similarity between the face image of the matching target person, which is obtained in the obtaining step, and the face image of the accumulator, which is stored in the storage means; a similarity determination step of determining, in the similarity determination means, whether the face image of the matching target person is the face image of the accumulator by comparing the degree of similarity, which is of the matching result of the processing in the matching step, to the predetermined threshold; a recording step of recording, in the recording means, detection of the accumulator, which is of the matching target person, in the accumulator database together with the identification information while correlating the detection of the accumulator with the face image of the accumulator, when the determination that the face image of the matching target person is the face image of the accumulator is made through the processing in the similarity determination step; a population extraction step of extracting, in the population extraction means, the number of face images, each of which is recorded together with the identification information identifying the predetermined article registered in past times, as the number of persons of the population from the pieces of information included in the accumulator database; and a mobile ratio calculation step of, assuming that the number of persons of the target group is the number of face images for each article recorded together with the pieces of identification information identifying the currently-registered articles in the pieces of information included in the accumulator database, in the mobile ratio calculation means, calculating the ratio of the number of persons of the target group to the number of persons of the population as the mobile ratio of the person who uses or purchases the predetermined article with respect to the currently-registered article.

In accordance with still another aspect of at least one embodiment of the present invention, A program that causes a computer to perform processing, the computer controlling an information processing apparatus, the information processing apparatus including: storage means for storing a face image as a face image of an accumulator in an accumulator database; obtaining means for obtaining a face image of a matching target person who uses or purchases one of plural articles together with identification information identifying the article that is used or purchased by the matching target person; matching means for performing matching by calculating a degree of similarity between the face image of the matching target person, which is obtained by the obtaining means, and the face image of the accumulator, which is stored in the storage means; similarity determination means for determining whether the face image of the matching target person is the face image of the accumulator by comparing the degree of similarity, which is of a matching result of the matching means, to a predetermined threshold; recording means for recording detection of the accumulator, which is of the matching target person, in the accumulator database together with the identification information while correlating the detection of the accumulator with the face image of the accumulator, when the similarity determination means determines that the face image of the matching target person is the face image of the accumulator; population extraction means for extracting the number of face images, each of which is recorded together with identification information identifying a predetermined article registered in past times, as the number of persons of a population from pieces of information included in the accumulator database; and mobile ratio calculation means for, assuming that the number of persons of a target group is the number of face images for each article recorded together with the pieces of identification information identifying the currently-registered articles in the pieces of information included in the accumulator database, calculating a ratio of the number of persons of the target group to the number of persons of the population as a mobile ratio of the person who uses or purchases the predetermined article with respect to the currently-registered article, the processing includes: an obtaining step of obtaining, in the obtaining means, the face image of the matching target person who uses or purchases one of the plural articles together with the identification information identifying the article that is used or purchased by the matching target person; a matching step of performing, in the matching means, matching by calculating the degree of similarity between the face image of the matching target person, which is obtained in the obtaining step, and the face image of the accumulator, which is stored in the storage means; a similarity determination step of determining, in the similarity determination means, whether the face image of the matching target person is the face image of the accumulator by comparing the degree of similarity, which is of the matching result of the processing in the matching step, to the predetermined threshold; a recording step of recording, in the recording means, detection of the accumulator, which is of the matching target person, in the accumulator database together with the identification information while correlating the detection of the accumulator with the face image of the accumulator, when the determination that the face image of the matching target person is the face image of the accumulator is made through the processing in the similarity determination step; a population extraction step of extracting, in the population extraction means, the number of face images, each of which is recorded together with the identification information identifying the predetermined article registered in past times, as the number of persons of the population from the pieces of information included in the accumulator database; and a mobile ratio calculation step of, assuming that the number of persons of the target group is the number of face images for each article recorded together with the pieces of identification information identifying the currently-registered articles in the pieces of information included in the accumulator database, in the mobile ratio calculation means, calculating the ratio of the number of persons of the target group to the number of persons of the population as the mobile ratio of the person who uses or purchases the predetermined article with respect to the currently-registered article.

In accordance with one aspect of at least one embodiment of the present invention, the face image is stored as the face image of the accumulator in the accumulator database; the face image of the matching target person who uses or purchases one of the plural articles is obtained together with the identification information identifying the article that is used or purchased by the matching target person; the matching is performed by calculating the degree of similarity between the face image of the matching target person, which is obtained, and the face image of the accumulator, which is stored; whether the face image of the matching target person is the face image of the accumulator is determined by comparing the degree of similarity, which is of the matching result, to the predetermined threshold; the detection of the accumulator, which is of the matching target person, in the accumulator database is recorded together with the identification information while correlating the detection of the accumulator with the face image of the accumulator, when it is determined that the face image of the matching target person is the face image of the accumulator; the number of face images, each of which is recorded together with the identification information identifying the predetermined article registered in past times, is extracted as the number of persons of the population from the pieces of information included in the accumulator database; and, assuming that the number of persons of the target group is the number of face images for each article recorded together with the pieces of identification information identifying the currently-registered articles in the pieces of information included in the accumulator database, the ratio of the number of persons of the target group to the number of persons of the population is calculated as the mobile ratio of the person who uses or purchases the predetermined article with respect to the currently-registered article.

In the information processing apparatus in accordance with one aspect of at least one embodiment of the present invention, for example, the storage means for storing the face image as the face image of the accumulator in the accumulator database is a biological information database; the obtaining means for obtaining the face image of the matching target person who uses or purchases one of plural articles together with the identification information identifying the article that is used or purchased by the matching target person is a face image obtaining unit; the matching means for performing matching by calculating the degree of similarity between the face image of the matching target person, which is obtained by the obtaining means, and the face image of the accumulator, which is stored in the storage means is a matching unit; the similarity determination means for determining whether the face image of the matching target person is the face image of the accumulator by comparing the degree of similarity, which is of the matching result of the matching means, to the predetermined threshold is a similarity determination unit; the recording means for recording detection of the accumulator, which is of the matching target person, in the accumulator database together with the identification information while correlating the detection of the accumulator with the face image of the accumulator when the similarity determination means determines that the face image of the matching target person is the face image of the accumulator is a database management unit; the population extraction means for extracting the number of face images, each of which is recorded together with identification information identifying a predetermined article registered in past times, as the number of persons of a population from pieces of information included in the accumulator database is a population extraction unit; and the mobile ratio calculation means for, assuming that the number of persons of a target group is the number of face images for each article recorded together with the pieces of identification information identifying the currently-registered articles in the pieces of information included in the accumulator database, calculating a ratio of the number of persons of the target group to the number of persons of the population as a mobile ratio of the person who uses or purchases the predetermined article with respect to the currently-registered article is a mobile ratio calculator.

That is, in the case that the face image obtained by the face image obtaining means is recognized as the face image registered in the biological information database, the use of the amusement machine is recorded in the biological information database while correlated with the identification information identifying the amusement machine that is of the article in which the face image is obtained.

The population extraction unit extracts the number of accumulators who use the amusement machine having the predetermined identification information as the information on the population used to calculate the mobile ratio from the recording of the biological information database indicating the use of the amusement machine specified by the predetermined identification information. The mobile ratio calculator calculates the ratio of the number of persons who use other amusement machines to the number of persons, who are extracted as the population, as the mobile ratio.

Accordingly, the amusement machine having the high mobile ratio can be recognized as the amusement machine that the player who uses the amusement machine specified by the predetermined identification information and installed in past times moves to play, the trend of the kind of the amusement machine, with which the same person moves to play the game, is analyzed to select the amusement machine to be removed or replaced. Therefore, the proper amusement machine can be set as the marketing strategy in order to attract the specific players.

According to at least one embodiment of the present invention, the trend of the customer can be correctly understood to support the marketing strategy for attracting customers.

BRIEF DESCRIPTION OF THE DRAWINGS

FIG. 13 is a view illustrating a configuration of an amusement machine management database in FIG. 1.

FIG. 23 is a view illustrating a configuration of a product management database in FIG. 19.

FIG. 31 is a view illustrating a configuration of an attraction management database in FIG. 27.

FIG. 39 is a view illustrating a configuration of a store management database in FIG. 35.

PREFERRED EMBODIMENTS

Figure 1:
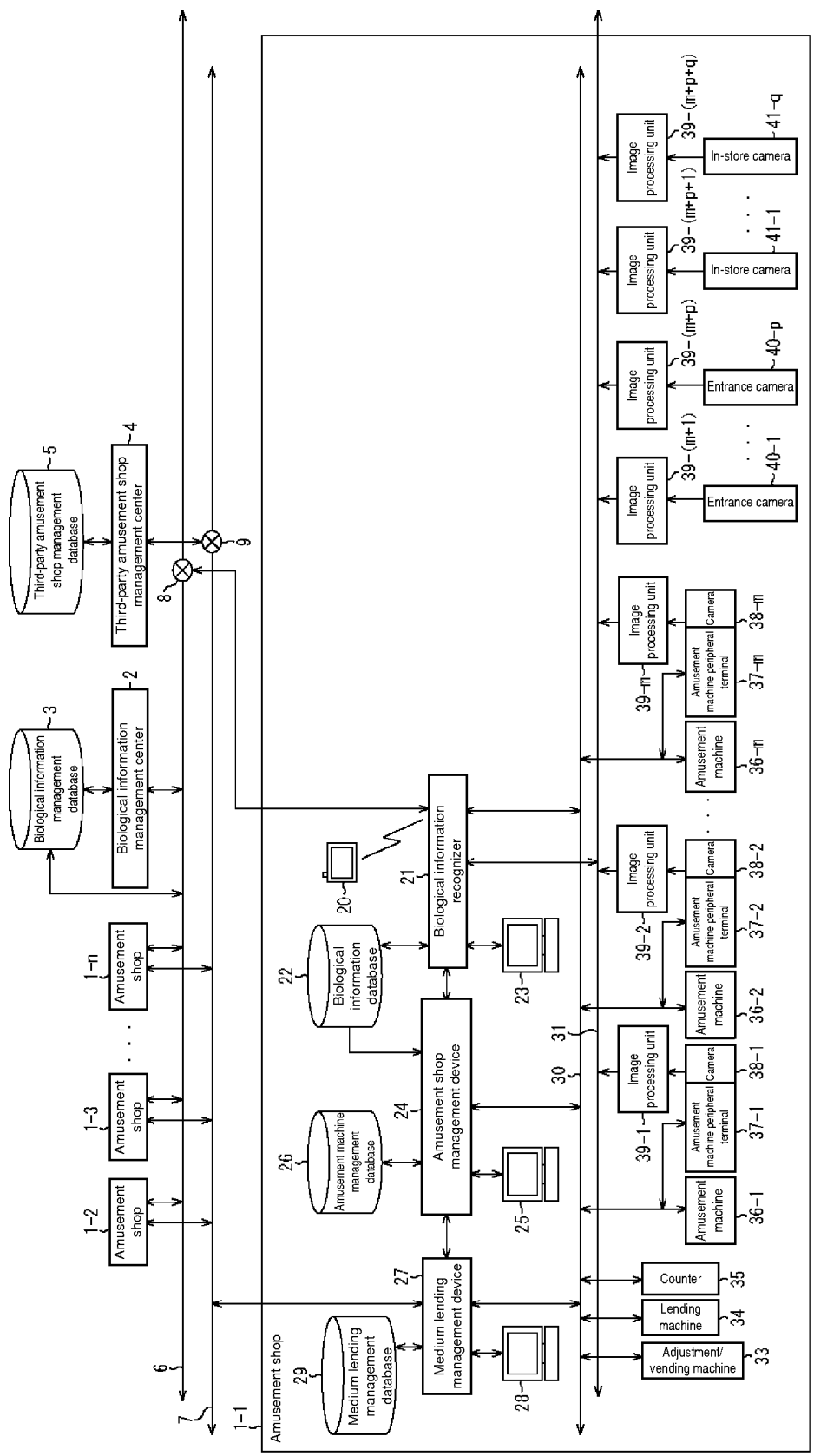
FIG. 1 is a view illustrating a configuration of an amusement shop sales support system according to an embodiment of the present invention.

Embodiments of the present invention are described below.

An information processing apparatus in accordance with one aspect of at least one embodiment of the present invention includes storage means (for example, a biological information database 22 in FIG. 10) for storing a face image as a face image of an accumulator in an accumulator database; obtaining means (for example, a face image obtaining unit 221 in FIG. 10) for obtaining a face image of a matching target person who uses or purchases one of plural articles together with identification information identifying the article that is used or purchased by the matching target person; matching means (for example, a matching unit 222 in FIG. 10) for performing matching by calculating a degree of similarity between the face image of the matching target person, which is obtained by the obtaining means, and the face image of the accumulator, which is stored in the storage means; similarity determination means (for example, a similarity determination unit 233 in FIG. 10) for determining whether the face image of the matching target person is the face image of the accumulator by comparing the degree of similarity, which is of a matching result of the matching means, to a predetermined threshold; recording means (for example, a database management unit 223 in FIG. 10) for recording detection of the accumulator, which is of the matching target person, in the accumulator database together with the identification information while correlating the detection of the accumulator with the face image of the accumulator, when the similarity determination means determines that the face image of the matching target person is the face image of the accumulator; population extraction means (for example, a population extraction unit 281 in FIG. 12) for extracting the number of face images, each of which is recorded together with identification information identifying a predetermined article registered in past times, as the number of persons of a population from pieces of information included in the accumulator database; and mobile ratio calculation means (for example, a mobile ratio calculator 255 in FIG. 12) for, assuming that the number of persons of a target group is the number of face images for each article recorded together with the pieces of identification information identifying the currently-registered articles in the pieces of information included in the accumulator database, calculating a ratio of the number of persons of the target group to the number of persons of the population as a mobile ratio of the person who uses or purchases the predetermined article with respect to the currently-registered article.

The information processing apparatus may further include: image capturing means (for example, a camera 38 in FIG. 9) for capturing an image; face image extraction means (for example, a face image extraction unit 202 in FIG. 9) for extracting the face image of the matching target person from the image captured by the image capturing means; and feature quantity extraction means (for example, a feature quantity extraction unit 231 in FIG. 10) for extracting a feature quantity from the face image of the matching target person, wherein the matching means calculates the degree of similarity using feature quantities of the face image of the matching target person, which is obtained by the obtaining means, and the face image of a registrant, which is stored in the storage means, and matches the face image of the matching target person, which is obtained by the obtaining means, against the face image of the registrant, which is stored in the storage means.

Figure 12:
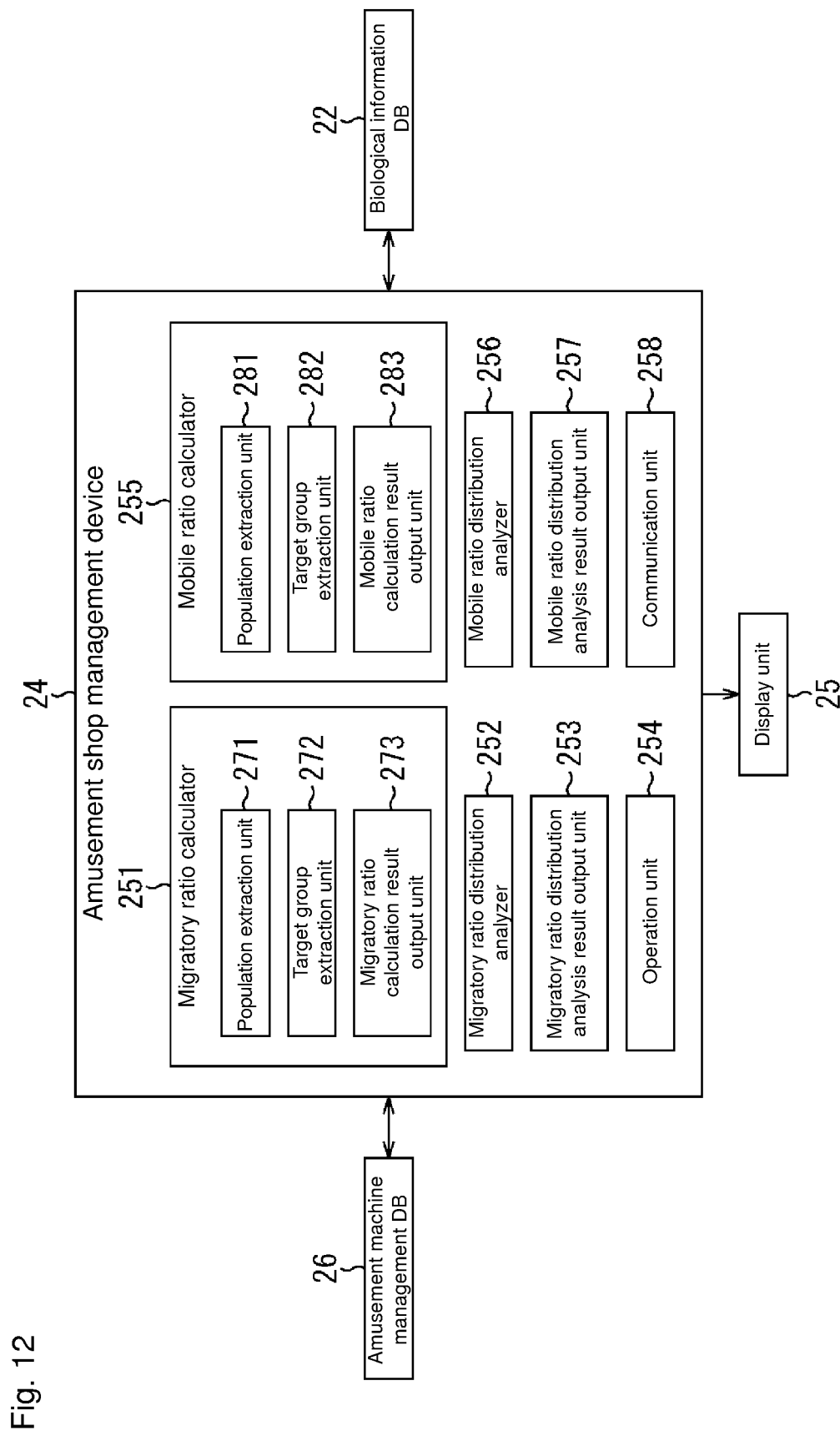
FIG. 12 is a view illustrating a configuration example of an amusement shop management device in FIG. 1.

The information processing apparatus may further include display means (for example, a mobile ratio distribution analysis result output unit 257 in FIG. 12) for displaying proper selection of the model of the replaced amusement machine when the model of the amusement machine replaced with the model of the amusement machine, which is registered in past times and in which the use of the number of persons obtained as the population is recorded, is included as the model of the amusement machine in which the mobile ratio is higher than a predetermined order, the display means displaying improper selection of the model of the replaced amusement machine when the model of the amusement machine replaced with the model of the amusement machine, which is registered in past times and in which the use of the number of persons obtained as the population is recorded, is not included as the model of the amusement machine in which the mobile ratio is higher than the predetermined order.

An information processing method for an information processing apparatus including: storage means for storing a face image as a face image of an accumulator in an accumulator database; obtaining means for obtaining a face image of a matching target person who uses or purchases one of plural articles together with identification information identifying the article that is used or purchased by the matching target person; matching means for performing matching by calculating a degree of similarity between the face image of the matching target person, which is obtained by the obtaining means, and the face image of the accumulator, which is stored in the storage means; similarity determination means for determining whether the face image of the matching target person is the face image of the accumulator by comparing the degree of similarity, which is of a matching result of the matching means, to a predetermined threshold; recording means for recording detection of the accumulator, which is of the matching target person, in the accumulator database together with the identification information while correlating the detection of the accumulator with the face image of the accumulator, when the similarity determination means determines that the face image of the matching target person is the face image of the accumulator; population extraction means for extracting the number of face images, each of which is recorded together with identification information identifying a predetermined article registered in past times, as the number of persons of a population from pieces of information included in the accumulator database; and mobile ratio calculation means for, assuming that the number of persons of a target group is the number of face images for each article recorded together with the pieces of identification information identifying the currently-registered articles in the pieces of information included in the accumulator database, calculating a ratio of the number of persons of the target group to the number of persons of the population as a mobile ratio of the person who uses or purchases the predetermined article with respect to the currently-registered article, the information processing method includes: an obtaining step (for example, Step S21 in FIG. 14) of obtaining, in the obtaining means, the face image of the matching target person who uses or purchases one of the plural articles together with the identification information identifying the article that is used or purchased by the matching target person; a matching step (for example, Step S24 in FIG. 14) of performing, in the matching means, matching by calculating the degree of similarity between the face image of the matching target person, which is obtained in the obtaining step, and the face image of the accumulator, which is stored in the storage means; a similarity determination step (for example, Step S25 in FIG. 14) of determining, in the similarity determination means, whether the face image of the matching target person is the face image of the accumulator by comparing the degree of similarity, which is of the matching result of the processing in the matching step, to the predetermined threshold; a recording step (for example, Steps S26 and S28 in FIG. 14) of recording, in the recording means, detection of the accumulator, which is of the matching target person, in the accumulator database together with the identification information while correlating the detection of the accumulator with the face image of the accumulator, when the determination that the face image of the matching target person is the face image of the accumulator is made through the processing in the similarity determination step; a population extraction step (for example, Step S92 in FIG. 18) of extracting, in the population extraction means, the number of face images, each of which is recorded together with the identification information identifying the predetermined article registered in past times, as the number of persons of the population from the pieces of information included in the accumulator database; and a mobile ratio calculation step (for example, Step S94 in FIG. 18) of, assuming that the number of persons of the target group is the number of face images for each article recorded together with the pieces of identification information identifying the currently-registered articles in the pieces of information included in the accumulator database, in the mobile ratio calculation means, calculating the ratio of the number of persons of the target group to the number of persons of the population as the mobile ratio of the person who uses or purchases the predetermined article with respect to the currently-registered article.

Embodiments of the present invention will be described below. The description is made as follows.

1. First embodiment (configuration example of amusement shop sales support system)
2. Second embodiment (configuration example of dealer sales support system)
3. Third embodiment (configuration example of amusement park sales support system)
4. Fourth embodiment (configuration example of commercial complex sales support system)

1. First Embodiment

Configuration Example of Amusement Shop Sales Support System

FIG. 1 is a view illustrating a configuration of an amusement shop sales support system according to an embodiment of the present invention.

Amusement shops 1-1 to 1-n are what is called pachinko parlors, pachisuro (a slot machine in the pachinko parlor) parlors, or casinos. The amusement shops 1-1 to 1-n are also affiliated stores or member stores of a biological information management center or a third-party amusement shop management center. In the amusement shops 1-1 to 1-n, plural stores need to be integrally managed. The amusement shops 1-1 to 1-n are connected to one another by a biological information management bus 6 and a third-party amusement shop management bus 7. The amusement shops 1-1 to 1-n transmit and receive biological information and third-party amusement shop management information to and from one another through the buses 6 and 7 and public communication line networks 8 and 9 typified by the Internet. Hereinafter, the amusement shops 1-1 to 1-n are simply referred to as an amusement shop 1 unless otherwise noted. It is assumed that the same holds true for other configurations.

The biological information management bus 6 acts as a transmission line through which the biological information mainly managed by a biological information recognizer 21 of each amusement shop 1 flows. The third-party amusement shop management bus 7 acts as a transmission line through which the medium lending management information mainly managed by a medium lending management device 27 of each amusement shop 1 flows.

A biological information management center 2 is a server that is used by a business operator who manages and operates the biological information management center. The biological information management center 2 updates a registered player DB (hereinafter the database is also referred to as a DB) managed in a biological information management database 3 based on an unregistered player DB generated by each amusement shop 1, and distributes the updated latest registered player DB to the biological information recognizer 21 of each amusement shop 1.

A third-party amusement shop management center 4 is a server that is used by a business operator who manages and operates the third-party amusement shop management center. The third-party amusement shop management center 4 updates a DB including medium lending management information, which is managed in a third-party amusement shop management database (DB) 5, based on information supplied from each amusement shop 1, and distributes the updated latest medium lending management information to the medium lending management device 27 of each amusement shop 1.

The biological information recognizer 21 matches information on a face image, which is extracted from images captured by cameras 38-1 to 38-m, entrance cameras 40-1 to 40-p, and in-store cameras 41-1 to 41-q by image processing units 39-1 to 39-(m+p+q) and supplied through a biological information bus 31, against a face image previously registered in a biological information DB 22. When the face images matched with each other, a visit of a registered player or amusement information is added to the biological information DB 22 to update the biological information DB 22, and various pieces of information are displayed on a display unit 23 including a CRT (Cathode Ray Tube) or an LCD (Liquid Crystal Display) as needed basis.

An amusement shop management device 24 is what is called a hall computer, and monitors operations of of amusement machines 36-1 to 36-m through an amusement shop management information bus 30. Based on information on the number of balls acquired by a player or the number of payout medals in each amusement machine 36, player's call information on each of amusement machines 36-1 to 36-m, or monitoring status, such as error generation, the amusement shop management device 24 performs predetermined processing and displays a processing result on a display unit 25 including the CRT or the LCD. Using an amusement machine management DB 26, the amusement shop management device 24 manages pieces of information supplied from a counter 35, the amusement machines 36-1 to 36-m and amusement machine peripheral terminals 37-1 to 37-m while correlating each of the pieces of information with identification information (for example, an amusement machine identification number) identifying each amusement machine 36. Pieces of information on a model, a specification, and a manufacturer of the amusement machine are registered in the amusement machine management DB 26 while correlated with the amusement machine identification number.

Using a medium lending management DB 29, the medium lending management device 27 manages medium lending management information on a lent amusement medium based on pieces of information from an adjustment/vending machine 33 and a lending machine 34. When the medium lending management information registered in the medium lending management DB 29 is updated, the medium lending management device 27 transmits the updated information to the third-party amusement shop management center 4 through the third-party amusement shop management bus 7 and the public communication line network 9. The medium lending management device 27 obtains the medium lending management information supplied from the third-party amusement shop management center 4 through the third-party amusement shop management bus 7 and the public communication line network 9, and accumulates the medium lending management information in the medium lending management DB 29.

In the case that the player plays the amusement machine 36, the lending machine 34 lends the amusement mediums to the player according to a predetermined amount of money when receiving the amount of money in cash or by a prepaid card. At this point, the lending machine 34 supplies information on the number of lent amusement mediums to the medium lending management device 27 together with information on the received amount of money or a balance of the prepaid card. Therefore, the medium lending management device 27 registers the information on the number of lent amusement mediums in the medium lending management DB 29 together with the information on the received amount of money or the balance of the prepaid card.

The adjustment/vending machine 33 sells the prepaid card with units to borrow the ball. At this point, the adjustment/vending machine 33 supplies the units of the prepaid card and the amount of paid money to the medium lending management device 27. The adjustment/vending machine 33 adjusts an account and pays money based on the balance of the amusement medium that is lent as the units of the prepaid card. At this point, the adjustment/vending machine 33 supplies the balance of the prepaid card and the amount of paid money to the medium lending management device 27.

The counter 35 counts the number of amusement mediums acquired by the player in playing the amusement machine 36, and outputs a counting result in the form of a magnetic card or a receipt.

The player performs a predetermined operation to cause each of the amusement machines 36-1 to 36-$m$ to perform the game, and each of the amusement machines 36-1 to 36-$m$ pays the amusement ball or the medal according to what is called a small hit or a big hit.

The amusement machine peripheral terminals 37-1 to 37-$m$ are what is called inter-machine devices that are provided according to the amusement machines 36-1 to 36-$m$, and an inter-machine vending machine (identical to the lending machine 34 in principle) is provided in each of the amusement machines 36-1 to 36-$m$. The amusement machine peripheral terminal 37 obtains the biological information on the face image of the player who plays the amusement machine 36, and the amusement machine peripheral terminal 37 transmits the biological information to the biological information recognizer 21 together with the amusement machine identification information (the amusement machine identification number). In FIG. 1, by way of example, the cameras 38-1 to 38-$m$ that capture the face image of the player are provided as a function of obtaining the biological information.

Figure 2:
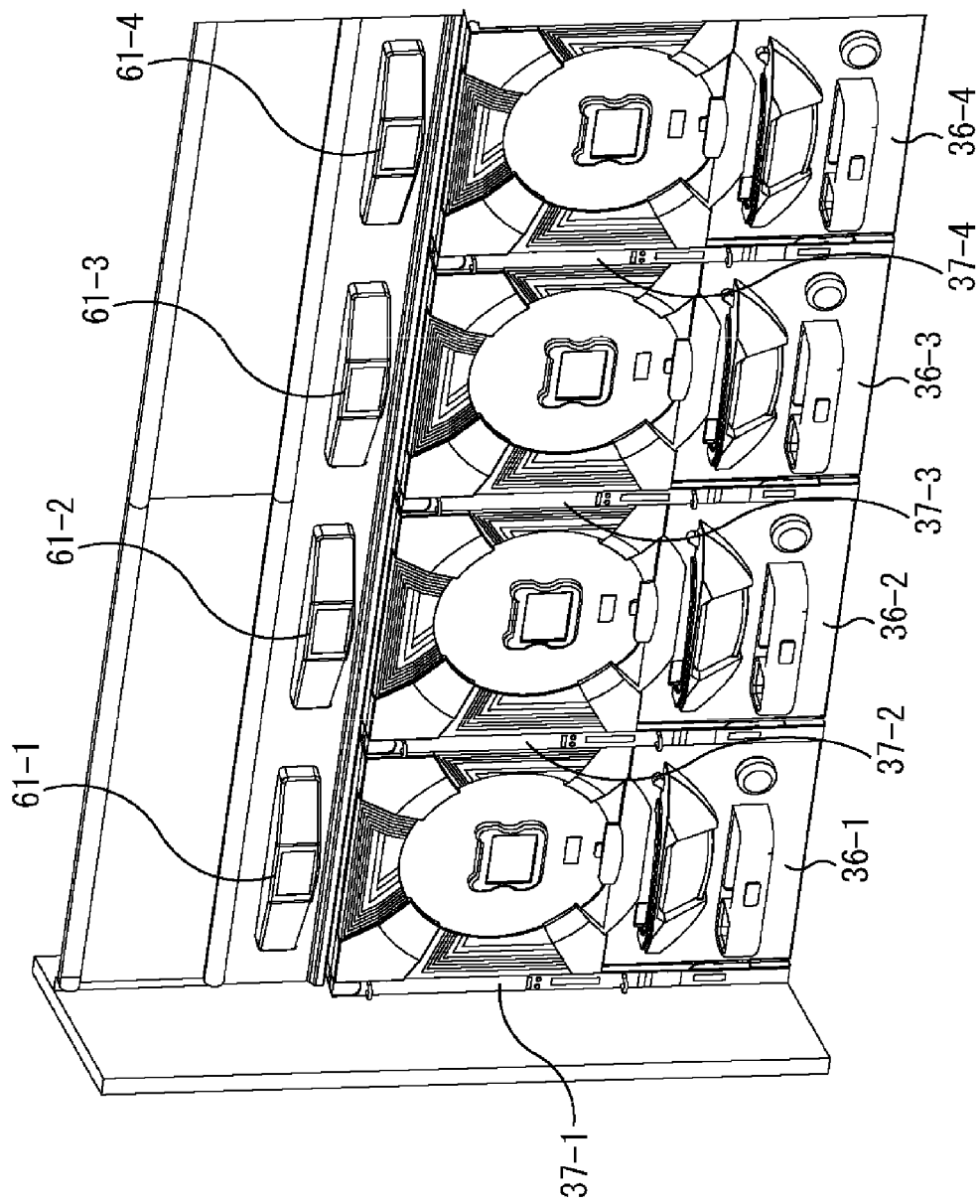
FIG. 2 is a view illustrating an installation example of cameras in FIG. 1.
Figure 3:
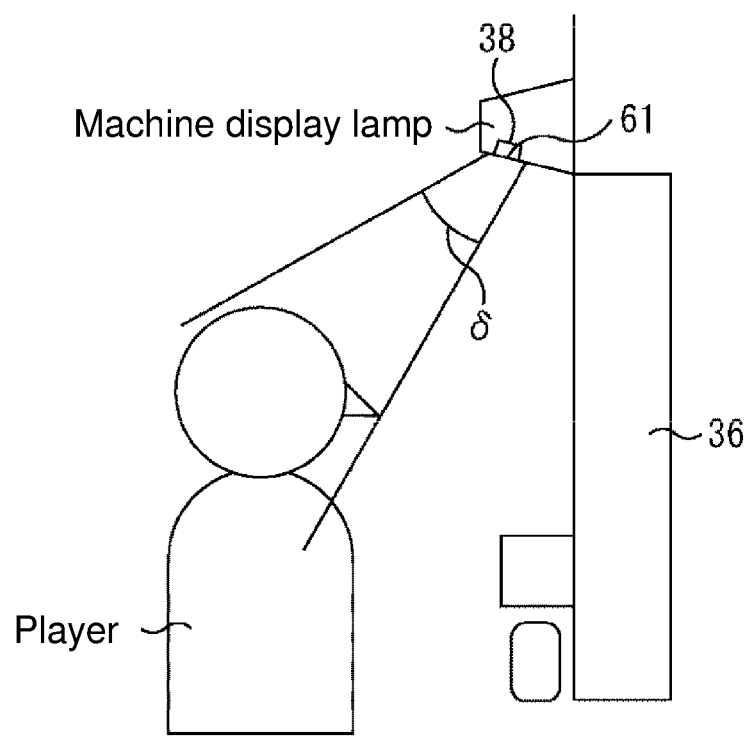
FIG. 3 is a view illustrating an installation example of the camera in FIG. 1.

For example, the cameras 38-1 to 38-$m$ may be provided below machine display lamps 61-1 to 61-4 provided in upper portions of the amusement machines 36-1 to 36-4 as illustrated in FIG. 2 such that the face image of the player is captured within a read range δ as illustrated in FIG. 3. Therefore, each camera ID can simultaneously be used as an amusement machine ID.

Figure 4:
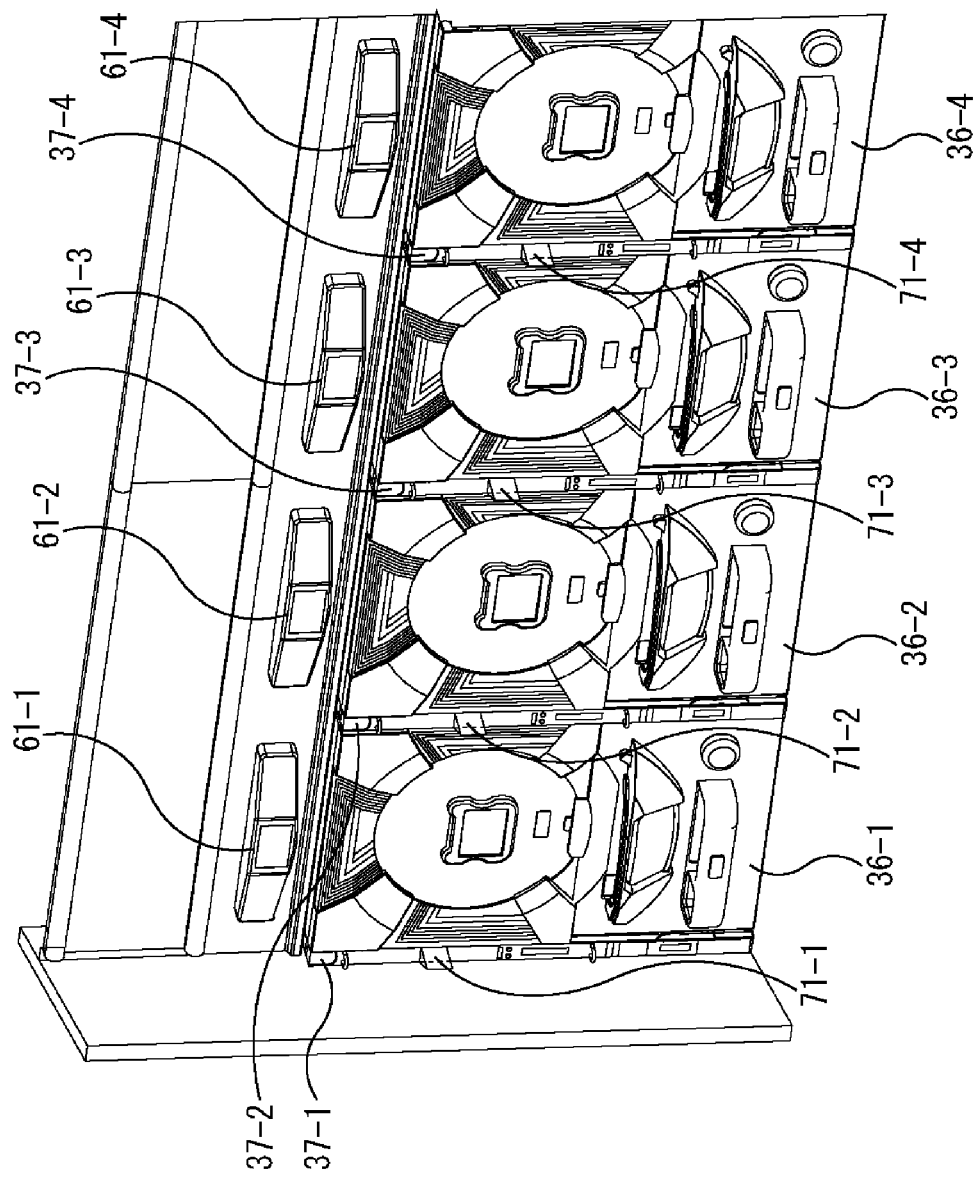
FIG. 4 is a view illustrating an installation example of the cameras in FIG. 1.
Figure 5:
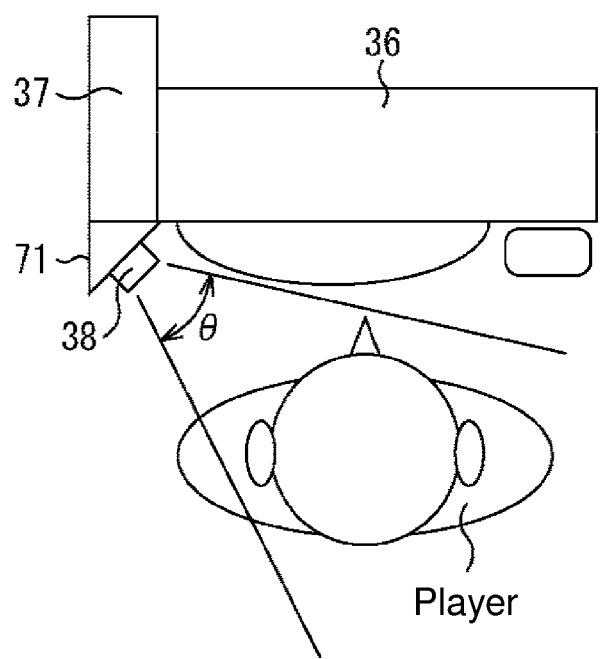
FIG. 5 is a view illustrating an installation example of the camera in FIG. 1.

For example, in the cameras 38-1 to 38-$m$, projections 71-1 to 71-4 may be provided in the amusement machine peripheral terminals 37-1 to 37-4 as illustrated in FIG. 4 such that the face image of the player is captured within a read range θ as illustrated in FIG. 5.

Figure 6:
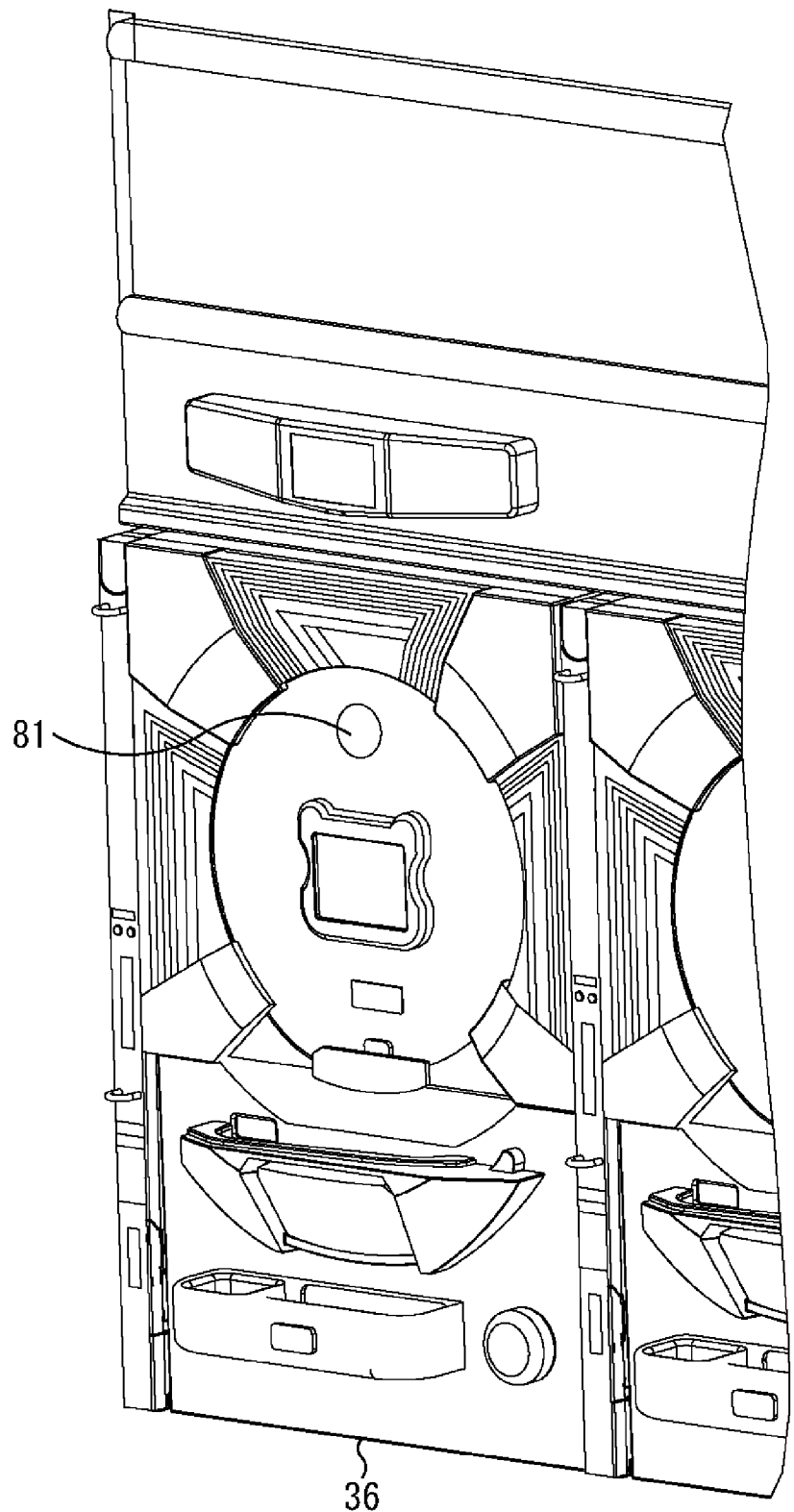
FIG. 6 is a view illustrating an installation example of the camera in FIG. 1.
Figure 7:
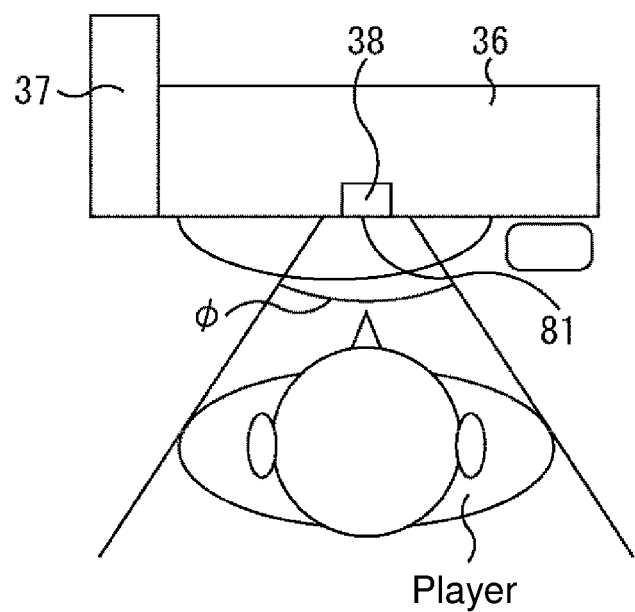
FIG. 7 is a view illustrating an installation example of the camera in FIG. 1.

For example, as illustrated in FIG. 6, the face image of the player may be captured while each of the cameras 38-1 to 38-$m$ are provided in a central portion (on a board of the amusement machine 36) of the amusement machine 36. That is, the camera 38 is installed in an installation unit 81 in FIG. 6, thereby capturing the face image of the player within a read range φ as illustrated in FIG. 7.

The entrance cameras 40-1 to 40-$p$ and the in-store cameras 41-1 to 41-$q$ are installed at doorways and predetermined sites in the amusement shop 1, and supply the captured images to the image processing units 39-($m$+1) to 39-($m$+$p$+$q$), respectively.

Figure 8:
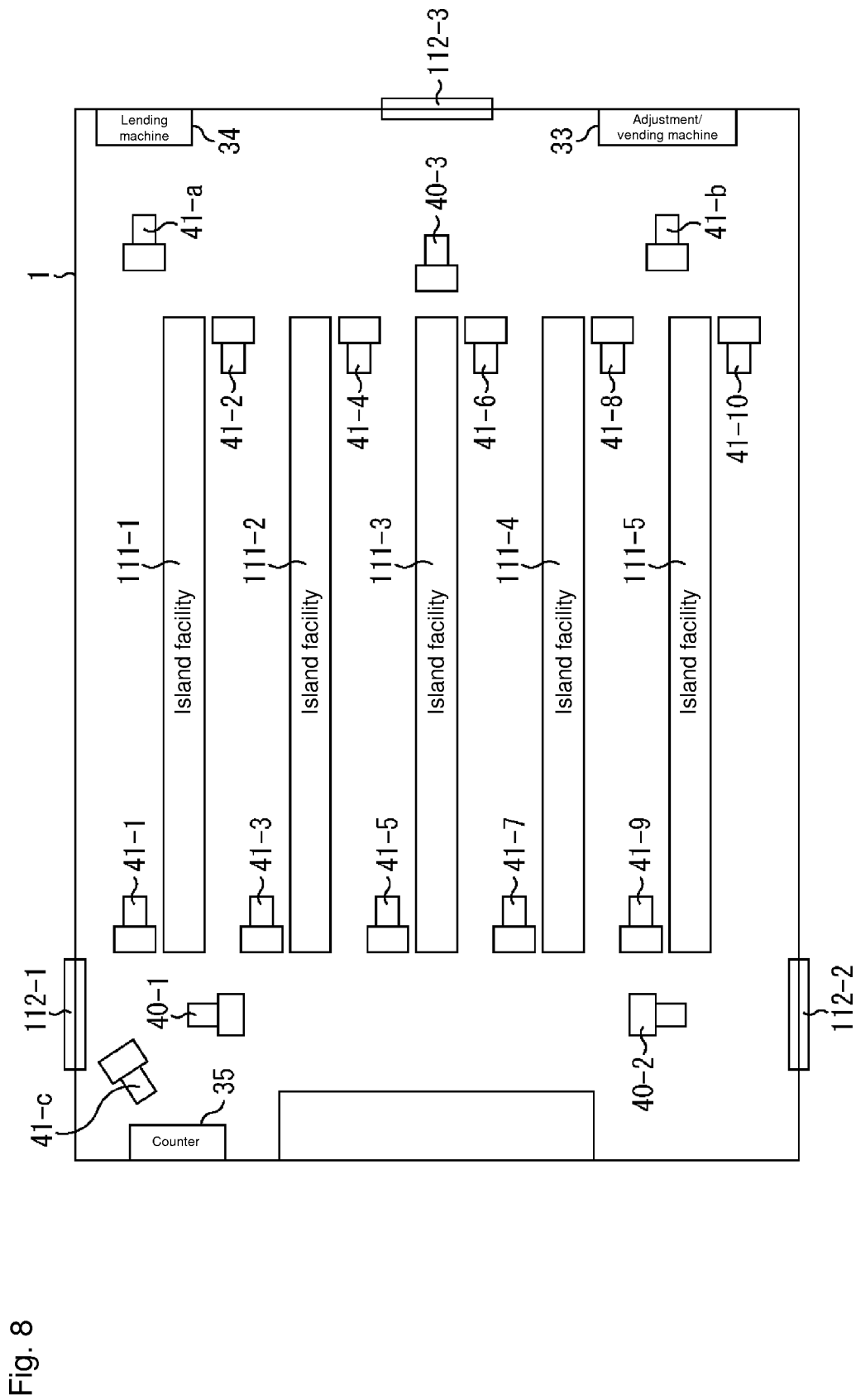
FIG. 8 is a view illustrating an installation example of entrance cameras and in-store cameras in FIG. 1

For example, the entrance cameras 40-1 to 40-$p$ and the in-store cameras 41-1 to 41-$q$ are installed as illustrated in FIG. 8. FIG. 8 illustrates an installation example of the entrance cameras 40-1 to 40-$p$ and the in-store cameras 41-1 to 41-$q$ in the amusement shop 1.

In FIG. 8, doorways 112-1 to 112-3 are provided, and the entrance cameras 40-1 to 40-3 capture the players who enters the amusement shop 1 through the doorways 112, respectively. The in-store cameras 41-1 to 41-10 are installed at positions in each of which the in-store camera 41 can capture both surfaces of each of the island facilities 111-1 to 111-5 in line. The amusement machines 36 are installed in both surfaces of the island facility 111, namely, the amusement machines 36 are installed such that the island facility 111 in FIG. 8 is vertically sandwiched therebetween. Each of the camera 38, the entrance camera 40, and the in-store camera 41 has a pan-tilt-zoom function. Therefore, as illustrated in FIG. 8, the in-store cameras 41-1 to 41-10 are disposed, which allows the images of all the players who play the amusement machines 36 to be captured by any one of the in-store cameras 41-1 to 41-10.

The in-store camera 41-$a$ is provided in front of the lending machine 34, the in-store camera 41-$b$ is provided in front of the adjustment/vending machine 33, and the in-store camera 41-$c$ is provided in front of the counter 35. Therefore, the image of the player who uses the lending machine 34, the adjustment/vending machine 33, and the counter 35 can be captured.

That is, as illustrated in FIG. 8, the camera 38, the entrance camera 40, and the in-store camera 41 are installed in the amusement shop 1 such that almost all behaviors expected to be taken by the players, such as the player who visits the amusement shop 1, the player who plays the amusement machine 36, and the player who uses the lending machine 34, the adjustment/vending machine 33, or the counter 35, can be monitored.

[Configuration Example of Image Processing Unit]

Figure 9:
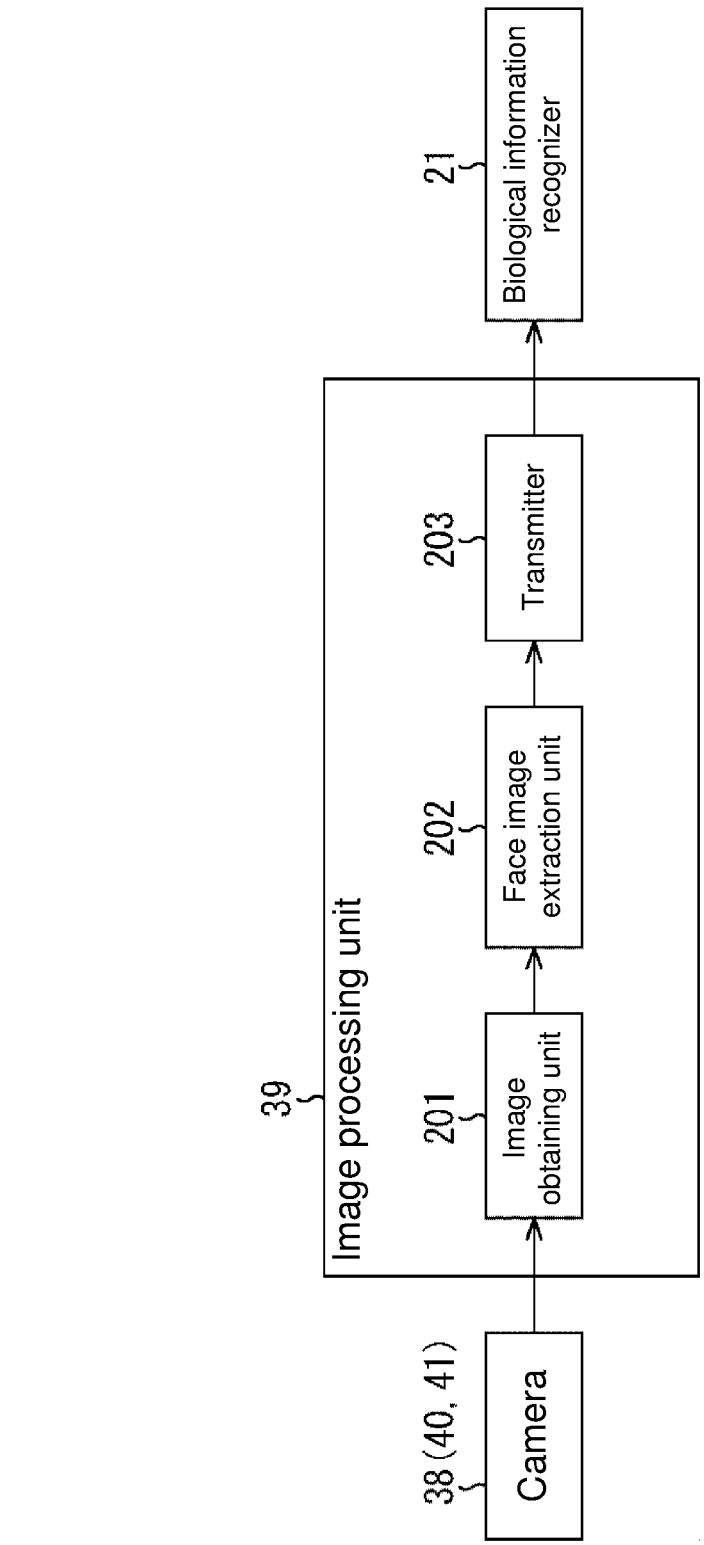
FIG. 9 is a view illustrating a configuration example of an image processing unit in FIG. 1.

A configuration example of the image processing unit 39 will be described below with reference to FIG. 9.

An image obtaining unit 201 obtains the image captured by the camera 38 (or the entrance camera 40 or the in-store camera 41), and supplies the image to a face image extraction unit 202. The face image extraction unit 202 extracts a rectangular image including the face image in the image supplied from the image obtaining unit 201 using a pattern in which regions constituting a face are disposed. The face image extraction unit 202 supplies the rectangular image to a transmitter 203. The transmitter 203 transmits the face image to the biological information recognizer 21. At this point, the transmitter 203 transmits the face image to the biological information recognizer 21 together with information identifying the image processing unit 39, and information specifying the amusement machine 36 provided corresponding to the camera 38 or pieces of information identifying a position of the entrance camera 40 and the in-store camera 41.

[Configuration Example of Biological Information Recognizer]

Figure 10:
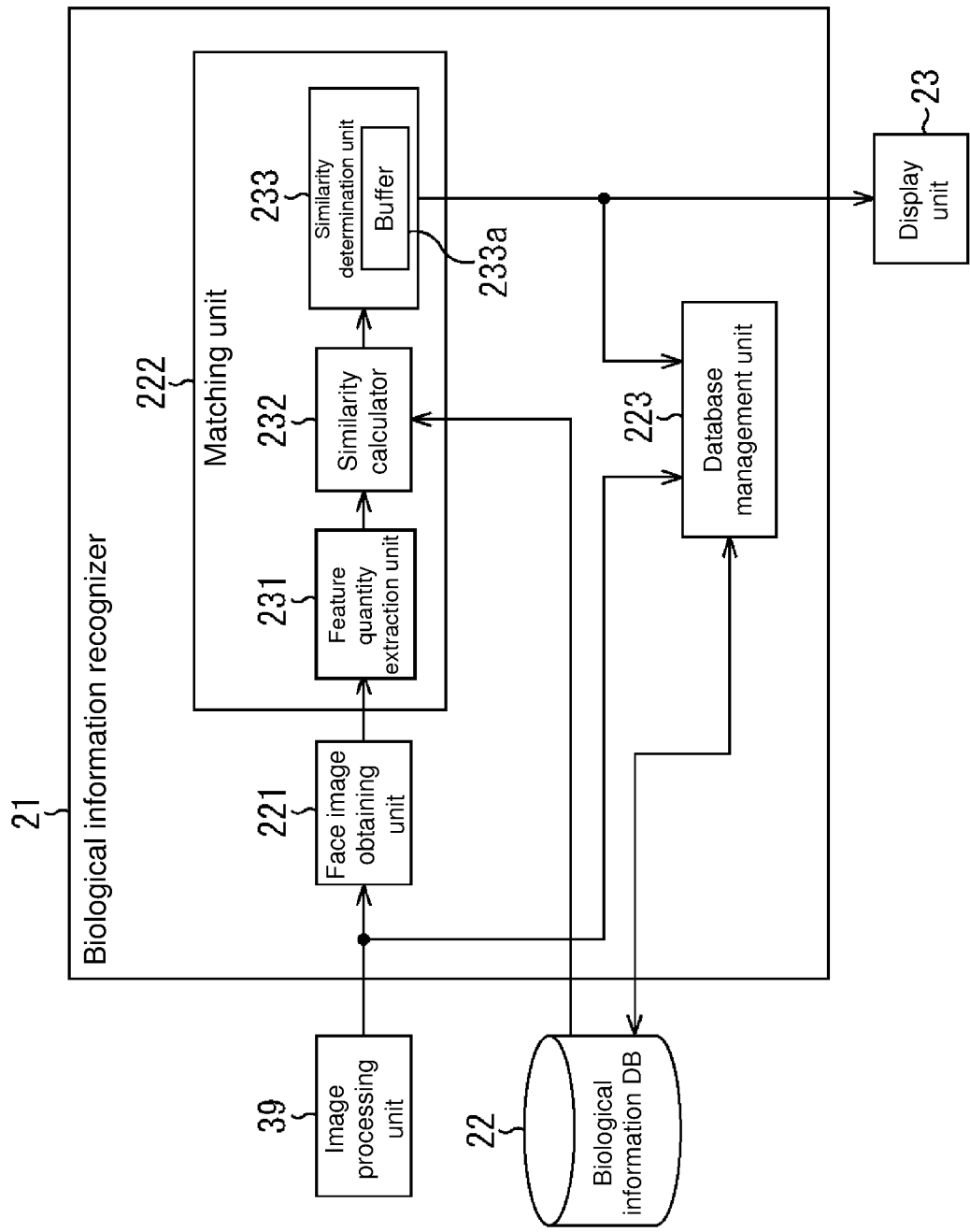
FIG. 10 is a view illustrating a configuration example of a biological information recognizer in FIG. 1.

A configuration example of the biological information recognizer 21 will be described below with reference to FIG. 10.

A face image obtaining unit 221 obtains the face image supplied from the image processing unit 39, and supplies the face image to a matching unit 222. The matching unit 222 matches the face image obtained by the face image obtaining unit 221 against the face image of the registered player who is previously registered in the biological information DB 22. When the face image that becomes a candidate having a high degree of similarity exists, the matching unit 222 regards the person of the obtained face image as the registered player, and issues an instruction to a database management unit 223 to accumulate the face image obtained by the face image obtaining unit 221 in the biological information DB 22 together with pieces of information on a clock time at which the face image is detected and a clock time at which the face image is not detected, and the amusement machine identification information identifying the amusement machine 36 or the pieces of identification information identifying the entrance camera 40 and the in-store camera 41. At this point, the matching unit 222 displays the face image as a matching result on the display unit 23. When the face image that becomes the candidate having the high degree of similarity does not exist, the matching unit 222 issues an instruction to the database management unit 223 to register the supplied face image in the biological information DB 22. At this point, the database management unit 223 also registers the pieces of information on the clock time at which the face image is detected and the clock time at which the face image is not detected, and the amusement machine identification information identifying the amusement machine 36 or the pieces of identification information identifying the entrance camera 40 and the in-store camera 41 in the biological information DB 22.

More particularly, a feature quantity extraction unit 231 of the matching unit 222 extracts a feature quantity used to identify the face image, and supplies the feature quantity to a similarity calculator 232 together with the face image. The similarity calculator 232 extracts the feature quantity of the face image of the registered player registered in the biological information DB 22. Extracting the feature quantity of the registered player registered in the biological information DB 22 and using the feature quantity supplied from the feature quantity extraction unit 231, the similarity calculator 232 obtains the degree of similarity to the face images of all the registered players registered in the biological information DB 22. The similarity calculator 232 supplies the face image supplied from the face image obtaining unit 221 and the face image having the top degree of similarity to a similarity determination unit 233. More specifically, the similarity calculator 232 obtains a sum of absolute differences, average percentage, and a sum of ratios as the degree of similarity based on various face feature quantities, such as an interval between eyes and a ratio of a length from a chin to a forehead and a length from the chin to a nose.

The similarity determination unit 233 accumulates the degree of similarity supplied from the similarity calculator 232 in a buffer 233a, and compares the top degree of similarity of the face image to a predetermined threshold. In the case that the registered face image having the top degree of similarity is similar to the face image supplied from the face image obtaining unit 221 (when the degree of similarity of the registered face image is higher than the predetermined threshold for the degree of similarity indicating the higher degree of similarity with increasing degree of similarity, or when the degree of similarity of the registered face image is lower than the predetermined threshold for the degree of similarity indicating the higher degree of similarity with decreasing degree of similarity) based on the comparison result, the similarity determination unit 233 supplies the information on the face image having the top degree and similarity to the display unit 23, and displays the face image having the top degree of similarity on the display unit 23. At this point, the similarity determination unit 233 issues an instruction to the database management unit 223 to register the pieces of information on the clock time at which the face image is detected and the clock time at which the face image is not detected, and the amusement machine identification information identifying the amusement machine 36 or the pieces of identification information identifying the entrance camera 40 and the in-store camera 41 in the biological information DB 22.

The similarity determination unit 233 compares the top degree of similarity of the face image to the predetermined threshold. In the case that the registered face image having the top degree of similarity is not similar to the face image supplied from the face image obtaining unit 221 based on the comparison result, the similarity determination unit 233 issues an instruction to the database management unit 223 to newly register the face image having the top degree of similarity in the biological information DB 22 together with the pieces of information on the clock time at which the face image is detected and the clock time at which the face image is not detected, and the amusement machine identification information identifying the amusement machine 36 or the pieces of identification information identifying the entrance camera 40 and the in-store camera 41.

At this point, for example, it is assumed that the degree of similarity indicates a higher value as the face image comes close to the face image registered as the registered player indicated by the sum of ratios. An example in which the face image is determined to be the face image of the registered player corresponding to the degree of similarity when the degree of similarity is higher than the predetermined threshold will be described. However, for example, in the case that the degree of similarity is expressed by the sum of absolute differences in feature quantity between the captured face image and the face image registered as the registered player, the similarity determination unit 233 regards the captured face image as the face image of the registered player when the degree of similarity is lower than a threshold. Alternatively, in the case of the average ratio, the similarity determination unit 233 can regard the captured face image as the face image of the registered player when the degree of similarity is greater than or equal to a predetermined value and is a value close to 1 in a range of 0 to 1.

[Configuration Example of Biological Information Database]

A configuration example of the biological information database 22 will be described below with reference to FIG. 11.

Figure 11:
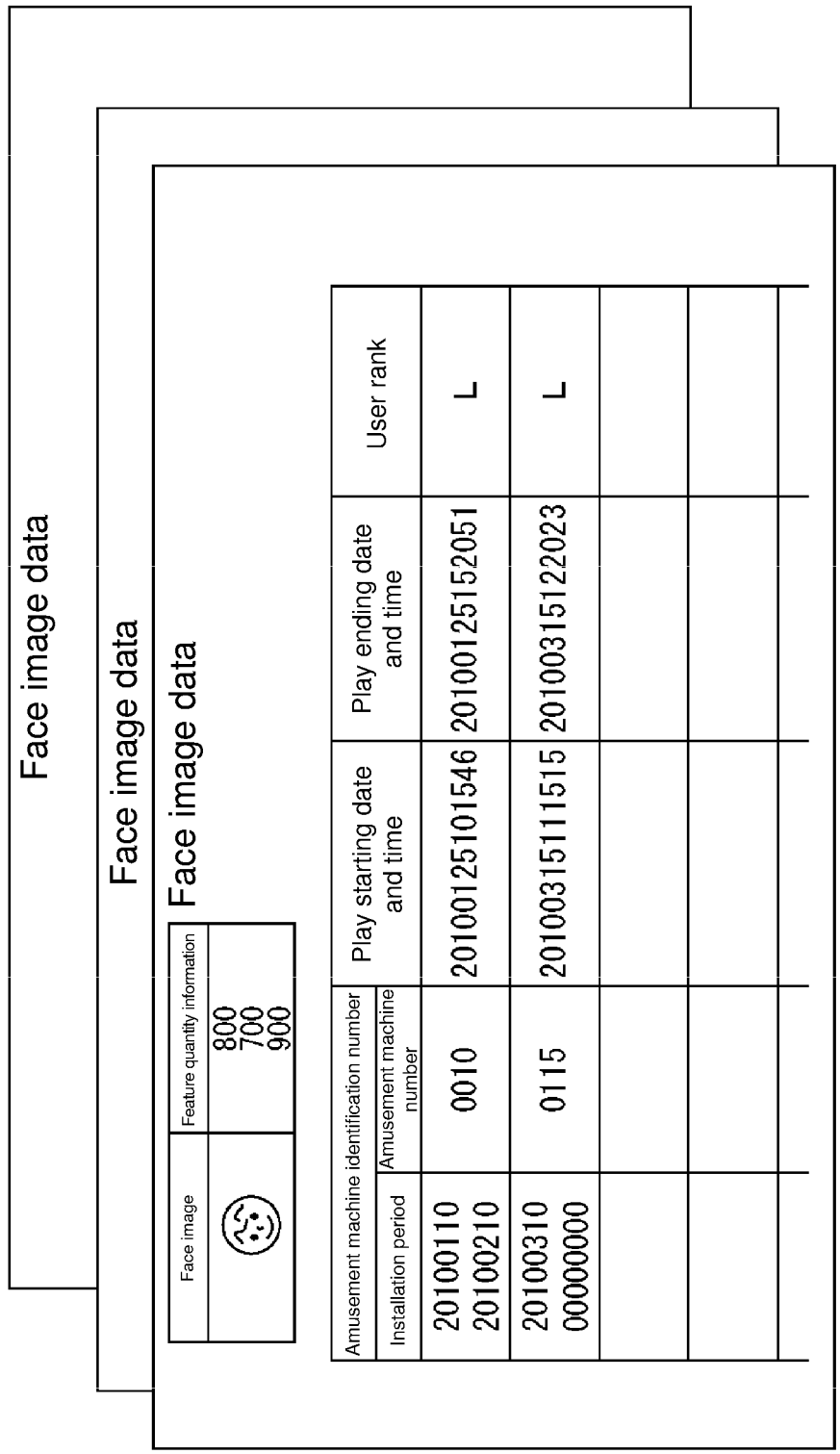
FIG. 11 is a view illustrating a configuration example of a biological information database in FIG. 1.

As illustrated in FIG. 11, the biological information DB 22 is a database including sheet-like face image data managed in each face image, and the database management unit 223 registers the amusement information on the person having the face image while correlating the amusement information with the face image. Each sheet including the face image data, feature quantity information is registered in a feature quantity information field while correlated with the face image registered in a face image field. An amusement machine identification number field, a play starting date and time field, a play ending date and time field, and a user rank field are also provided in the biological information DB 22. The amusement machine identification number, play starting date and time, play ending date and time, and a user rank are registered in the amusement machine identification number field, the play starting date and time field, the play ending date and time field, and the user rank field, respectively. The database management unit 223 registers the face image obtained by the face image obtaining unit 221 in the face image field. The database management unit 223 registers the amusement machine identification number supplied together with the face image in the amusement machine identification number field. The amusement machine identification number is information specifying the amusement machine played by the person in which the face image is supplied, and the amusement machine identification number is registered in the amusement machine identification number field. The amusement machine identification number includes an installation period during which the model of the amusement machine is installed and an amusement machine number managed in the store. The installation period and the amusement machine number are recorded in an installation period field and an amusement machine number field, respectively.

For example, the installation periods are "20100110201002100010" and "20100310000000000115" as illustrated in the top stage and the second stage in FIG. 11. The amusement machine identification number of the top stage indicates that the amusement machine is installed in the amusement machine number "0010" from Jan. 10, 2010 to Feb. 10, 2010. That is, in "20100110201002100010", the starting time of the installation period is "20100110", the ending time is "20100210", and the amusement machine number is "0010".

For the amusement machine identification number of the second stage, in "20100310000000000115", the starting time of the installation period is "20100110", the ending time is "00000000", and the amusement machine number is "0115". The ending time "00000000" indicates that the amusement machine is currently installed and that the ending time is not set. That is, the amusement machine identification number of the second stage indicates that the amusement machine is currently installed since Mar. 10, 2010 and that the amusement machine is installed in the amusement machine number "0115".

Information on the play starting date and time indicating the clock time, at which the person identified by the face image starts the game with the amusement machine 36 assigned by the amusement machine identification number, is recorded in the play starting date and time field. In FIG. 11, "20100125101546" and "20100315111515" are recorded in the top stage and the second stage of the play starting date and time field. That is, the top stage in FIG. 11 indicates that the person identified by the face image starts the game at 10:15:46 on Jan. 25, 2010 with the amusement machine 36 having the amusement machine identification number "20100110201002100010". The second stage in FIG. 11 indicates that the person identified by the face image starts the game at 11:15:15 on Mar. 15, 2010 with the amusement machine 36 having the amusement machine identification number "20100310000000000115".

Information on the play ending date and time indicating the clock time, at which the person identified by the face image ends the game with the amusement machine 36 assigned by the amusement machine identification number, is recorded in the play ending date and time field. In FIG. 11, "20100125152051" and "20100315122023" are recorded in the top stage and the second stage of the play ending date and time field. That is, the top stage in FIG. 11 indicates that the person identified by the face image ends the game at 15:20:51 on Jan. 25, 2010 in the amusement machine 36 having the amusement machine identification number "20100110201002100010". The second stage in FIG. 11 indicates that the person identified by the face image ends the game at 12:20:23 on Mar. 15, 2010 in the amusement machine 36 having the amusement machine identification number "20100310000000000115".

The user rank is indicated on a scale of H (Heavy), M (Middle), and L (Light) according to a visiting frequency of the player identified by the face image, and the user rank is recorded in the user rank field. When updating the face image data, the database management unit 223 records the user rank as L in an initial state. After that, the database management unit 223 calculates the visiting frequency from the information on the play starting date and time. The database management unit 223 records the user rank as M when the visiting frequency is higher than a predetermined frequency, and the database management unit 223 records the user rank as H when the visiting frequency is further higher. On the other hand, when the visiting frequency decreases, the database management unit 223 changes the user rank from H to M or from M to L.

[Configuration Example of Amusement Shop Management Device]

A configuration example of the amusement shop management device 24 will be described below with reference to FIG. 12.

The amusement shop management device 24 obtains a migratory ratio and a mobile ratio with the players who play the specific amusement machine 36 as a population from the face image data registered in the biological information DB 22 and the individual information on the amusement machine 36 registered in the amusement machine management DB 26, and provides sales support information.

More particularly, the amusement shop management device 24 specifies the currently-installed amusement machine 36 by the model, a specification, and a manufacturer of the amusement machine, and calculates the migratory ratio indicating a ratio at which the player who uses the specified amusement machine 36 migrates to the currently-installed amusement machines 36 of other models in each of the amusement machines 36 of other models. The amusement shop management device 24 specifies the amusement machine 36, which is not currently installed but installed in past times, by the model, the specification, and the manufacturer of the amusement machine, and calculates the mobile ratio indicating a ratio at which the player who used the specified amusement machine 36 moves to the currently-installed amusement machines 36 of other models in each of the currently-installed amusement machines 36. The amusement shop management device 24 analyzes the migratory ratio or the mobile ratio in each model of the amusement machine, and provides the sales support information based on the analysis result.

The amusement shop management device 24 includes a migratory ratio calculator 251, a migratory ratio distribution analyzer 252, a migratory ratio distribution analysis result output unit 253, an operation unit 254, a mobile ratio calculator 255, a mobile ratio distribution analyzer 256, a mobile ratio distribution analysis result output unit 257, and a communication unit 258.

The migratory ratio calculator 251 includes a population extraction unit 271, a target group extraction unit 272, and a migratory ratio calculation result output unit 273, and calculates a migratory ratio. The population extraction unit 271 extracts information on the number of persons of the population necessary for the calculation of the migratory ratio. More specifically, when the operation unit 254 including a keyboard and an operating button is operated to input a model name, the specification, or the manufacturer as the information specifying the amusement machine, which is currently installed in the amusement shop and with which the person who becomes the population plays the game, the population extraction unit 271 accesses the amusement machine management DB 26 to specify the amusement machine identification number of the currently-installed amusement machine 36, which should be specified, based on the input information. Based on the specified amusement machine identification number, the population extraction unit 271 accesses the biological information DB 22 to extract the face image data in which the amusement information indicating the play of the amusement machine 36 having the specified amusement machine identification number is recorded, and obtains the number of persons who become the population from the number of pieces of extracted face image data.

The target group extraction unit 272 extracts the face image data including the amusement information indicating the play in each of the currently-installed amusement machines 36 except the specified amusement machine 36 in the population necessary to obtain the migratory ratio, and obtains the number of pieces of face image data as the number of persons of the target group.

The migratory ratio calculation result output unit 273 calculates a ratio of the target group to the population as the migratory ratio in each amusement machine by dividing the number of persons of the target group by the number of persons of the population.

The migratory ratio distribution analyzer 252 collects the calculation results of the migratory ratio, which is obtained in each amusement machine, and obtains a distribution of the amusement machines. For example, the migratory ratio distribution analyzer 252 extracts pieces of information on the top n amusement machines, and generates sales support information as an analysis result based on the trend of the pieces of information.

The migratory ratio distribution analysis result output unit 253 generates a graph indicating the migratory ratio information in each of the amusement machines collected by the migratory ratio distribution analyzer 252, and displays the graph on the display unit 25 together with the analysis result of the migratory ratio distribution analyzer 252.

The mobile ratio calculator 255 includes a population extraction unit 281, a target group extraction unit 282, and a mobile ratio calculation result output unit 283, and calculates the mobile ratio. The population extraction unit 281 extracts information on the number of persons of the population necessary for the calculation of the mobile ratio. More specifically, when the operation unit 254 including the keyboard and the operating button is operated to input the model name, the specification, or the manufacturer as the information specifying the amusement machine, which was installed in past times in the amusement shop and with which the person who becomes the population played the game, the population extraction unit 281 accesses the amusement machine management DB 26 to specify the amusement machine identification number of the amusement machine 36, which was installed in past times and should be specified, based on the input information. Based on the specified amusement machine identification number, the population extraction unit 281 accesses the biological information DB 22 to extract the face image data in which the amusement information indicating the play of the amusement machine 36 having the specified amusement machine identification number is recorded, and obtains the number of persons who become the population from the number of pieces of extracted face image data.

The target group extraction unit 282 extracts the face image data including the amusement information indicating the play in each of the currently-installed amusement machines 36 except the specified amusement machine 36 in the population necessary to obtain the migration ratio, and obtains the number of pieces of face image data as the number of persons of the target group.

The mobile ratio calculation result output unit 283 calculates a ratio of the target group to the population as the mobile ratio in each amusement machine by dividing the number of persons of the target group by the number of persons of the population.

The mobile ratio distribution analyzer 256 collects the calculation results of the mobile ratio, which is obtained in each amusement machine, and obtains a distribution of the amusement machines. For example, the mobile ratio distribution analyzer 256 extracts pieces of information on the top n amusement machines, and generates sales support information as an analysis result based on the trend of the pieces of information.

The mobile ratio distribution analysis result output unit 257 generates a graph indicating the mobile ratio information in each of the amusement machines collected by the mobile ratio distribution analyzer 256, and displays the graph on the display unit 25 together with the analysis result of the mobile ratio distribution analyzer 256.

For example, the communication unit 258 is constructed by an Ethernet board. The communication unit 258 conducts communication with the biological information recognizer 21, the amusement machine management DB 26, the medium lending management device 27, and the biological information DB 22 to transmit and receive various pieces of information to and from these units.

[Configuration Example of Amusement Machine Management Database]

A configuration example of the amusement machine management database 26 will be described below with reference to FIG. 13.

The pieces of information on the amusement machine 36, such as the model name, the specification, and the manufacturer of the currently-installed amusement machine 36 or the amusement machine 36 installed in past times, are recorded in the amusement machine management DB 26 based on the amusement machine identification number.

Because the amusement machine identification number is identical to that of the biological information DB 22 in FIG. 11, the description is omitted. The individual model name of the amusement machine 36 is registered in a model name field. The specification of the amusement machine 36 is recorded in a specification field. For example, "L" that is of the specification for a beginner, "M" that is of the specification for an intermediate player, and "H" that is of the specification for an advanced player are recorded in the specification field.

Information indicating specification except the specifications in FIG. 12 may be recorded. Information on the manufacturer of the amusement machine 36 is recorded in a manufacturer field. Accordingly, in the amusement machines 36 having the amusement machine identification numbers "20100310201004100001" and "20100310201004100002" in FIG. 13, the model name is "A", the specification is "M", and the manufacturer is "XXX". In the amusement machines 36 having the amusement machine identification numbers "20100310201004100003" and "20100310201004100004", the model name is "B", the specification is "M", and the manufacturer is "XXX". In the amusement machines 36 having the amusement machine identification numbers "20100510000000000001" and "20100510000000000002", the model name is "AA", the specification is "H", and the manufacturer is "YYY".

[Amusement Information Management Processing]

Amusement information management processing will be described below with reference to a flowchart in FIG. 14.

In Step S1, the camera 38 captures the image in the installation range, and supplies the captured image to the image processing unit 39. The image obtaining unit 201 of the image processing unit 39 obtains the supplied image, and supplies the image to the face image extraction unit 202.

In Step S2, the face image extraction unit 202 extracts the face image of the player from the supplied image, and supplies the face image to the transmitter 203. More specifically, the face image extraction unit 202 extracts the face image from the dispositions of the characteristic regions, such as the eyes and the nose, in which a skin is exposed, from a color of the captured image, and the face image extraction unit 202 supplies the face image to the transmitter 203.

In Step S3, the transmitter 203 determines whether the face image is extracted and surely supplied by the face image extraction unit 202. When the face image is not supplied in Step S3, namely, when the face image cannot be extracted, the flow returns to the processing in Step S1. That is, the pieces of processing in Steps S1 to S3 are repeated until the face image is extracted. When the face image is supplied to complete the extraction of the face image in Step S3, the processing goes to Step S4.

In Step S4, the transmitter 203 transmits the face image, which is supplied from the face image extraction unit 202, to the biological information recognizer 21. At this point, the transmitter 203 transmits the amusement machine identification number identifying the amusement machine 36 in which the camera 38 is installed and information on a transmission clock time (an image capturing clock time) to the biological information recognizer 21 while adding the amusement machine identification number and the information on the transmission clock time to the face image.

In Step S21, the face image obtaining unit 221 of the biological information recognizer 21 obtains the face image. In Step S22, the face image obtaining unit 221 extracts one of unprocessed face images in the supplied face images, and supplies the unprocessed face image to the feature quantity extraction unit 231.

In Step S23, the feature quantity extraction unit 231 of the matching unit 222 extracts the feature quantity from the supplied face image, and supplies the feature quantity to the similarity calculator 232 together with the face image.

In Step S24, the similarity calculator 232 performs similarity calculation processing.

[Similarity Calculation Processing]

Figure 15:
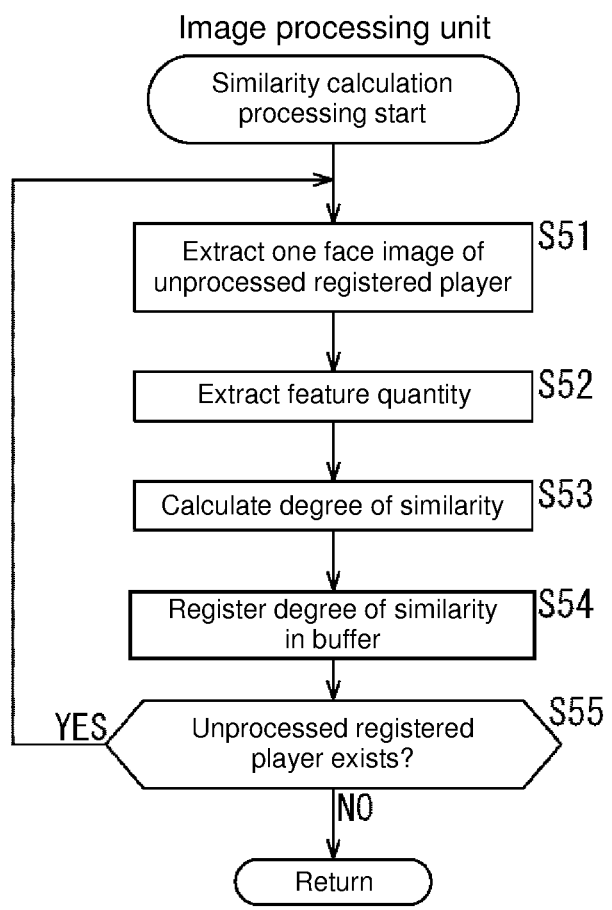
FIG. 15 is a flowchart illustrating similarity calculation processing.

Similarity calculation processing will be described with reference to a flowchart in FIG. 15.

In Step S51, the similarity calculator 232 extracts one of unprocessed face images of the registered players in the face images registered in the registered player DB of the biological information DB 22, and sets the extracted face image to a processing target.

In Step S52, the similarity calculator 232 extracts the feature quantity similar to the feature quantity supplied by the feature quantity extraction unit 231 from the face image, which is set as the processing target and registered in the registered player DB.

In Step S53, the similarity calculator 232 calculates the sum of absolute differences, the average percentage, and the sum of ratios as the degree of similarity using various face feature quantities, such as the interval between the eyes and the ratio of the length from the chin to the forehead and the length from the chin to the nose, with respect to the face image supplied by the feature quantity extraction unit 231 and the similar feature quantities in the face image registered in the biological information DB 22. In Step S54, the similarity calculator 232 supplies the degree of similarity to the registered face image, which is of the calculation result, to the similarity determination unit 233, and causes the similarity determination unit 233 to register the degree of similarity in the buffer 233a.

In Step S55, the similarity calculator 232 determines whether the unprocessed face image of the registered player exists in the biological information DB 22. When the unprocessed face image of the registered player exists, the flow returns to the processing in Step S51. That is, the pieces of processing in Steps S51 to S55 are repeated until the degree of similarity is calculated to the face images of all the registered players. When the similarity calculator 232 determines that the unprocessed face image of the registered player does not exist in Step S55, the similarity calculation processing is ended.

Figure 14:
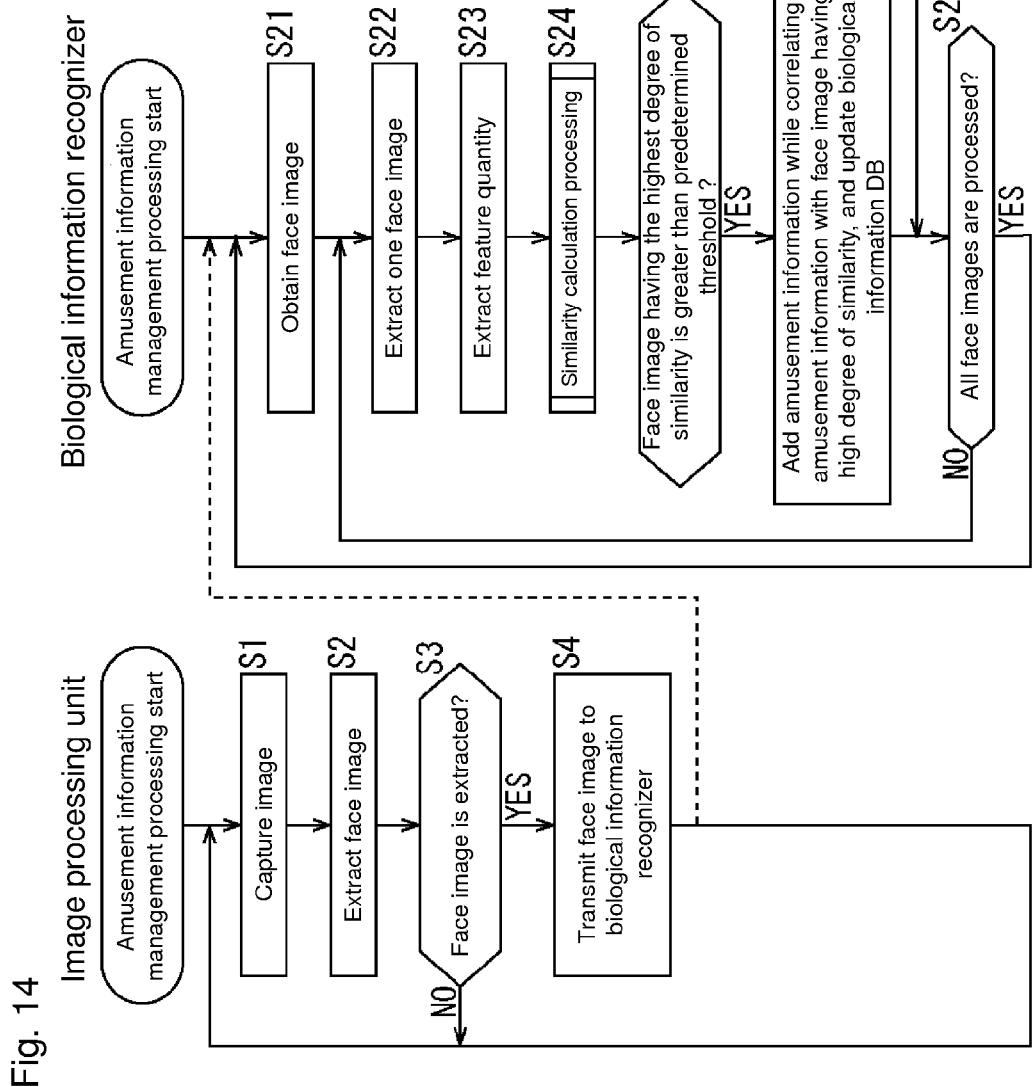
FIG. 14 is a flowchart illustrating amusement information management processing.

The description will return to the flowchart in FIG. 14.

In Step S25, the similarity determination unit 233 obtains an order based on the calculation result of the degree of similarity registered in the buffer 233a, and determines the degree of similarity of the top face image is larger than a predetermined threshold. That is, the similarity determination unit 233 compares the degree of similarity of the most similar registered player (the registered player most similar to the face image obtained by the face image obtaining unit 221 in the face images registered in the biological information DB 22: in this case, the registered player having the highest degree of similarity) to a predetermined threshold.

As described above, due to the definition of the degree of similarity, the degree of similarity to the face image of the registered player most similar to the captured face image is not limited to the degree of similarity having the highest value. Therefore, sometimes a relationship between the degree of similarity and the threshold differs from that of the example.

When determining that the top degree of similarity is larger than the predetermined threshold in Step S25, the similarity determination unit 233 supplies the top face image to the database management unit 223 in Step S26. The database management unit 223 accesses the biological information DB 22 to search the face image data managed in association with the supplied face image. The database management unit 223 registers the play starting date and time, the play ending date and time, and the user rank while correlating the play starting date and time, the play ending date and time, and the user rank with the amusement machine identification number added to the face image. At this point, the database management unit 223 registers the time the face image is initially detected with respect to the play starting date and time. The database management unit 223 continuously updates the information on the play ending date and time as long as the same face image is continuously detected within a predetermined time. When the face image is not continuously detected within the predetermined time, the database management unit 223 registers the clock time as the ending clock time. The database management unit 223 calculates the visiting frequency of the player managed by the face image based on the pieces of information on the play starting date and time and the play ending date and time. For example, the database management unit 223 registers the user rank as L when the latest visiting frequency is one day or less a week. The database management unit 223 registers the user rank as M when the latest visiting frequency is greater than one day a week and less than four days a week. The database management unit 223 registers the user rank as H when the latest visiting frequency is greater than or equal to five days a week.

In Step S27, the face image obtaining unit 221 determines whether the processing is performed to all the supplied face images. When the unprocessed face image exists, the flow returns to the processing in Step S22. That is, the pieces of processing in Steps S22 to S28 are repeated until the processing is performed to all the face images. When the face image obtaining unit 221 determines that the processing is performed to all the face images, the flow returns to the processing in Step S21.

On the other hand, when the top degree of similarity supplied by the similarity calculator 232 is not larger than the predetermined threshold in Step S25, namely, when the degree of similarity of the face image of the most similar registered player is less than the predetermined threshold, the flow goes to the processing in Step S28.

In Step S28, the similarity determination unit 233 supplies the face image, which is supplied from the image processing unit 39, to the database management unit 223. The database management unit 223 accesses the biological information DB 22, newly generates the face image data using the supplied face image, and registers the face image data. The database management unit 223 registers the play starting date and time, the play ending date and time, and the user rank while correlating the play starting date and time, the play ending date and time, and the user rank with the amusement machine identification number added to the face image.

Through the above pieces of processing, based on the face image supplied by the image processing unit 39, the biological information recognizer 21 can sequentially accumulate the amusement information in the biological information DB 22 in each face image of the player.

[Event Strategy Analysis Processing]

Figure 16:
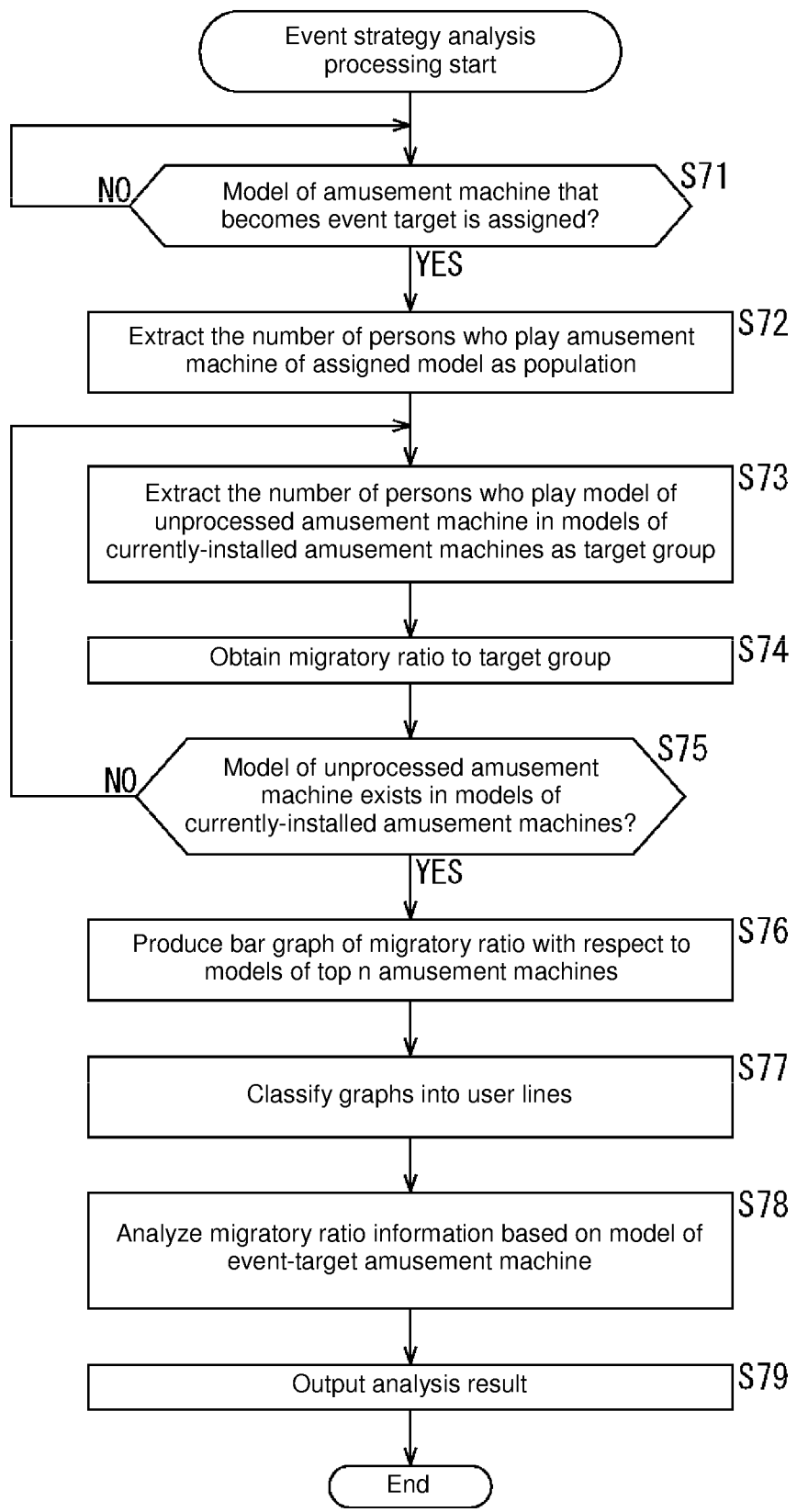
FIG. 16 is a flowchart illustrating event strategy analysis processing in the amusement shop sales support system in FIG. 1.

Event strategy analysis processing will be described below with reference to FIG. 16.

In Step S71, the migratory ratio calculator 251 determines whether the operation unit 254 is operated to perform the input to the model that becomes an event target candidate in the currently-installed amusement machines. The migratory ratio calculator 251 repeats the same processing in Step S71 until the input is performed. When the operation unit 254 is operated to perform the input to the model that becomes the event target candidate in the currently-installed amusement machines in Step S71, the flow goes to the processing in Step S72.

In Step S72, the population extraction unit 271 of the migratory ratio calculator 251 controls the communication unit 258 to access the amusement machine management DB 26 and the biological information DB 22, and extracts the number of players who play the model that becomes the event target candidate as the population of the migratory ratio. For example, in the case that the model "AA" is input as the model that becomes the event target candidate while the amusement machine management DB 26 is in the state in FIG. 13, the population extraction unit 271 searches "20100510000000000001" and "20100510000000000002" as the amusement machine identification number by which the model "AA" is registered. When the biological information DB 22 is in the state in FIG. 11, the population extraction unit 271 accesses the biological information DB 22 to search the face image data including the amusement information registered by the amusement machine identification numbers "20100510000000000001" and "20100510000000000002" from the pieces of amusement information, and stores the searched face image data as the amusement information of the population.

In Step S73, the target group extraction unit 272 of the migratory ratio calculator 251 sets the model of the unprocessed amusement machine 36 in the models of the currently-installed amusement machines 36 to the processing target model, searches the face image data in which the amusement information indicating the play of the processing target model is registered from the pieces of face image data that become the population, and extracts the face image data as the target group.

In Step S74, the migratory ratio calculation result output unit 273 calculates a ratio of the number of persons of the target group to the number of persons of the population as the migratory ratio, and outputs the migratory ratio.

In Step S75, the target group extraction unit 272 determines whether the model of the unprocessed amusement machine 36 in which the migratory ratio is not obtained exists in the models of the currently-installed amusement machines 36. When the model of the unprocessed amusement machine 36 in which the migratory ratio is not obtained exists, the flow returns to the processing in Step S73. That is, the pieces of processing in Steps S73 to S75 are repeated until the model of the unprocessed amusement machine 36 in which the migratory ratio is not obtained is eliminated in the models of the currently-installed amusement machines 36 except the model of the amusement machine 36 assigned as the population.

When the target group extraction unit 272 determines that the model of the unprocessed amusement machine 36 does not exist in Step S75, the flow goes to the processing in Step S76.

Figure 17:
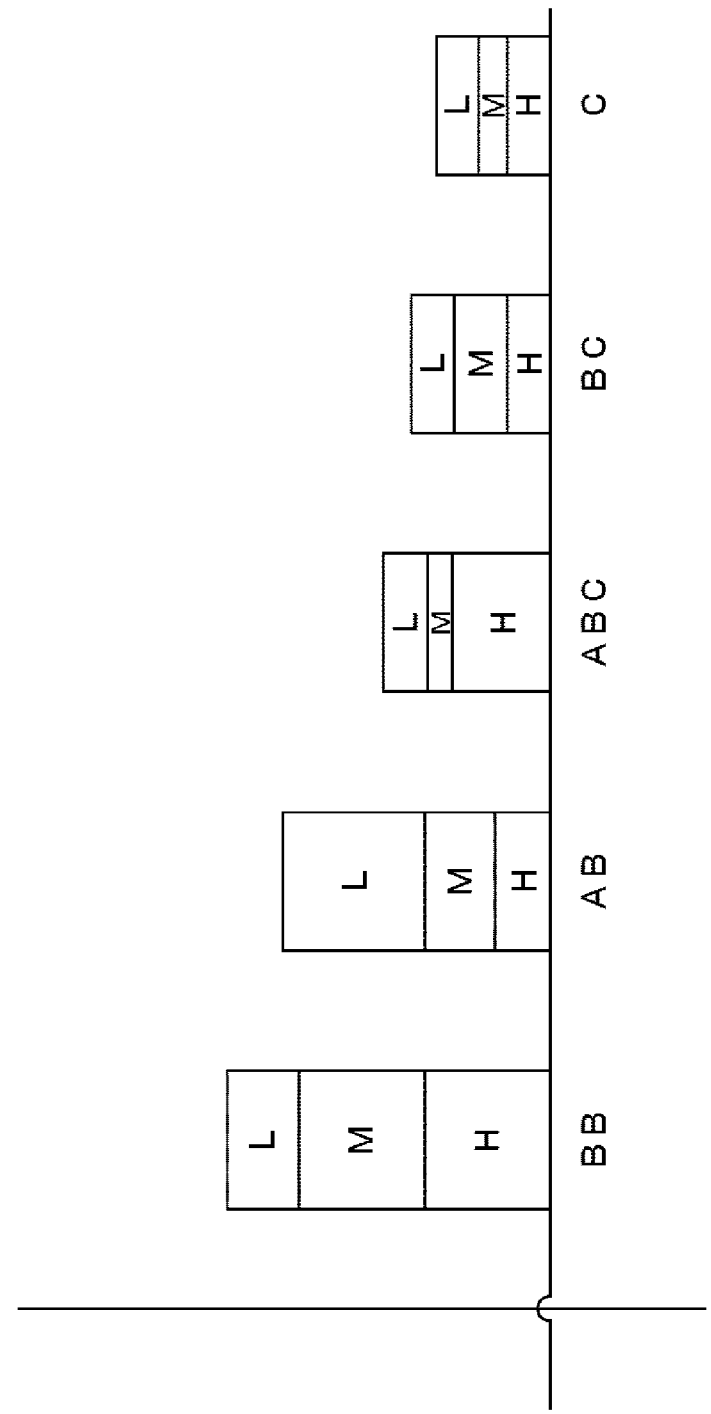
FIG. 17 is a view illustrating an analysis result of the event strategy analysis processing.

In Step S76, the migratory ratio distribution analyzer 252 obtains the orders of the migratory ratios based on the pieces of information on all the obtained migratory ratios, and generates bar graphs in FIG. 17 with respect to the top n migratory ratios while correlating the bar graphs with the models.

In Step S77, the migratory ratio distribution analyzer 252 classifies the generated bar graph of the migratory ratio into the user ranks in terms of the ratio of the number of persons. That is, in FIG. 17, the top five migratory ratios of the models BB, Aft ABC, BC, and C are illustrated as the bar graph from the left of the horizontal axis. The ratio of the user rank in the number of persons of the target group is illustrated in each bar graph, and the user rank includes the beginner indicated by L, the intermediate player indicated by M, and the advanced player indicated by H.

In Step S78, the migratory ratio distribution analyzer 252 analyzes the information obtained from the order of the migratory ratio in each model, and outputs the information on the model that should be the event target as an analysis result. In the case in FIG. 17, the player who plays the amusement machine 36 of the model "AA" tends to migrate to play the amusement machines 36 of the models "BB" and "AB". Therefore, for example, in the case that the event is held for the model "AA", the analysis result shows that the customers who have the same taste disperse in each model to possibly reduce customer attracting efficiency when the models "BB" and "AB" are also included in the target model. In FIG. 17, the analysis result also shows that, because the ratio of the advanced player having the high visiting frequency is high with respect to the model "ABC" although the migratory ratio is low, when the model "ABC" is also set to the event target model, possibly the players disperse while the player having the high visiting frequency can be collected in the event.

In Step S79, the migratory ratio distribution analysis result output unit 253 displays the obtained bar graph and analysis result information on the display unit 25.

Through the above pieces of processing, how the player who plays the specific model of the amusement machine installed in the amusement shop migrates to play the models except the specific model can be obtained as the migratory ratio. By way of example, the case where the model is specified was described. Alternatively, the migratory ratio in each specification of the model or the migratory ratio in each manufacturer of the model is obtained while the player who plays the specific model is set to the population, whereby the specification or the manufacturer of the model that the player who plays the specific model tends to migrate to play can be understood, and the model that should be adopted in the event or the model that should not be adopted in the event can be studied from the view point of the specification or the manufacturer. Not only the player who plays the amusement machine 36 of the specific model, but also the player who plays the amusement machine 36 of the specific specification or manufacturer may be set to the population.

By way of example, the migratory ratio is obtained with respect to the model, specification, or manufacturer of the amusement machine 36 with which the player plays the game in the amusement shop. For example, the migratory ratio is similarly obtained with respect to a beverage or a food in a stall, and which product is set to the event target or a bargain event can be studied. For example, the migratory ratio may similarly be obtained with respect to which kind of beverage a customer who frequently purchases an A beverage further frequently purchases. Therefore, a marketing strategy can be produced such that, for example, in the case that the customer who frequently purchases the A beverage also migrate to purchase a B beverage and a C beverage, a chance that the customer who frequently purchases the A beverage simultaneously purchases the B beverage and the C beverage can be provided by disposing the B beverage and the C beverage on a shelf adjacent to the A beverage.

For a travel agency, assuming that a tourist who goes on a journey to an A area is the population, the migratory ratio may be obtained with respect to which area except the A area the tourist of the population goes to. For example, assuming that the tourist who goes on the journey to the A area is the population, it is found that the migratory ratio is high in a B area when other travel destinations of the population is obtained as the migratory ratio in each area. In this case, a travel plan to the B area in addition to the A area is sent to the population by direct mail, wide variations of relatively high interesting travel plans can be presented to the tourist that becomes the population, and therefore the sales can be promoted.

[New Machine Replacement Model Analysis Processing]

Figure 18:
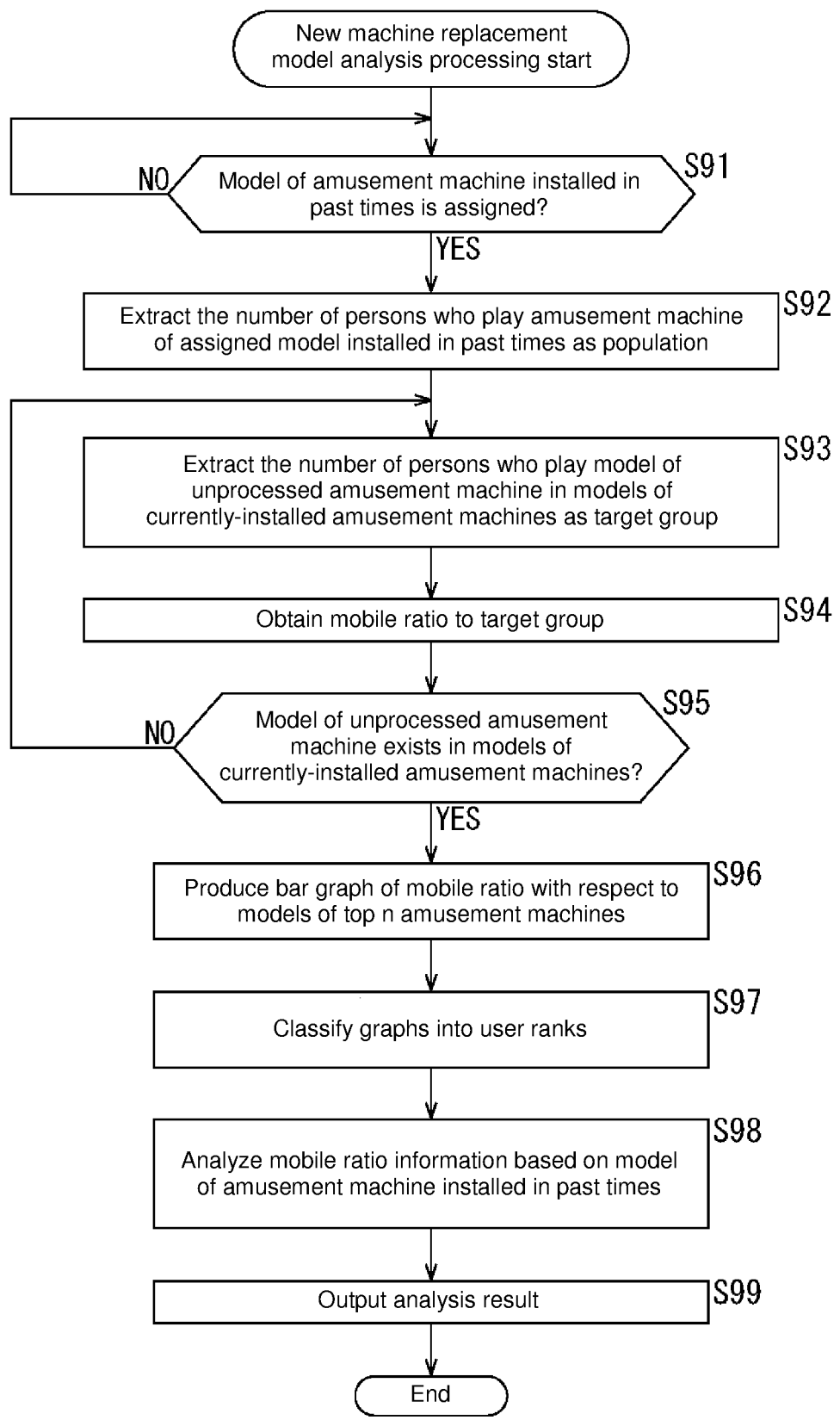
FIG. 18 is a flowchart illustrating new machine replacement model analysis processing in the amusement shop sales support system in FIG. 1.

New machine replacement model analysis processing will be described below with reference to a flowchart in FIG. 18.

In Step S91, the mobile ratio calculator 255 determines whether the operation unit 254 is operated to perform the input to the model (newly replaced), which was installed in past times and replaced by new another model of the amusement machine. The mobile ratio calculator 255 repeats the same processing in Step S91 until the input is performed. When the operation unit 254 is operated to perform the input to the newly-replaced model installed in past times in Step S91, the flow goes to the processing in Step S92.

In Step S92, the population extraction unit 281 of the mobile ratio calculator 255 controls the communication unit 258 to access the amusement machine management DB 26 and the biological information DB 22, and extracts the number of players who play the newly-replaced model as the population of the mobile ratio. For example, in the case that the model "B" is input as the model that becomes the event target candidate while the amusement machine management DB 26 is in the state in FIG. 13, the population extraction unit 281 searches "20100310201004100003" and "20100310201004100004" as the amusement machine identification number by which the model "B" is registered. When the biological information DB 22 is in the state in FIG. 11, the population extraction unit 281 accesses the biological information DB 22 to search the face image data including the amusement information registered by the amusement machine identification numbers "20100310201004100003" and "20100310201004100004" from the pieces of amusement information, and stores the searched face image data as the amusement information of the population.

In Step S93, the target group extraction unit 282 of the mobile ratio calculator 255 sets the model of the unprocessed amusement machine 36 in the models of currently-installed amusement machines 36 to the processing target model, searches the face image data in which the amusement information indicating the play of the processing target model is registered from the pieces of face image data that become the population, and extracts the face image data as the target group.

In Step S94, the mobile ratio calculation result output unit 283 calculates the ratio of the number of persons of the target group to the number of persons of the population as the mobile ratio, and outputs the mobile ratio.

In Step S95, the target group extraction unit 282 determines whether the model of the unprocessed amusement machine 36 in which the mobile ratio is not obtained exists in the models of the currently-installed amusement machines 36. When the model of the unprocessed amusement machine 36 in which the migratory ratio is not obtained exists, the flow returns to the processing in Step S93. That is, the pieces of processing in Steps S93 to S95 are repeated until the model of the unprocessed amusement machine in which the migratory ratio is not obtained is eliminated in the models of the currently-installed amusement machines.

When the target group extraction unit 282 determines that the model of the unprocessed amusement machine 36 does not exist in Step S95, the flow goes to the processing in Step S96.

In Step S96, the mobile ratio distribution analyzer 256 obtains the orders of the mobile ratios based on the pieces of information on all the obtained mobile ratios, and generates bar graphs similar to those in FIG. 17 with respect to the top n mobile ratios while correlating the bar graphs with the models.

In Step S97, the mobile ratio distribution analyzer 256 classifies the generated bar graph of the mobile ratio into the user ranks in terms of the ratio of the number of persons. Because this is identical to that in FIG. 17, the description is omitted.

In Step S98, the mobile ratio distribution analyzer 256 analyzes the information obtained from the order of the migratory ratio in each model, and outputs the information indicating which amusement machine the player who played the model, which was installed in past times and already replaced, moves to play as the analysis result. That is, in FIG. 17, it is shown that the player who plays the amusement machine 36 of the model B moves to the amusement machines 36 of the models "BB" and "AB". Therefore, when the mobile ratio is maintained with respect to the models "BB" and "AB", it can be recognized that the player does not move to another store even if the model "B" is replaced. In FIG. 17, the analysis result also shows that, because the ratio of the advanced player having the high visiting frequency is high with respect to the model "ABC" although the mobile ratio is low, the player having the high visiting frequency in the players who play the model "BB" does not defect from the amusement shop by keeping the model "ABC" unchanged.

In Step S99, the mobile ratio distribution analysis result output unit 257 displays the obtained bar graph and analysis result information on the display unit 25.

Through the above pieces of processing, which model the player who played the specific model of the amusement machine installed in the amusement shop moves to play can be obtained as the mobile ratio after the specific model is removed. By way of example, the case where the model is specified was described. Alternatively, the mobile ratio in each specification of the model or the mobile ratio in each manufacturer of the model is obtained while the player who plays the specific model is set to the population, whereby the specification or the manufacturer of the model that the player who plays the specific model tends to move to play can be understood, and the model that should be replaced or the model that should not be replaced can be studied from the view point of the specification or the manufacturer. Not only the player who plays the amusement machine 36 of the specific model, but also the player who plays the amusement machine 36 of the specific specification or manufacturer, which is installed in past times, may be set to the population.

By way of example, the mobile ratio is obtained with respect to the model, specification, or manufacturer of the amusement machine 36 with which the player plays the game in the amusement shop. For example, the mobile ratio is similarly obtained with respect to the beverage or the food in the stall, and which product should be sold as a substitute product can be studied using the mobile ratio when a specific product is eliminated. For example, when the A beverage is eliminated, the mobile ratio may similarly be obtained with respect to which kind of beverage the customer who frequently purchases the A beverage frequently purchases. Therefore, the marketing strategy can be produced such that, for example, in the case that the customer who frequently purchases the A beverage moves to purchase the B beverage and the C beverage after the sales of the A beverage is terminated, the chance that the customer who purchases the A beverage purchases the B beverage and the C beverage can be provided to increase the sales by disposing the B beverage and the C beverage in the same position after the A beverage is removed from the shelf.

For the travel agency, assuming that the tourist who went on the journey to the A area, which was planned in past times, is the population, the mobile ratio may be obtained with respect to which area the tourist of the population goes to after the plan is terminated. For example, assuming that the tourist who goes on the journey to the A area, which is planned in past times, is the population, it is found that the mobile ratio is high in the B area when other travel destinations of the population is obtained as the mobile ratio in each area. In this case, the travel plan to the B area instead of the A area is sent to the population by direct mail, relatively high interesting travel plans can be presented to the tourist that becomes the population, and therefore the sales can be promoted.

By way of example, the amusement shop sales support system is constructed by the plural devices. It is not necessary that the amusement shop sales support system be constructed by the individual devices. For example, the biological information recognizer 21 and the amusement shop management device 24 may be constructed as an information processing apparatus that acts as both the biological information recognizer 21 and the amusement shop management device 24, or the whole amusement shop sales support system may be constructed by one device.

2. Second Embodiment

Configuration Example of Dealer Sales Support System

In the first embodiment, the mobile ratio and the migratory ratio are obtained with respect to the amusement machine in the amusement shop based on the configuration example of the amusement shop sales support system. However, the sales support system based on the mobile ratio and the migratory ratio may be aimed at other fields except the amusement shop. For example, the sales support system may be used in a product in a dealer instead of the amusement machine in the amusement shop.

Figure 19:
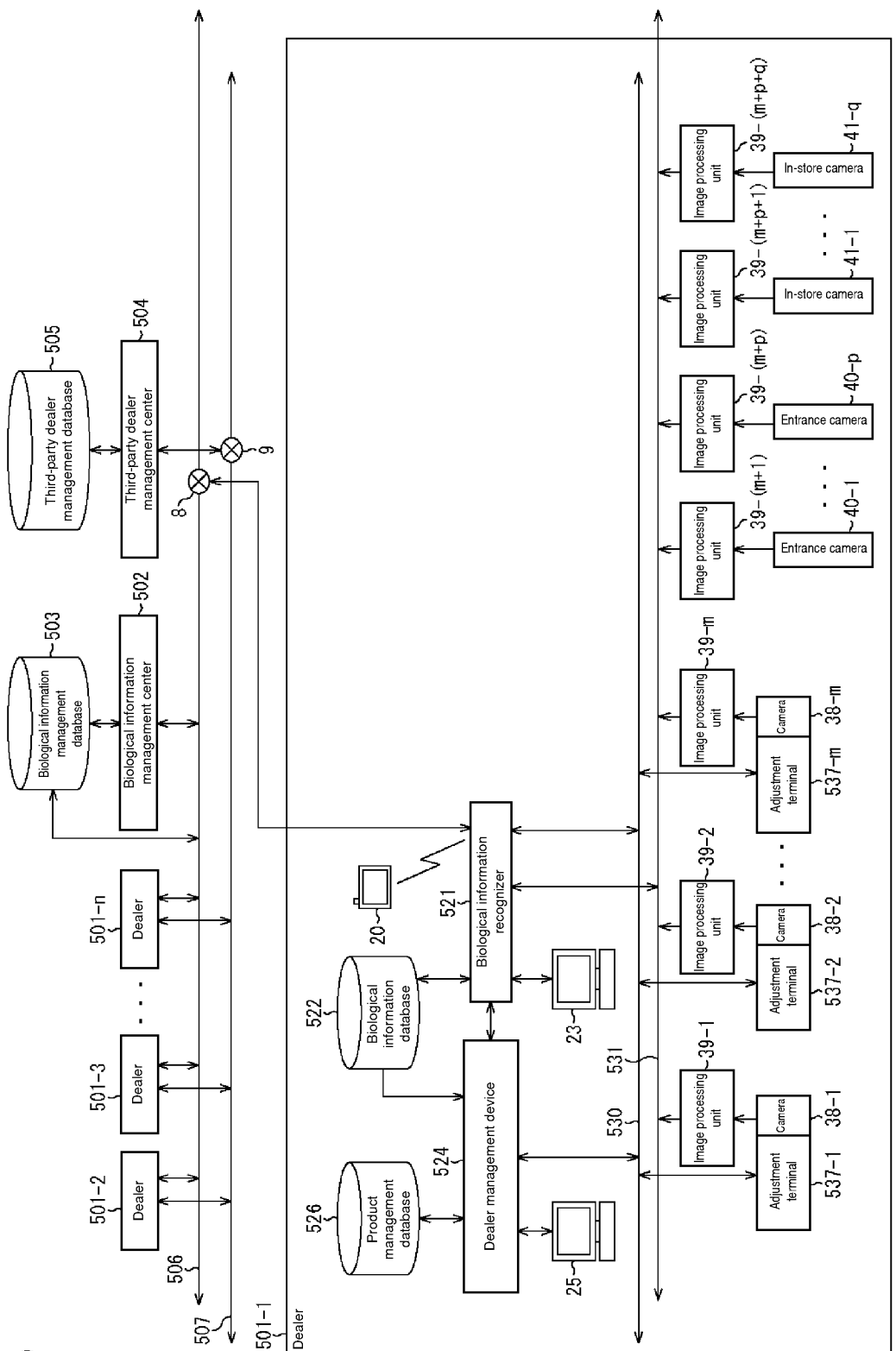
FIG. 19 is a view illustrating a configuration example of a dealer sales support system according to an embodiment.

FIG. 19 is a view illustrating a configuration of a dealer sales support system according to an embodiment of the present invention. In FIG. 19, the configuration including the same function as that in FIG. 1 is designated by the same numeral, and the description is omitted as appropriate. The dealer sales support system in FIG. 19 includes a dealer 501 to a third-party dealer management bus 507, a biological information recognizer 521, a biological information DB 522, a dealer management device 524, a product management DB 526, a dealer management information bus 530, a biological information bus 531, and an adjustment terminal 537 instead of the amusement shops 1 to the third-party amusement shop management bus 7, the biological information recognizer 21, the biological information DB 22, the amusement shop management device 24, the amusement machine management DB 26, the amusement shop management information bus 30, the biological information bus 31, and the amusement machine peripheral terminal 37. The medium lending management device 27 to the medium lending management DB 29 and the adjustment/vending machine 33 to the counter 35 are eliminated in the dealer sales support system.

Dealers 501-1 to 501-n are retail dealers, such as what is called a convenience store. The dealers 501-1 to 501-n are also affiliated stores or member stores of a biological information management center or a third-party dealer management center. In the dealers 501-1 to 501-n, plural stores need to be integrally managed. The dealers 501-1 to 501-n are connected to one another by the biological information management bus 506 and the third-party dealer management bus 507. The dealers 501-1 to 501-n transmit and receive the biological information and third-party sales management information to and from one another through the buses 506 and 507 and the public communication line networks 8 and 9 typified by the Internet.

The biological information management bus 506 is identical to the biological information management bus 6, and acts as a transmission line through which the biological information mainly managed by the biological information recognizer 521 of each dealer 501 flows. The third-party dealer management bus 507 acts as a transmission line through which the sales management information mainly managed by the adjustment terminal 537 of each dealer 501 flows.

The biological information management center 502 corresponds to the biological information management center 2, and is a server that is used by a business operator who manages and operates the biological information management center.

The third-party dealer management center 504 corresponds to the third-party amusement shop management center 4, and is a server that is used by a business operator who manages and operates the third-party dealer management center.

The biological information recognizer 521 corresponds to the biological information recognizer 21, and matches the information on the face image, which is extracted from images captured by the cameras 38-1 to 38-m, the entrance cameras 40-1 to 40-p, and the in-store cameras 41-1 to 41-q by the image processing units 39-1 to 39-(m+p+q) and supplied through the biological information bus 531, against the face image previously registered in a biological information DB 522. The cameras 38-1 to 38-m are provided in a checkout counter in order to capture the image of the purchaser who checks out in purchasing the product of the dealer 501. When the face images matched with each other, a visit of a registered person or sales information is added to the biological information DB 522 to update the biological information DB 522, and various pieces of information are displayed on the display unit 23 including the CRT (Cathode Ray Tube) or the LCD (Liquid Crystal Display) as needed basis.

The dealer management device 524 corresponds to the amusement shop management device 24, and monitors the purchase of the product and a kind of the product using the adjustment terminal 537 through the dealer management information bus 530. The dealer management device 524 obtains pieces of sales information, such as the kind of the purchases product and a purchased amount, from the adjustment terminal 537, and displays the sales information on the display unit 25 including the CRT or the LCD. Using the product management DB 526, the dealer management device 524 manages the sales information on the product, which is supplied from each of the adjustment terminals 537-1 to 537-m, while correlating the sales information with identification information identifying each of them (for example, a product identification number). Pieces of information on a trade name, a category, and a manufacturer of the product are registered in the product management DB 526 while correlated with the product identification number.

The adjustment terminals 537-1 to 537-m correspond to the amusement machine 36 and the amusement machine peripheral terminal 37. In the adjustment, the adjustment terminals 537-1 to 537-m read the product identification information identified by a barcode or a QR code, which is added to each product, calculates and present an adjustment amount, performs a change amount and credit card payment, and issues a receipt as needed basis. The camera 38, which is installed while corresponding to the adjustment terminal 537, obtains the pieces of biological information, such as the face image of the purchaser who purchases the product, and transmits the pieces of biological information to the biological information recognizer 521 from the corresponding image processing unit 39 together with the product identification information (the product identification number).

[Configuration Example of Biological Information Recognizer in Dealer Sales Support System in FIG. 19]

Figure 20:
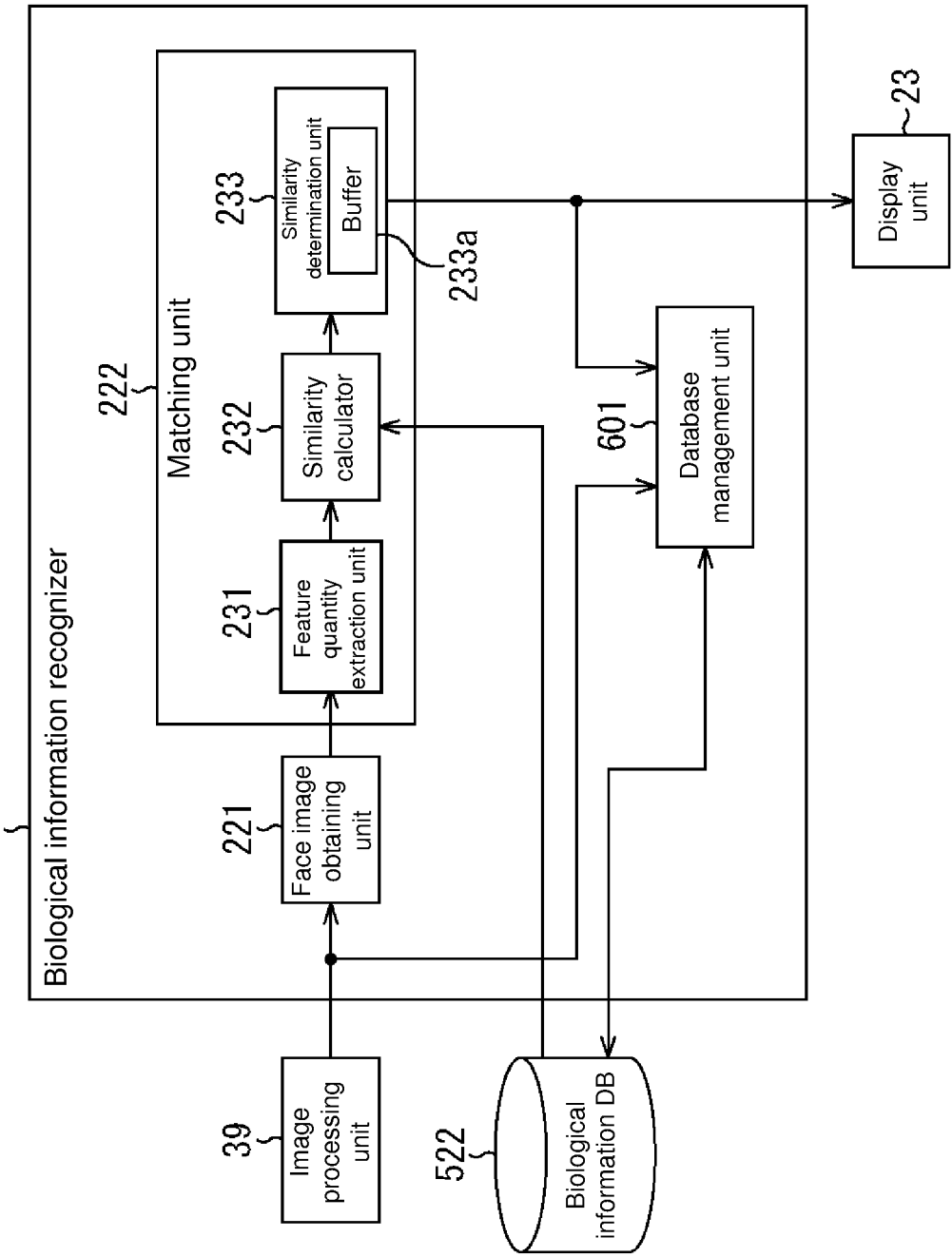
FIG. 20 is a view illustrating a configuration example of a biological information recognizer in FIG. 19.

A configuration example of the biological information recognizer 521 will be described below with reference to FIG. 20. In FIG. 20, the same configuration including the same function as the biological information recognizer 21 in FIG. 10 is designated by the same numeral, and the description is omitted. The biological information recognizer 521 in FIG. 20 differs from the biological information recognizer 21 in FIG. 10 in that a database management unit 601 is provided instead of the database management unit 223.

The database management unit 601 registers a clock time at which the person having the face image purchases the product (a clock time at which the face image is obtained) and the product identification information identifying the purchased product in the biological information DB 522.

Figure 21:
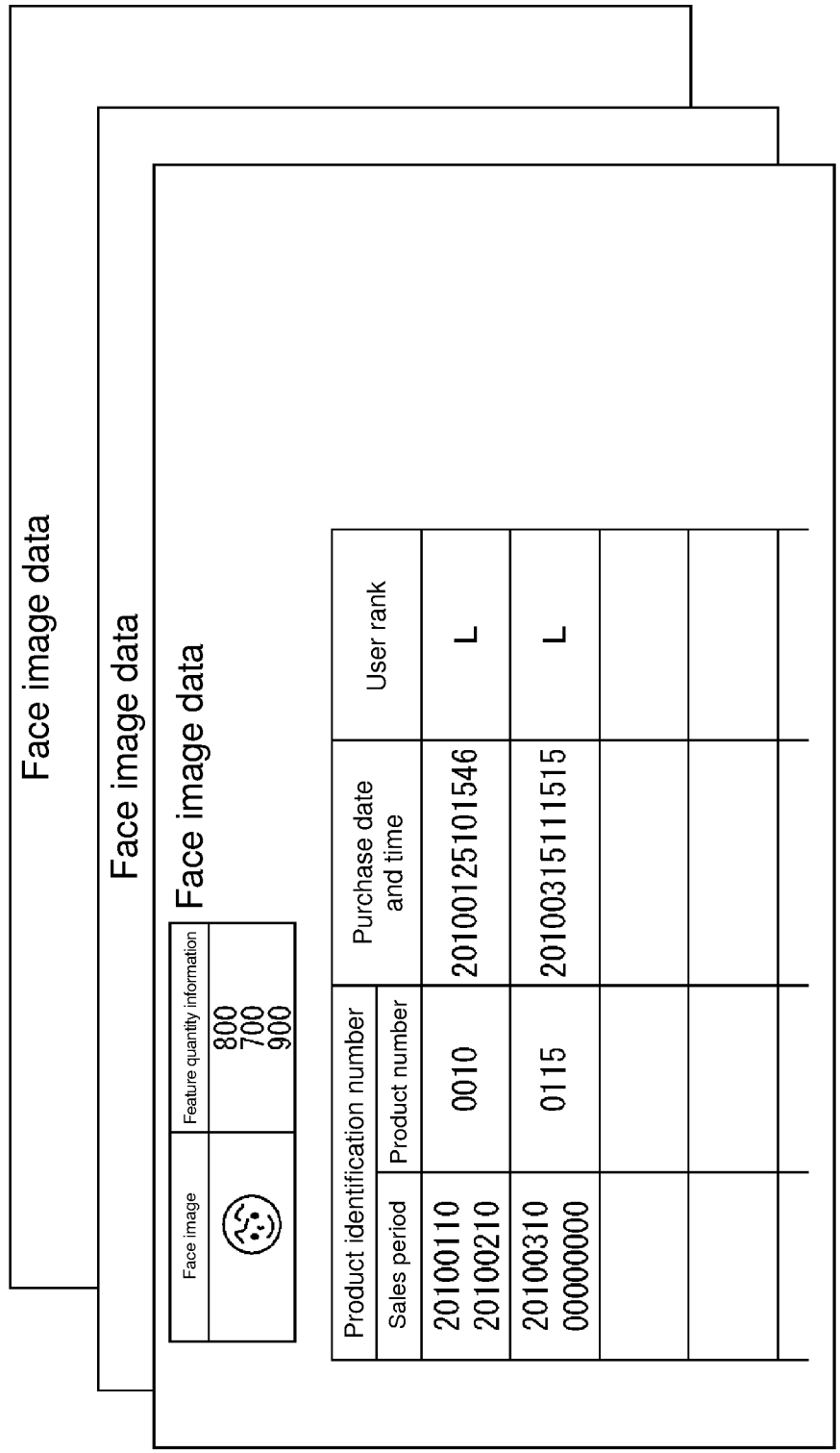
FIG. 21 is a view illustrating a configuration example of a biological information database in FIG. 19.

[Configuration Example of Biological Information Database in Dealer Sales Support System in FIG. 21]

A configuration example of the biological information database 522 will be described below with reference to FIG. 21.

As illustrated in FIG. 21, the biological information DB 522 is a database including sheet-like face image data managed in each face image, and the database management unit 601 registers the sales information on the person having the face image while correlating the sales information with the face image. Each sheet including the face image data, feature quantity information is registered in a feature quantity information field while correlated with the face image registered in a face image field. A product identification number field, a purchase date and time field, and a user rank field are also provided in the biological information DB 522. The product identification number, purchase date and time of the product, and the user rank that is set based on the visiting frequency to the dealer 501 are registered in the product identification number field, the purchase date and time field, and the user rank field, respectively. The database management unit 601 registers the face image obtained by the face image obtaining unit 221 in the face image field. The database management unit 601 registers the product identification number, which is supplied together with the face image, in the product identification number field. The product identification number is information specifying the product purchased by the person in which the face image is supplied, and the product identification number is registered in the product identification number field. The product identification number includes a sales period during which the purchased product is sold and a product number managed by the barcode and the like. The sales period and the product number are recorded in the sales period field and the product number field, respectively.

For example, the sales periods are "20100110201002100010" and "20100310000000000115" as illustrated in the top stage and the second stage in FIG. 21. The product identification number of the top stage indicates the product, which is sold from Jan. 10, 2010 to Feb. 10, 2010 and identified by the product number "0010". That is, in "20100110201002100010", the starting time of the sales period is "20100110", the ending time is "20100210", and the product number is "0010".

For the product identification number of the second stage, in "20100310000000000115", the starting time of the sales period is "20100110", the ending time is "00000000", and the product number is "0115". The ending time "00000000" indicates that the product is currently sold and that the ending time is not set. That is, the product identification number of the second stage indicates that the product is currently sold since Mar. 10, 2010 and identified by the product number "0115".

The information on the purchase date and time indicating the clock time, at which the person identified by the face image purchases the product assigned by the product identification number, is recorded in the purchase date and time field. In FIG. 21, "20100125101546" and "20100315111515" are recorded in the top stage and the second stage of the purchase date and time field. That is, the top stage in FIG. 21 indicates that the person identified by the face image purchases the product having the product identification number "20100110201002100010" at 10:15:46 on Jan. 25, 2010. The second stage in FIG. 21 indicates that the person identified by the face image purchases the product having the product identification number "20100310000000000115" at 11:15:15 on Mar. 15, 2010.

The user rank is indicated on a scale of H (Heavy), M (Middle), and L (Light) according to the visiting frequency of the purchaser identified by the face image, and the user rank is recorded in the user rank field. When updating the face image data, the database management unit 601 records the user rank as L in the initial state. After that, the database management unit 601 calculates the visiting frequency from the information on the purchase date and time. The database management unit 601 records the user rank as M when the visiting frequency is higher than a predetermined frequency, and the database management unit 601 records the user rank as H when the visiting frequency is further higher. On the other hand, when the visiting frequency decreases, the database management unit 601 changes the user rank from H to M or from M to L.

[Configuration Example of Dealer Management Device in Dealer Sales Support System in FIG. 19]

Figure 22:
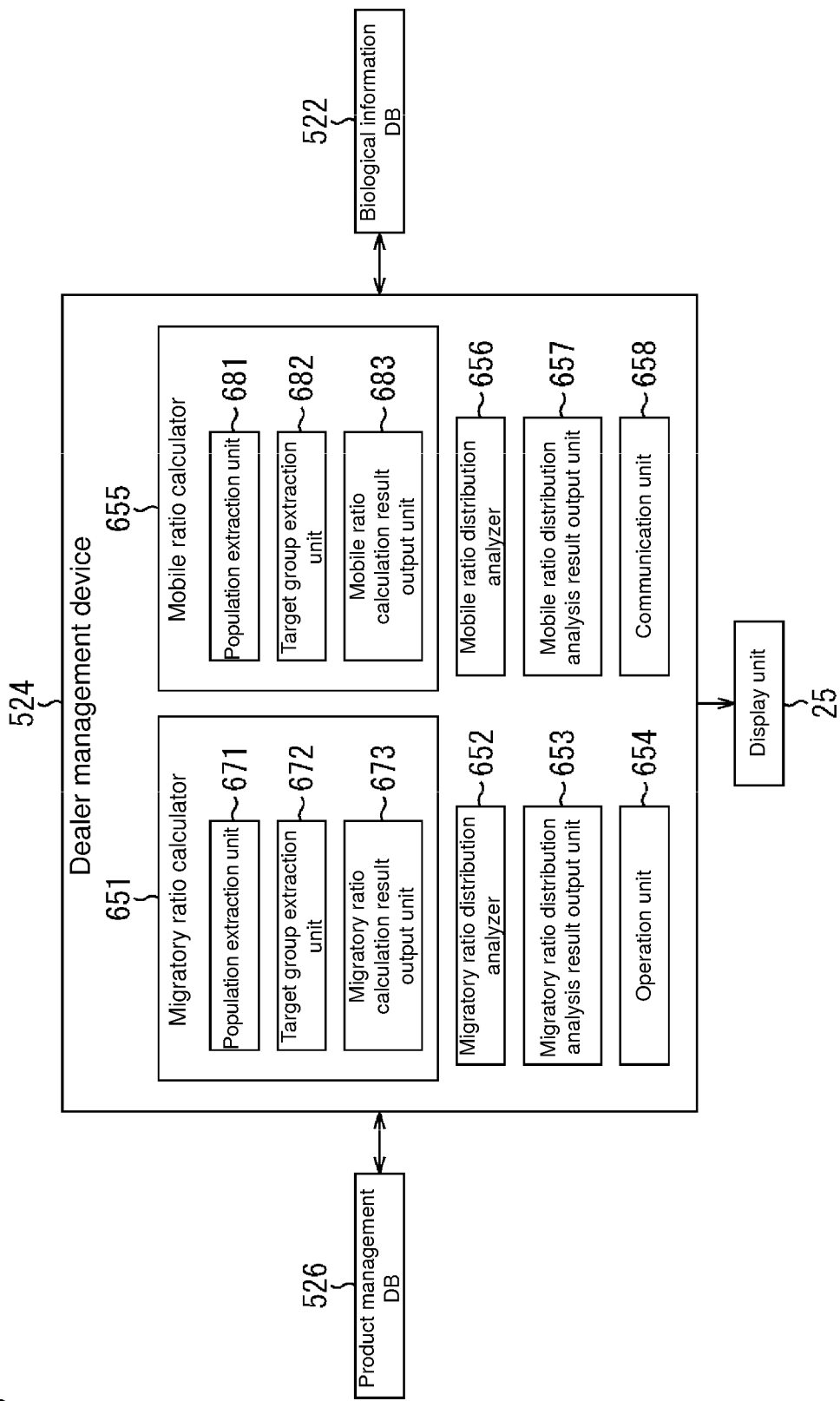
FIG. 22 is a view illustrating a configuration example of a dealer management device in FIG. 19.

A configuration example of the dealer management device 524 will be described below with reference to FIG. 22.

The dealer management device 524 corresponds to the amusement shop management device 24. The dealer management device 524 obtains the migratory ratio and the mobile ratio with the purchasers who purchase the specific product as the population from the face image data registered in the biological information DB 522 and the individual information on the product registered in the product management DB 526, and provides the sales support information.

More particularly, the dealer management device 524 specifies the currently-sold product by the trade name, the category, and the manufacturer of the product, and calculates the migratory ratio indicating a ratio at which the purchaser who purchases the specified product migrates to other products in each of other products. The dealer management device 524 specifies the product, which is not currently sold but sold in past times, by the trade name, the category, and the manufacturer of the product, and calculates the mobile ratio indicating a ratio at which the purchaser who purchased the specified product moves to other currently-sold products in each of other currently-sold products. The dealer management device 524 analyzes the migratory ratio or the mobile ratio in each product, and provides the sales support information based on the analysis result.

The dealer management device 524 includes a migratory ratio calculator 651, a migratory ratio distribution analyzer 652, a migratory ratio distribution analysis result output unit 653, an operation unit 654, a mobile ratio calculator 655, a mobile ratio distribution analyzer 656, a mobile ratio distribution analysis result output unit 657, and a communication unit 658.

The migratory ratio calculator 651 includes a population extraction unit 671, a target group extraction unit 672, and a migratory ratio calculation result output unit 673, and calculates the migratory ratio. The population extraction unit 671 extracts the information on the number of persons of the population necessary for the calculation of the migratory ratio. More specifically, when the operation unit 654 including a keyboard and an operating button is operated to input the trade name, the category, or the manufacturer as the information specifying the product, which is currently sold in the dealer and purchased by the person who becomes the population, the population extraction unit 671 accesses the product management DB 526 to specify the product identification number of the currently-sold product, which should be specified, based on the input information. Based on the specified product identification number, the population extraction unit 671 accesses the biological information DB 522 to extract the face image data in which the sales information indicating the purchase of the product having the specified product identification number is recorded, and obtains the number of persons who become the population from the number of pieces of extracted face image data.

The target group extraction unit 672 extracts the face image data including the sales information indicating the purchase in each of the currently-sold products except the specified product in the population necessary to obtain the migratory ratio, and obtains the number of pieces of face image data as the number of persons of the target group.

The migratory ratio calculation result output unit 673 calculates the ratio of the target group to the population as the migratory ratio in each product by dividing the number of persons of the target group by the number of persons of the population.

The migratory ratio distribution analyzer 652 collects the calculation results of the migratory ratio, which is obtained in each product, and obtains a distribution of the products. For example, the migratory ratio distribution analyzer 652 extracts pieces of information on the top n products, and generates the sales support information as the analysis result based on the trend of the pieces of information.

The migratory ratio distribution analysis result output unit 653 generates a graph indicating the migratory ratio information in each of the products collected by the migratory ratio distribution analyzer 652, and displays the graph on the display unit 25 together with the analysis result of the migratory ratio distribution analyzer 652.

The mobile ratio calculator 655 includes a population extraction unit 681, a target group extraction unit 682, and a mobile ratio calculation result output unit 683, and calculates the mobile ratio. The population extraction unit 681 extracts the information on the number of persons of the population necessary for the calculation of the mobile ratio. More specifically, when the operation unit 654 including the keyboard and the operating button is operated to input the trade name, the category, or the manufacturer as the information specifying the product, which was sold in past times in the dealer and purchased by the person who becomes the population, the population extraction unit 681 accesses the product management DB 526 to specify the product identification number of the product, which was sold in past times and should be specified, based on the input information. Based on the specified product identification number, the population extraction unit 681 accesses the biological information DB 522 to extract the face image data in which the sales information indicating the purchase of the product having the specified product identification number is recorded, and obtains the number of persons who become the population from the number of pieces of extracted face image data.

The target group extraction unit 682 extracts the face image data including the sales information indicating the purchase in each of the currently-sold products except the specified product in the population necessary to obtain the migratory ratio, and obtains the number of pieces of face image data as the number of persons of the target group.

The mobile ratio calculation result output unit 683 calculates the ratio of the target group to the population as the mobile ratio in each product by dividing the number of persons of the target group by the number of persons of the population.

The mobile ratio distribution analyzer 656 collects the calculation results of the mobile ratio, which is obtained in each product, and obtains a distribution of the products. For example, the mobile ratio distribution analyzer 656 extracts the pieces of information on the top n products, and generates the sales support information as the analysis result based on the trend of the pieces of information.

The mobile ratio distribution analysis result output unit 657 generates a graph indicating the mobile ratio information in each of the products collected by the mobile ratio distribution analyzer 656, and displays the graph on the display unit 25 together with the analysis result of the mobile ratio distribution analyzer 656.

For example, the communication unit 658 is constructed by an Ethernet board. The communication unit 658 conducts communication with the biological information recognizer 521, the amusement machine management DB 526, and the biological information DB 522 to transmit and receive various pieces of information to and from these units.

[Configuration Example of Product Management Database in Dealer Sales Support System in FIG. 19]

A configuration example of the product management database 526 will be described below with reference to FIG. 23.

The pieces of information on the products, such as the trade name, the category, and the manufacturer of the currently-sold product or the product sold in past times, are recorded in the product management DB 526 based on the product identification number.

Because the product identification number is identical to that of the biological information DB 522 in FIG. 21, the description is omitted. The individual trade name of the product is registered in a trade name field. The category of the product is recorded in a category field. For example, "food" indicating something to eat and "drink" indicating something to drink are recorded in the category field. Information indicating category except the categories in FIG. 23 may be recorded. Information on the manufacturer of the product is recorded in a manufacturer field. Accordingly, in the product having the product identification numbers "20100310201004100001" and "20100310201004100002" in FIG. 23, the trade name is "C", the category is "food", and the manufacturer is "0". In the product having the product identification numbers "20100310201004100003" and "20100310201004100004", the trade name is "D", the category is "food", and the manufacturer is "0". In the product having the product identification numbers "20100510000000000001" and "20100510000000000002", the trade name is "CC", the category is "drink", and the manufacturer is "R".

[Sales Information Management Processing in Dealer Sales Support System in FIG. 19]

Figure 24:
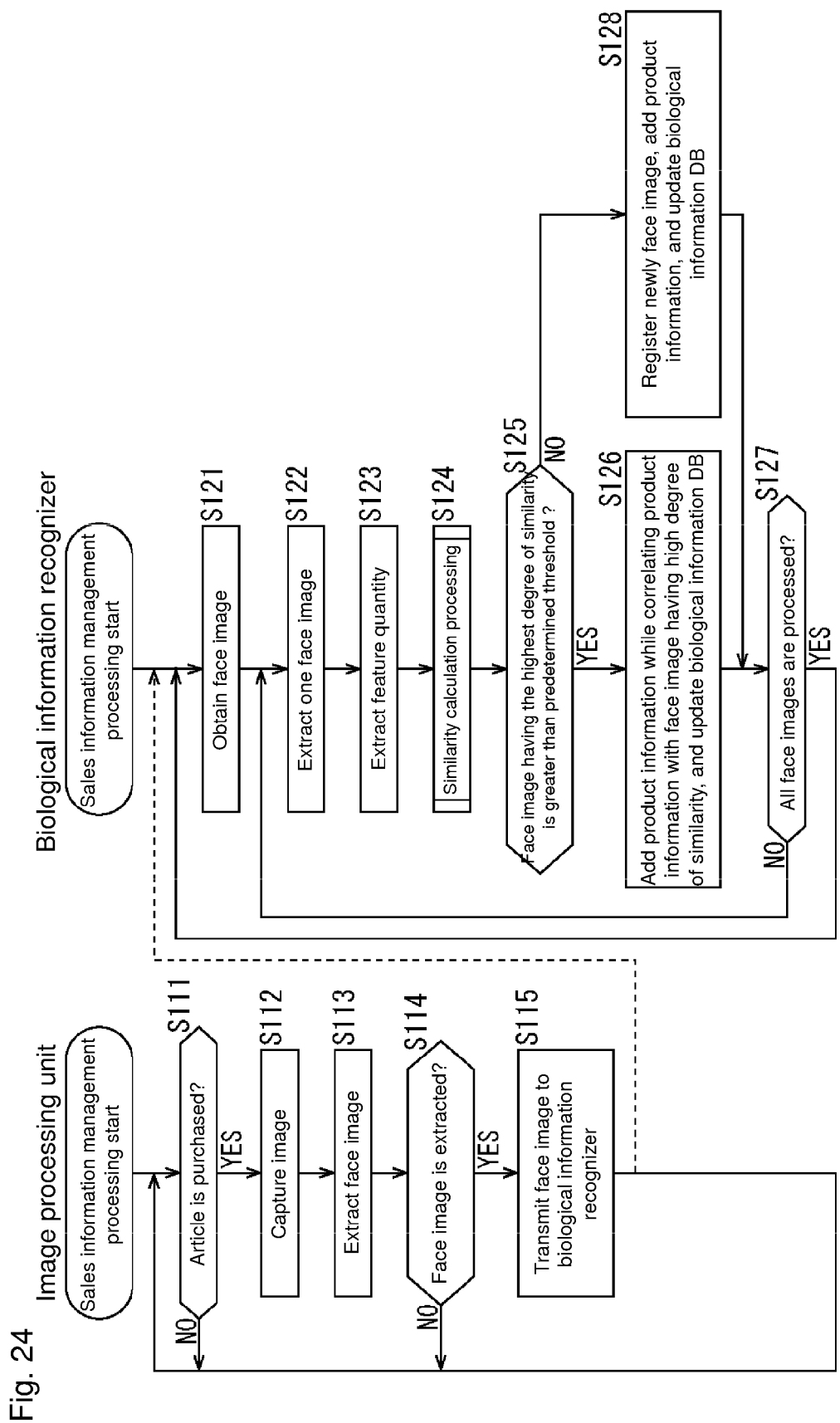
FIG. 24 is a flowchart illustrating sales information management processing.

Sales information management processing will be described below with reference to a flowchart in FIG. 24. Because the pieces of processing in Steps S112 to S115 and Steps S121 to S125 and S127 are identical to those in Steps S1 to S4 and Steps S21 to S25 and S27 in FIG. 14, the description is omitted.

In Step S111, the adjustment terminal 537 determines whether the product brought over to the checkout counter by the customer is purchased by reading the barcode of the product. The adjustment terminal 537 repeats the same processing in Step S111 until the product is purchased. When the customer brings over the product to the checkout counter to read the barcode of the product in Step S111, the processing goes to Step S112. The face image is obtained through the processing in Step S112, and the face image is transmitted to the biological information recognizer 521. In Step S115, the transmitter 203 transmits the face image to the biological information recognizer 521 while adding the product identification number identifying the product and the information on the transmission clock time (the image capturing clock time) to the face image.

In Steps S121 to S125, the degree of similarity between the supplied face image and the registered face image is obtained to perform the matching.

When determining that the top degree of similarity is larger than a predetermined threshold in Step S125, the similarity determination unit 233 supplies the top face image to the database management unit 601 in Step S126. The database management unit 601 accesses the biological information DB 522 to search the face image data managed in association with the supplied face image. The database management unit 601 registers the purchase date and time and the user rank while correlating the purchase date and time and the user rank with the product identification number added to the face image. At this point, the database management unit 601 registers the time the face image is initially detected with respect to the purchase date and time. The database management unit 601 calculates and registers the visiting frequency of the purchaser managed by the face image based on the information on the purchase date and time.

On the other hand, when the top degree of similarity supplied by the similarity calculator 232 is not larger than the predetermined threshold in Step S125, namely, when the degree of similarity of the face image of the most similar registered person is less than the predetermined threshold, the flow goes to the processing in Step S128.

In Step S128, the similarity determination unit 233 supplies the face image, which is supplied from the image processing unit 39, to the database management unit 601. The database management unit 601 accesses the biological information DB 522, newly generates the face image data using the supplied face image, and registers the face image data. The database management unit 601 registers the purchase date and time and the user rank while correlating the purchase date and time and the user rank with the product identification number added to the face image.

Through the above pieces of processing, based on the face image supplied by the image processing unit 39, the biological information recognizer 521 can sequentially accumulate the sales information in the biological information DB 522 in each face image of the purchaser.

[Event Strategy Analysis Processing in Dealer Sales Support System in FIG. 19]

Figure 25:
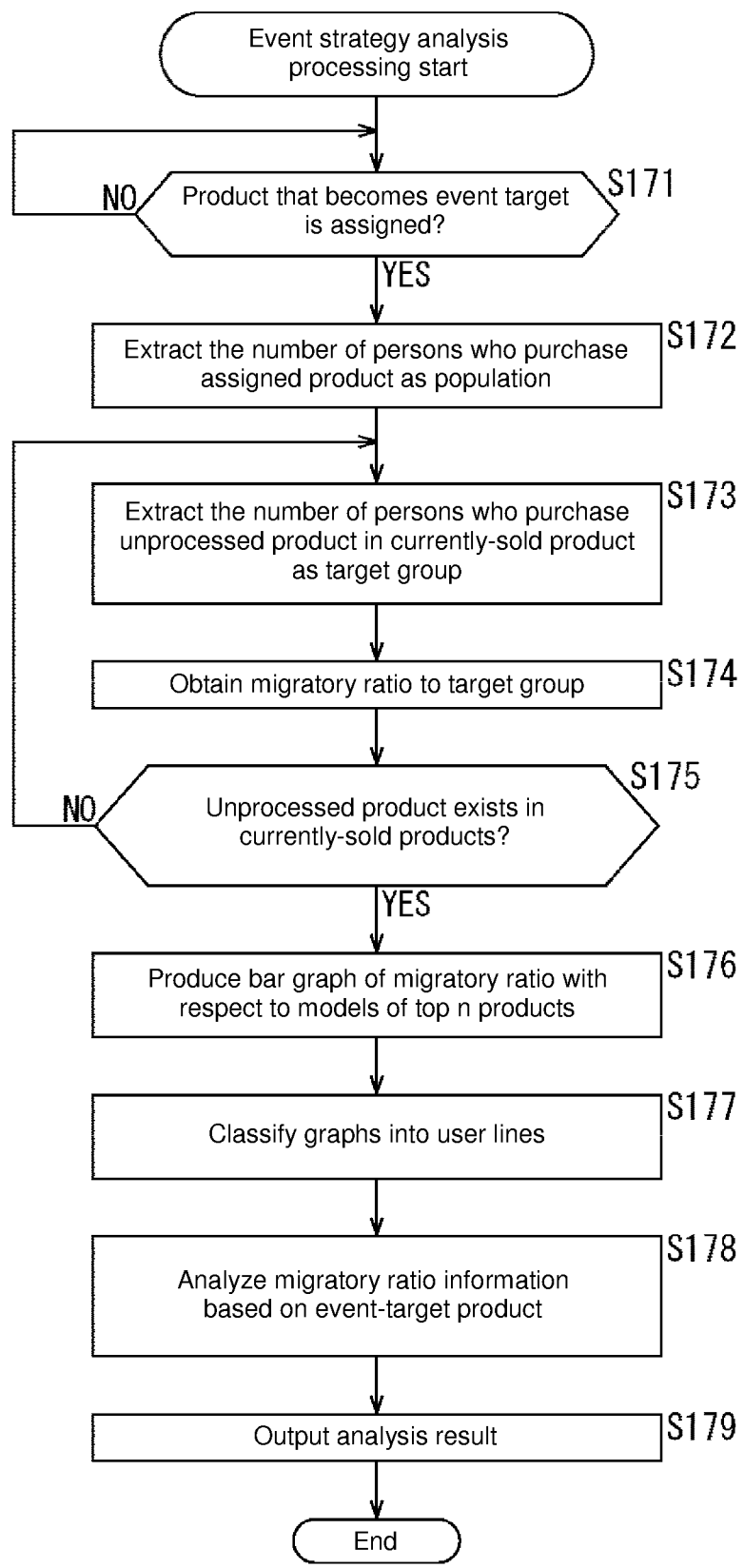
FIG. 25 is a flowchart illustrating event strategy analysis processing in the dealer sales support system in FIG. 19.

Event strategy analysis processing will be described below with reference to a flowchart in FIG. 25.

In Step S171, the migratory ratio calculator 651 determines whether the operation unit 654 is operated to perform the input of the currently-sold product that becomes an event target candidate. The migratory ratio calculator 651 repeats the same processing in Step S171 until the input is performed. When the operation unit 654 is operated to perform the input of the currently-sold product that becomes the event target candidate in Step S171, the flow goes to the processing in Step S172.

In Step S172, the population extraction unit 671 of the migratory ratio calculator 651 controls the communication unit 658 to access the product management DB 526 and the biological information DB 522, and extracts the number of purchasers who purchase the product that becomes the event target candidate as the population of the migratory ratio.

In Step S173, the target group extraction unit 672 of the migratory ratio calculator 651 sets the unprocessed product in the currently-sold products to the processing target product, searches the face image data in which the sales information indicating the purchase of the processing target product is registered from the pieces of face image data that become the population, and extracts the face image data as the target group.

In Step S174, the migratory ratio calculation result output unit 673 calculates a ratio of the number of persons of the target group to the number of persons of the population as the migratory ratio, and outputs the migratory ratio.

In Step S175, the target group extraction unit 672 determines whether the unprocessed product in which the migratory ratio is not obtained exists in the currently-sold products. When the unprocessed product in which the migratory ratio is not obtained exists, the flow returns to the processing in Step S173. That is, the pieces of processing in Steps S173 to S175 are repeated until the unprocessed product in which the migratory ratio is not obtained is eliminated in the currently-sold products except the product assigned as the population.

When the target group extraction unit 672 determines that the unprocessed product does not exist in Step S175, the flow goes to the processing in Step S176.

In Step S176, the migratory ratio distribution analyzer 652 obtains the orders of the migratory ratios based on the pieces of information on all the obtained migratory ratios, and generates bar graphs with respect to the top n migratory ratios while correlating the bar graphs with the products.

In Step S177, the migratory ratio distribution analyzer 652 classifies the generated bar graph of the migratory ratio into the user ranks in terms of the ratio of the number of persons.

In Step S178, the migratory ratio distribution analyzer 652 analyzes the information obtained from the order of the migratory ratio in each product, and outputs the information on the product that should be the event target as the analysis result. In the case that the kind of the product is considered instead of the model of the amusement machine, assuming that the purchaser who purchases the specific product "AA" in FIG. 17 is the population, the purchaser who purchases the product "AA" tends to migrate to purchase the products "BB" and "AB". Therefore, for example, in the case that the event is held for the model "AA", the analysis result shows that the customers who have the same taste disperse in each product to possibly reduce the customer attracting efficiency when the products "BB" and "AB" are also included in the target product. In FIG. 17, the analysis result also shows that, because the ratio of the purchaser having the high visiting frequency is high with respect to the product "ABC" although the migratory ratio is low, when the product "ABC" is also set to the event target model, possibly the purchasers disperse while the purchasers having the high visiting frequency can be collected in the event.

In Step S179, the migratory ratio distribution analysis result output unit 653 displays the obtained bar graph and analysis result information on the display unit 25.

Through the above pieces of processing, how the purchaser who purchases the specific product sold in the dealer migrates to buy the products except the specific product can be obtained as the migratory ratio. By way of example, the product is specified in the second embodiment. Alternatively, the migratory ratio in each category of the product or the migratory ratio in each manufacturer of the product is obtained while the purchaser who purchases the specific product is set to the population, whereby the category or the manufacturer of the product that the purchaser who purchases the specific product tends to migrate to purchase can be understood, and the product that should be adopted in the event or the product that should not be adopted in the event can be studied from the view point of the category or the manufacturer. Not only the purchaser who purchases the specific product, but also the purchaser who purchases the product of the specific category or manufacturer may be set to the population.

[Replacement Product Analysis Processing in Dealer Sales Support System in FIG. 19]

Figure 26:
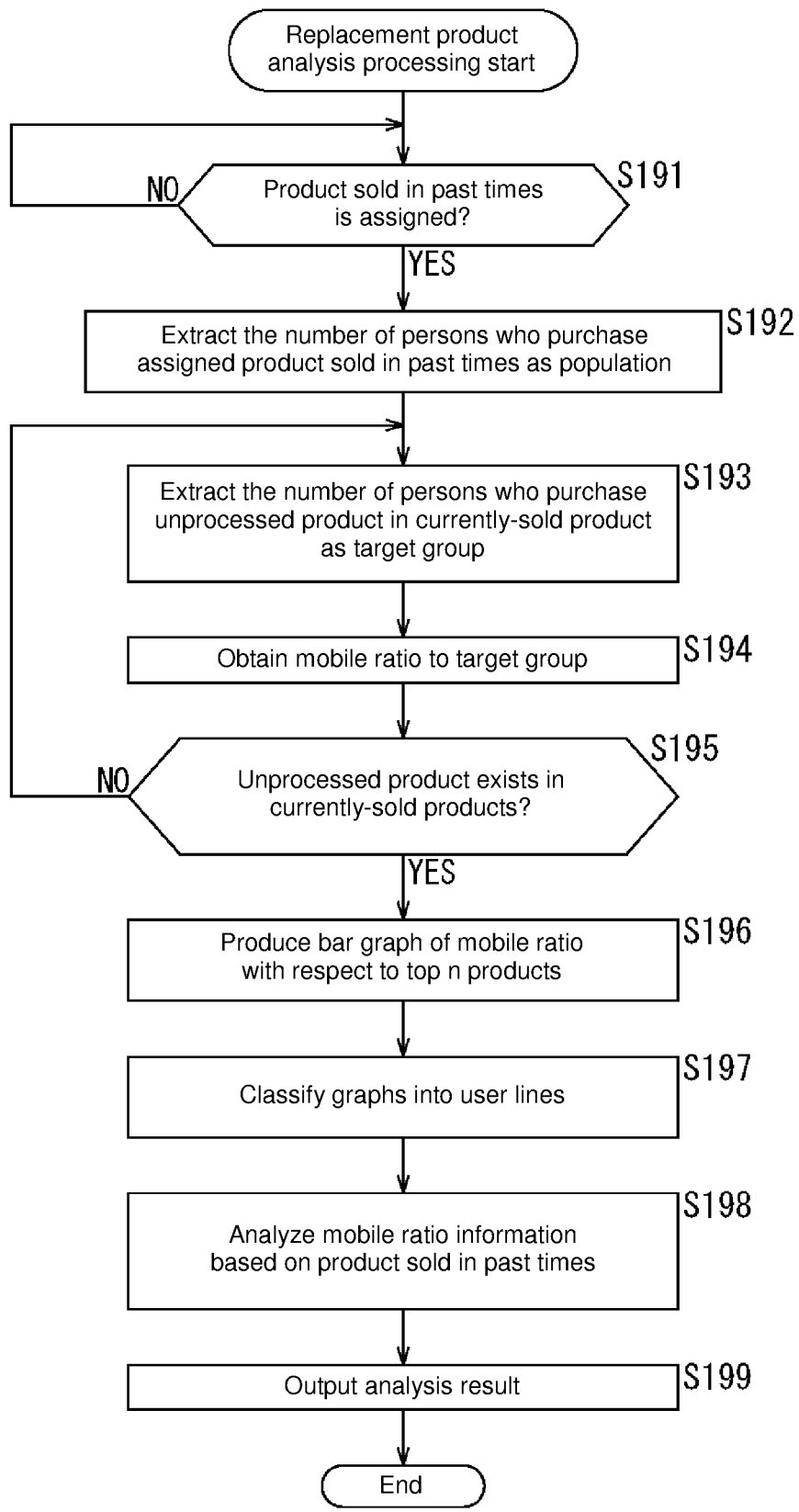
FIG. 26 is a flowchart illustrating replacement product analysis processing in the dealer sales support system in FIG. 19.

Replacement product analysis processing will be described below with reference to a flowchart in FIG. 26.

In Step S191, the mobile ratio calculator 655 determines whether the operation unit 654 is operated to perform the input of the product, which was sold in past times and replaced by new another product. The mobile ratio calculator 655 repeats the same processing in Step S191 until the input is performed. When the operation unit 654 is operated to perform the input of the replaced product sold in past times in Step S191, the flow goes to the processing in Step S192.

In Step S192, the population extraction unit 681 of the mobile ratio calculator 655 controls the communication unit 658 to access the product management DB 526 and the biological information DB 522, and extracts the number of purchasers who purchase the replaced product as the population of the mobile ratio.

In Step S193, the target group extraction unit 682 of the mobile ratio calculator 655 sets the unprocessed product in the currently-sold products to the processing target product, searches the face image data in which the sales information indicating the purchase of the processing target product is registered from the pieces of face image data that become the population, and extracts the face image data as the target group.

In Step S194, the mobile ratio calculation result output unit 683 calculates the ratio of the number of persons of the target group to the number of persons of the population as the mobile ratio, and outputs the mobile ratio.

In Step S195, the target group extraction unit 682 determines whether the unprocessed product in which the mobile ratio is not obtained exists in the currently-sold products. When the unprocessed product in which the mobile ratio is not obtained exists, the flow returns to the processing in Step S193.

That is, the pieces of processing in Steps S193 to S195 are repeated until the unprocessed product in which the mobile ratio is not obtained is eliminated in the currently-sold products.

When the target group extraction unit 682 determines that the unprocessed product does not exist in Step S195, the flow goes to the processing in Step S196.

In Step S196, the mobile ratio distribution analyzer 656 obtains the orders of the mobile ratios based on the pieces of information on all the obtained mobile ratios, and generates bar graphs similar to those in FIG. 17 with respect to the top n mobile ratios while correlating the bar graphs with the products.

In Step S197, the mobile ratio distribution analyzer 656 classifies the generated bar graph of the mobile ratio into the user ranks in terms of the ratio of the number of persons. Because this is identical to that in FIG. 17, the description is omitted.

In Step S198, the mobile ratio distribution analyzer 656 analyzes the information obtained from the order of the mobile ratio in each product, and outputs the information indicating which product the player who purchased the product, which was sold in past times and already replaced, purchases as the analysis result. In the case that the product is considered instead of the model of the amusement machine, assuming that the purchaser who purchases the specific product "B" in FIG. 17 is the population, the purchaser who purchased the product "B" becomes the purchaser of the products "BB" and "AB". Therefore, when the mobile ratio is maintained with respect to the models "BB" and "AB", it can be recognized that the customer does not move to another store even if the model "B" is replaced. In FIG. 17, the analysis result also shows that, because the ratio of the purchaser having the high visiting frequency is high with respect to the product "ABC" although the migratory ratio is low, the sales of the product "ABC" is maintained, whereby the purchaser having the high visiting frequency does not defect from the dealer in the purchasers who purchase the product "BB".

In Step S199, the mobile ratio distribution analysis result output unit 657 displays the obtained bar graph and analysis result information on the display unit 25.

Through the above pieces of processing, which product the purchaser who purchases the specific product in the dealer purchases can be obtained as the mobile ratio after the sales of specific product is terminated. By way of example, the product is specified in the second embodiment. Alternatively, the mobile ratio in each category of the product or the mobile ratio in each manufacturer of the product is obtained while the purchaser who purchases the specific product is set to the population, whereby the category or the manufacturer of the product to which the purchaser who purchases the specific product tends to change can be understood, and the product that should be replaced or the product that should not be replaced can be studied from the view point of the category or the manufacturer. Not only the purchaser who purchases the specific product, but also the purchaser who purchases the product of the specific category or manufacturer, which was sold in past times, may be set to the population.

By way of example, the dealer sales support system is constructed by the plural devices. It is not necessary that the dealer sales support system be constructed by the individual devices. For example, the biological information recognizer 521 and the dealer management device 524 may be constructed as an information processing apparatus that acts as both the biological information recognizer 521 and the dealer management device 524, or the whole dealer sales support system may be constructed by one device.

3. Third Embodiment

Configuration Example of Amusement Park Sales Support System

In the first and second embodiments, the mobile ratio and the migratory ratio are obtained with respect to the amusement machine in the amusement shop and the product in the dealer based on the configuration examples of the amusement shop sales support system and the dealer sales support system. However, the sales support system based on the mobile ratio and the migratory ratio may be aimed at other fields except the amusement shop and the dealer. For example, the sales support system may be used in an attraction in an amusement park instead of the amusement machine in the amusement shop or the product in the dealer.

Figure 27:
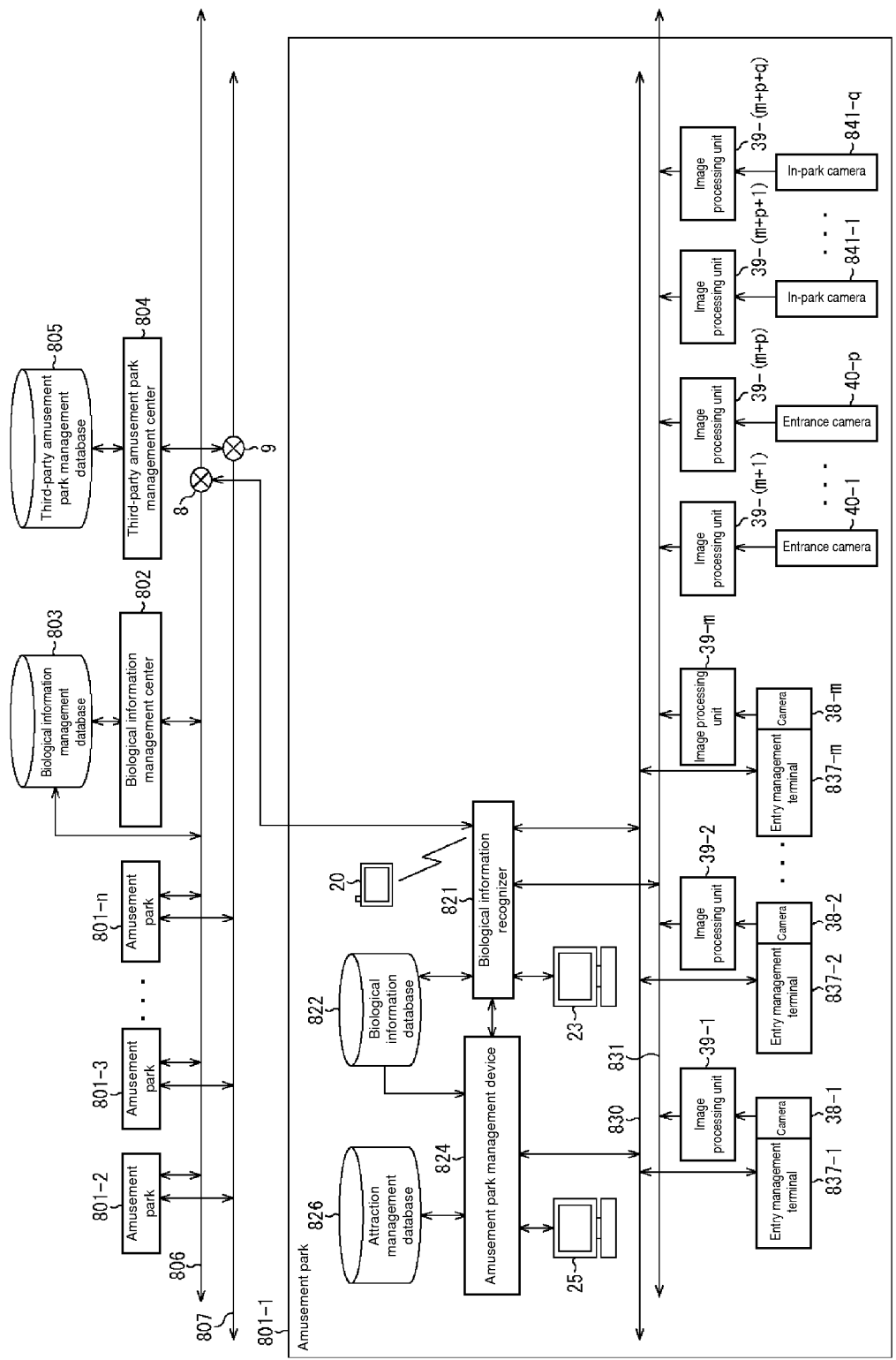
FIG. 27 is a view illustrating a configuration example of an amusement park sales support system according to an embodiment.

FIG. 27 is a view illustrating a configuration of an amusement park sales support system according to an embodiment of the present invention. In FIG. 27, the configuration including the same function as that in FIGS. 1 and 19 is designated by the same numeral, and the description is omitted as appropriate. In FIG. 27, the configuration including the same function as that in FIGS. 1 and 19 is designated by the same numeral, and the description is omitted as appropriate. The amusement park sales support system in FIG. 27 includes an amusement park 801 to a third-party amusement park management bus 807, a biological information recognizer 821, a biological information DB 822, an amusement park management device 824, an attraction management DB 826, an amusement park management information bus 830, a biological information bus 831, and an entry management terminal 837 instead of the amusement shops 1 to the third-party amusement shop management bus 7, the biological information recognizer 21, the biological information DB 22, the amusement shop management device 24, the amusement machine management DB 26, the amusement shop management information bus 30, the biological information bus 31, and the amusement machine peripheral terminal 37 in FIG. 1, or the dealer 501 to the third-party dealer management bus 507, the biological information recognizer 521, the biological information DB 522, the dealer management device 524, the product management DB 526, the dealer management information bus 530, the biological information bus 531, and the adjustment terminal 537 in FIG. 19.

Amusement parks 801-1 to 801-n are amusement facilities each of which includes plural attractions. The amusement parks 801-1 to 801-n are also affiliated parks or member facilities of a biological information management center or a third-party amusement park management center. In the amusement parks 801-1 to 801-n, plural amusement parks need to be integrally managed. The amusement parks 801-1 to 801-n are connected to one another by the biological information management bus 806 and the third-party amusement park management bus 807. The amusement parks 801-1 to 801-n transmit and receive the biological information and third-party amusement park management information to and from one another through the buses 806 and 807 and the public communication line networks 8 and 9 typified by the Internet.

The biological information management bus 806 is identical to the biological information management bus 6, and acts as a transmission line through which the biological information mainly managed by the biological information recognizer 821 of each amusement park 801 flows. The third-party amusement park management bus 807 acts as a transmission line through which a kind of the attraction and entry management information managing visitors, which are mainly managed by the entry management terminal 837 of each amusement park 801, flows.

The biological information management center 802 corresponds to biological information management center 2, and is a server that is used by a business operator who manages and operates the biological information management center.

The third-party amusement park management center 804 corresponds to the third-party amusement shop management center 4, and is a server that is used by a business operator who manages and operates the third-party amusement park management center.

The biological information recognizer 821 corresponds to the biological information recognizer 21, and matches the information on the face image, which is extracted from images captured by the cameras 38-1 to 38-$m$, the entrance cameras 40-1 to 40-$p$, and in-park cameras 841-1 to 841-$q$ by the image processing units 39-1 to 39-$(m+p+q)$ and supplied through the biological information bus 831, against a face image previously registered in the biological information DB 822. The cameras 38-1 to 38-$m$ are provided in a ticket counter gate in order to capture an image of a visitor (a user) who enters the park and uses the attraction in the amusement park 801. When the face images matched with each other, entry management information on the registered person is added to the biological information DB 822 to update the biological information DB 822, and various pieces of information are displayed on the display unit 23 including the CRT (Cathode Ray Tube) or the LCD (Liquid Crystal Display) as needed basis. The in-park camera 841 has the same function as the in-store camera 41, and monitors the amusement park. Accordingly, it is assumed that the image processing unit 39 that processes the captured image is identical to that of the first and second embodiments.

The amusement park management device 824 corresponds to the amusement shop management device 24, and monitors an entry clock time of a visitor (a user) of the attraction and the kind of the attraction using the entry management terminal 837 through the amusement park management information bus 830. The amusement park management device 824 obtains entry management information including the kind of the attraction, in which the entry is checked by the entry management terminal 837, and displays the entry management information on the display unit 25 including the CRT or the LCD. Using the attraction management DB 826, the amusement park management device 824 manages the entry management information indicating the kind of the attraction, which is supplied from each of the entry management terminals 837-1 to 837-$m$ and in which the entry is checked, while correlating the entry management information with identification information (for example, an attraction identification number) identifying the attraction. Pieces of information on an attraction name, a category, and a manufacturer of the attraction are registered in the attraction management DB 826 while correlated with the attraction identification number.

The entry management terminals 837-1 to 837-$m$ correspond to the amusement machine 36 and the amusement machine peripheral terminal 37. When the visitor (the user) enters the ticket counter gate, each of the entry management terminals 837-1 to 837-$m$ reads attraction identification information added to the ticket counter gate, and determines permission/prohibition of the entry. Each of the entry management terminals 837-1 to 837-$m$ opens the ticket counter gate when the visitor is permitted to enter the attraction. The camera 38 that is installed according to the entry management terminal 837 obtains the biological information, such as the face image of the visitor (the user), and transmits the biological information from the corresponding image processing unit 39 to the biological information recognizer 821 together with the attraction identification information (the attraction identification number).

[Configuration Example of Biological Information Recognizer in Amusement Park Sales Support System in FIG. 27]

Figure 28:
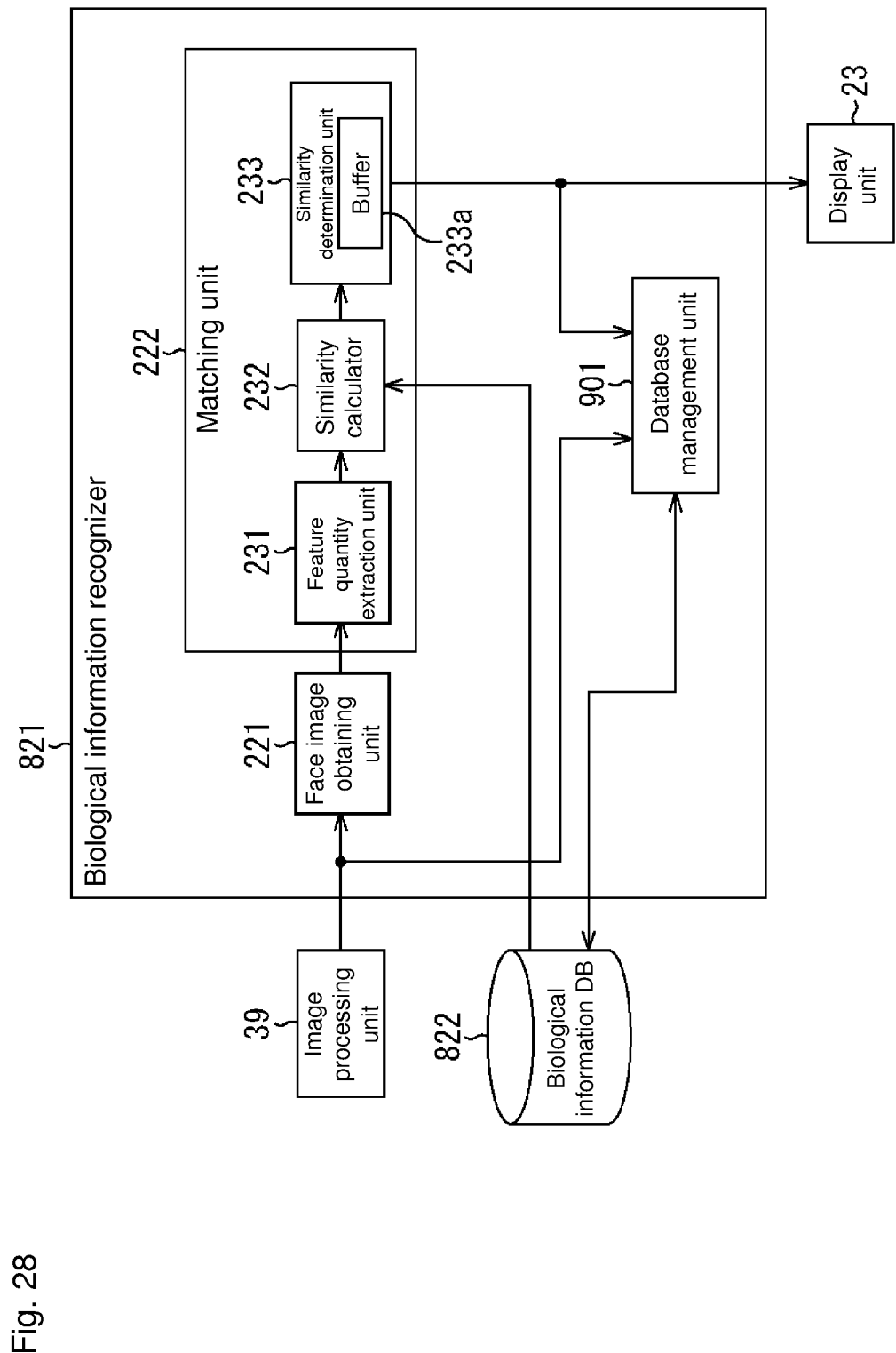
FIG. 28 is a view illustrating a configuration example of a biological information recognizer in FIG. 27.

A configuration example of the biological information recognizer 821 will be described below with reference to FIG. 28. In FIG. 28, the configuration including the same function as the biological information recognizer 21 in FIG. 10 and the biological information recognizer 521 in FIG. 20 is designated by the same numeral, and the description is omitted. The biological information recognizer 821 in FIG. 28 differs from the biological information recognizer 21 in FIG. 10 and the biological information recognizer 521 in FIG. 20 in that a database management unit 901 is provided instead of the database management unit 223 or 601.

The database management unit 901 registers a clock time (the clock time at which the face image is obtained) at which the person having the face image passes through (enters) the ticket counter gate and the attraction identification information identifying the entered attraction in the biological information DB 822.

[Configuration Example of Biological Information Database in Amusement Park Sales Support System in FIG. 27]

A configuration example of the biological information database 822 will be described below with reference to FIG. 29.

Figure 29:
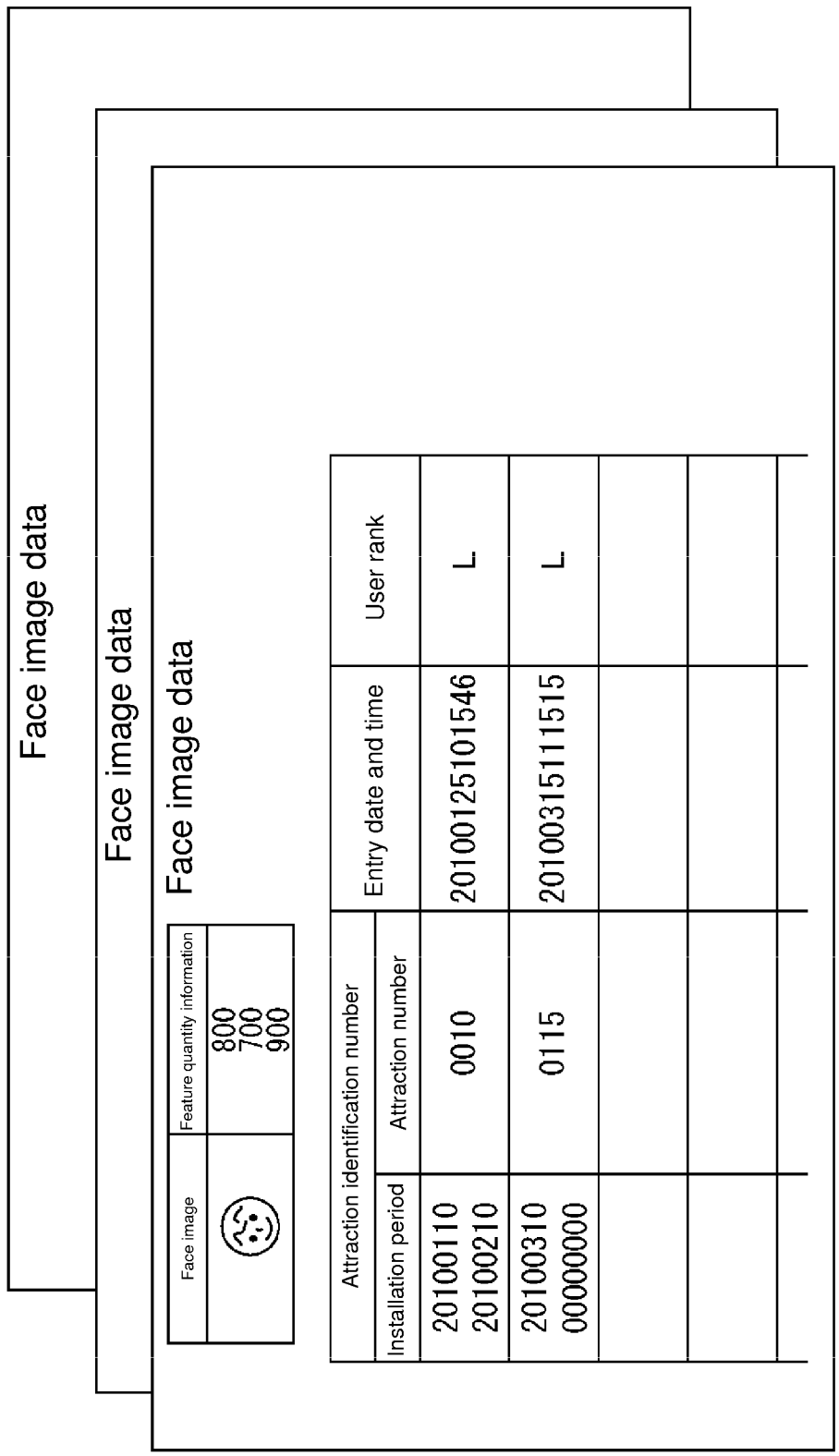
FIG. 29 is a view illustrating a configuration of a biological information database in FIG. 27.

As illustrated in FIG. 29, the biological information DB 822 is a database including sheet-like face image data managed in each face image, and the database management unit 901 registers the entry management information on the person having the face image while correlating the entry management information with the face image. Each sheet including the face image data, feature quantity information is registered in a feature quantity information field while correlated with the face image registered in a face image field. An attraction identification number field, an entry date and time field, and a user rank field are also provided in the biological information DB 822. The attraction identification number, entry date and time at which the person passes through the ticket counter gate of the attraction, and the user rank that is set based on the visiting frequency to the amusement park 801 are registered in the attraction identification number field, the entry date and time field, and the user rank field, respectively. The database management unit 901 registers the face image obtained by the face image obtaining unit 221 in the face image field. The database management unit 901 registers the attraction identification number, which is supplied together with the face image, to the attraction identification number field. The attraction identification number is information specifying the attraction that the person in which the face image is supplied enters, and the attraction identification number is registered in the attraction identification number field. The attraction identification number includes an installation period during which the attraction in which the entry is checked is installed and an attraction number identifying the attraction. The installation period and the attraction number are recorded in the installation period field and the attraction number field, respectively.

For example, the installation periods are "201001102010021000010" and "20100310000000000115" as illustrated in the top stage and the second stage in FIG. 29. The attraction identification number of the top stage indicates the attraction, which is sold from Jan. 10, 2010 to Feb. 10, 2010 and identified by the attraction number "0010". That is, in "201001102010021000010", the starting time of the installation period is "20100110", the ending time is "20100210", and the attraction number is "0010".

For the attraction identification number of the second stage, in "20100310000000000115", the starting time of the installation period is "20100110", the ending time is "00000000", and the attraction number is "0115". The ending time "00000000" indicates that the attraction is currently installed and that the ending time is not set. The attraction identification number of the second stage indicates the attraction, which is currently installed since Mar. 10, 2010 and identified by the attraction number "0115".

The information on the entry date and time indicating the clock time, at which the person identified by the face image enters the attraction assigned by the attraction identification number, is recorded in the entry date and time field. In FIG. 29, "20100125101546" and "20100315111515" are recorded in the top stage and the second stage of the entry date and time field. That is, the top stage in FIG. 29 indicates that the person identified by the face image enters the attraction having the attraction identification number "20100110201002100010" at 10:15:46 on Jan. 25, 2010. The second stage in FIG. 29 indicates that the person identified by the face image enters the attraction having the attraction identification number "20100310000000000115" at 11:15:15 on Mar. 15, 2010.

The user rank is indicated on a scale of H (Heavy), M (Middle), and L (Light) according to the visiting frequency of the visitor identified by the face image, and the user rank is recorded in the user rank field. When updating the face image data, the database management unit 901 records the user rank as L in the initial state. After that, the database management unit 901 calculates the visiting frequency from the information on the entry date and time. The database management unit 901 records the user rank as M when the visiting frequency is higher than a predetermined frequency, and the database management unit 901 records the user rank as H when the visiting frequency is further higher. On the other hand, when the visiting frequency decreases, the database management unit 901 changes the user rank from H to M or from M to L.

[Configuration Example of Amusement Park Management Device in Amusement Park Sales Support System in FIG. 27]

Figure 30:
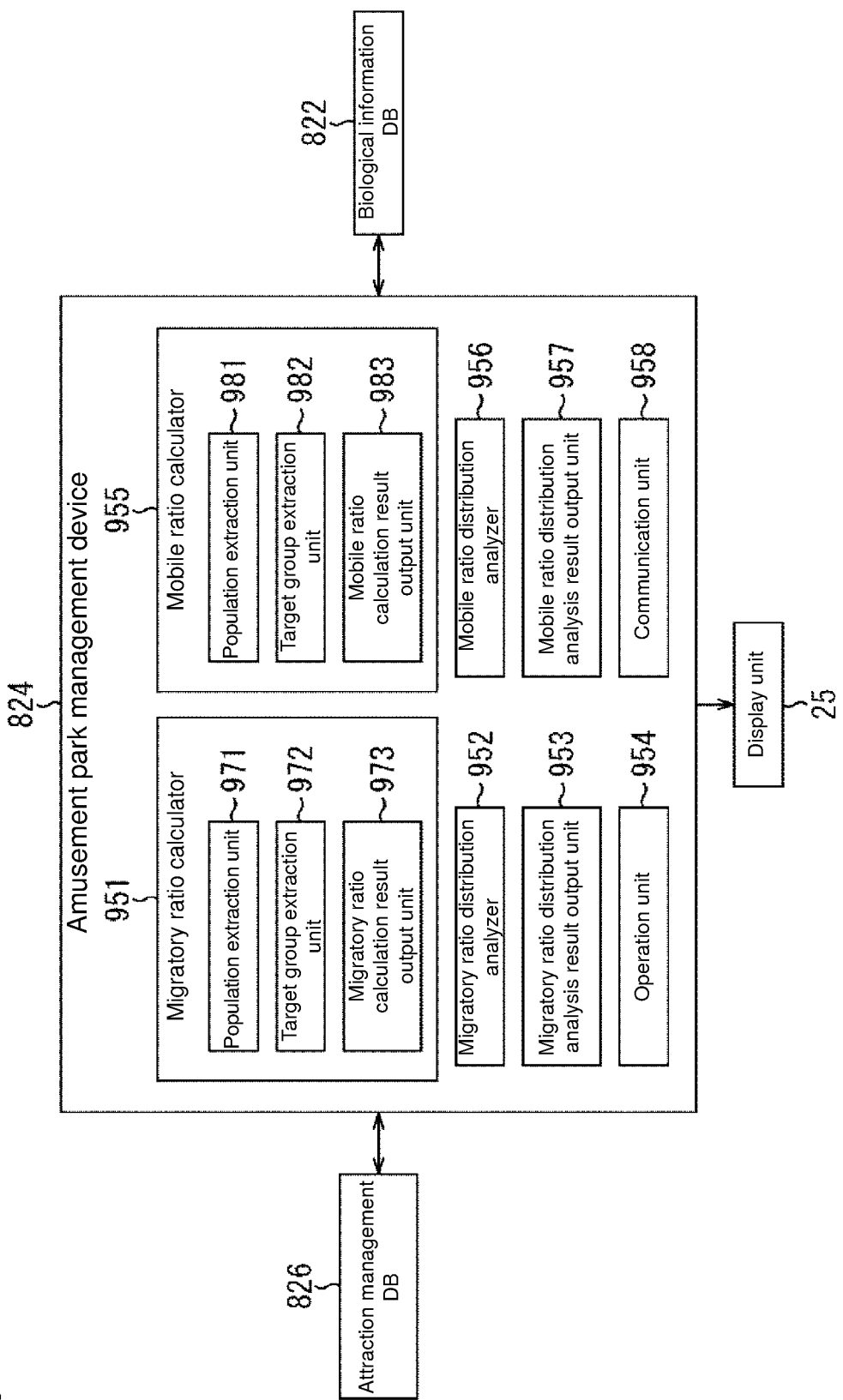
FIG. 30 is a view illustrating a configuration example of an amusement park management device in FIG. 27.

A configuration example of the amusement park management device 824 will be described below with reference to FIG. 30.

The amusement park management device 824 corresponds to the amusement shop management device 24. The amusement park management device 824 obtains the migratory ratio and the mobile ratio with the visitors (the users who use the attraction) who enter the specific attraction as the population from the face image data registered in the biological information DB 822 and the individual information on the attraction registered in the attraction management DB 826, and provides the sales support information.

More particularly, the amusement park management device 824 specifies the currently-installed attraction by the attraction name, the category, and the manufacturer of the attraction, and calculates the migratory ratio indicating a ratio at which the user who uses the specified attraction migrates to other attractions in each of other attractions. The amusement park management device 824 also specifies the attraction, which is not currently installed but installed in past times, by the attraction name, the category, and the manufacturer of the attraction, and calculates the mobile ratio indicating a ratio at which the user who uses the specified attraction moves to other currently-installed attractions in each of other attractions. The amusement park management device 824 analyzes the migratory ratio or the mobile ratio in each product, and provides the sales support information based on the analysis result.

The amusement park management device 824 includes a migratory ratio calculator 951, a migratory ratio distribution analyzer 952, a migratory ratio distribution analysis result output unit 953, an operation unit 954, a mobile ratio calculator 955, a mobile ratio distribution analyzer 956, a mobile ratio distribution analysis result output unit 957, and a communication unit 958.

The migratory ratio calculator 951 includes a population extraction unit 971, a target group extraction unit 972, and a migratory ratio calculation result output unit 973, and calculates the migratory ratio. The population extraction unit 971 extracts the information on the number of persons of the population necessary for the calculation of the migratory ratio. More specifically, when the operation unit 954 including the keyboard and the operating button is operated to input the attraction name, the category, or the manufacturer as the information specifying the attraction, which is used by persons who become the population and is currently installed in the amusement park, the population extraction unit 971 accesses the attraction management DB 826 to specify the attraction identification number of the currently-installed attraction, which should be specified, based on the input information. Based on the specified attraction identification number, the population extraction unit 971 accesses the biological information DB 822 to extract the face image data in which the entry management information indicating the use of the attraction having the specified attraction identification number is recorded, and obtains the number of persons who become the population from the number of pieces of extracted face image data.

The target group extraction unit 972 extracts the face image data including the entry management information indicating the entry in each of the currently-installed attractions except the specified attraction in the population necessary to obtain the migratory ratio, and obtains the number of pieces of face image data as the number of persons of the target group.

The migratory ratio calculation result output unit 973 calculates the ratio of the target group to the population as the migratory ratio in each attraction by dividing the number of persons of the target group by the number of persons of the population.

The migratory ratio distribution analyzer 952 collects the calculation results of the migratory ratio, which is obtained in each attraction, and obtains a distribution of the attractions. For example, the migratory ratio distribution analyzer 952 extracts pieces of information on the top n attractions, and generates the sales support information as the analysis result based on the trend of the pieces of information.

The migratory ratio distribution analysis result output unit 953 generates a graph indicating the migratory ratio information in each of the attractions collected by the migratory ratio distribution analyzer 952, and displays the graph on the display unit 25 together with the analysis result of the migratory ratio distribution analyzer 952.

The mobile ratio calculator 955 includes a population extraction unit 981, a target group extraction unit 982, and a mobile ratio calculation result output unit 983, and calculates the mobile ratio. The population extraction unit 981 extracts information on the number of persons of the population necessary for the calculation of the mobile ratio. More specifically, when the operation unit 954 including the keyboard and the operating button is operated to input the attraction name, the category, or the manufacturer as the information specifying the attraction, which was installed in past times in the amusement park, the population extraction unit 981 accesses the attraction management DB 826 to specify the attraction identification number of the attraction installed in past times, which should be specified, based on the input information. Based on the specified attraction identification number, the population extraction unit 981 accesses the biological information DB 822 to extract the face image data in which the entry management information indicating the use of the attraction having the specified attraction identification number is recorded, and obtains the number of persons who become the population from the number of pieces of extracted face image data.

The target group extraction unit 982 extracts the face image data including the entry management information indicating the entry in each of the currently-installed attractions except the specified attraction in the population necessary to obtain the migratory ratio, and obtains the number of pieces of face image data as the number of persons of the target group.

The mobile ratio calculation result output unit 983 calculates the ratio of the target group to the population as the mobile ratio in each attraction by dividing the number of persons of the target group by the number of persons of the population.

The mobile ratio distribution analyzer 956 collects the calculation results of the migratory ratio, which is obtained in each attraction, and obtains a distribution of the attractions. For example, the mobile ratio distribution analyzer 956 extracts pieces of information on the top n attractions, and generates the sales support information as the analysis result based on the trend of the pieces of information.

The mobile ratio distribution analysis result output unit 957 generates a graph indicating the mobile ratio information in each of the attractions collected by the mobile ratio distribution analyzer 956, and displays the graph on the display unit 25 together with the analysis result of the mobile ratio distribution analyzer 956.

For example, the communication unit 958 is constructed by an Ethernet board. The communication unit 958 conducts communication with the biological information recognizer 821, the amusement machine management DB 826, and the biological information DB 822 to transmit and receive various pieces of information to and from these units.

[Configuration Example of Attraction Management Database in Amusement Park Sales Support System in FIG. 27]

A configuration example of the Attraction management database 826 will be described below with reference to FIG. 31.

The pieces of attraction information, such as the attraction name, the category, and the manufacturer of the currently-installed attraction or the attraction installed in past times, are recorded in the attraction management DB 826 based on the attraction identification number.

Because the attraction identification number is identical to that of the biological information DB 822 in FIG. 29, the description is omitted. The individual attraction name of the attraction is registered in an attraction name field. The category of the attraction is recorded in a category field. For example, Z that indicates scary rides, such as a jet coaster, and H that indicates horror attractions, such as a haunted house, are recorded in the category field. Information indicating category except the categories in FIG. 31 may be recorded. Information on the manufacturer of the attraction is recorded in a manufacturer field. Accordingly, in the attractions having the attraction identification numbers "20100310201004100001" and "20100310201004100002" in FIG. 31, the attraction name is "P", the category is "Z", and the manufacturer is "XXX". In the attractions having the attraction identification numbers "20100310201004100003" and "20100310201004100004", the attraction name is "Q", the category is "Z", and the manufacturer is "XXX". In the attractions having the attraction identification numbers "20100510000000000001" and "20100510000000000002", the attraction name is "QQ", the category is "H", and the manufacturer is "YYY".

[Attraction Information Management Processing in Amusement Park Sales Support System in FIG. 27]

Figure 32:
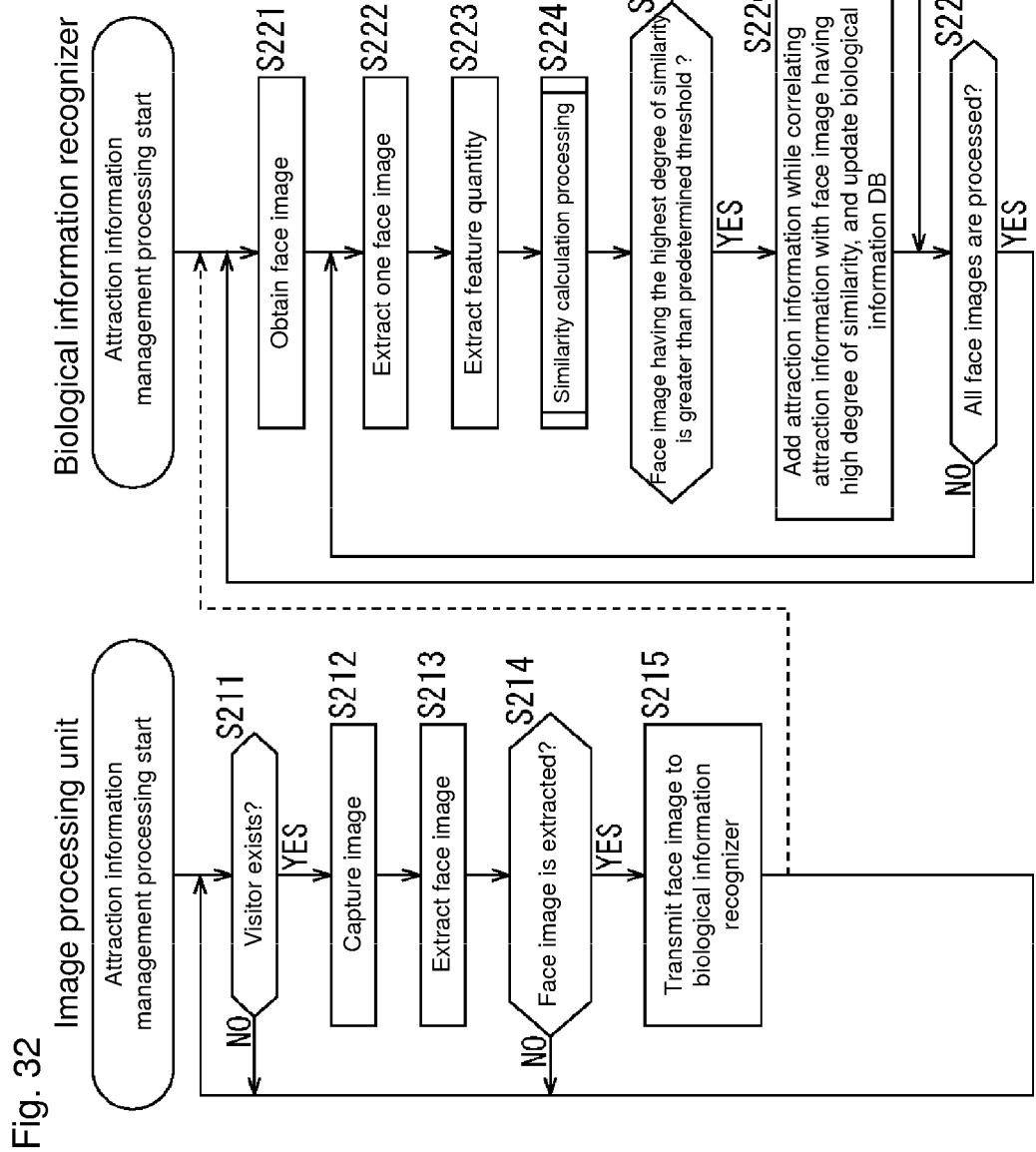
FIG. 32 is a flowchart illustrating attraction information management processing.

Attraction information management processing will be described below with reference to a flowchart in FIG. 32. Because the pieces of processing in Steps S212 to S215 and Steps S221 to S225 and S227 are identical to those in Steps S1 to S4 and Steps S21 to S25 and S27 in FIG. 14, the description is omitted.

In Step S211, the entry management terminal 837 determines whether the user who visits the ticket counter gate with the ticket can be checked as the visitor of the user, who has the authorized ticket to open the ticket counter gate, by reading recognition information, such as the barcode of the ticket. The entry management terminal 837 repeats the processing in Step S211 until the entry of the visitor is checked. When the user brings over the authorized ticket to the ticket counter gate to open the ticket counter gate and to check the entry of the user in Step S211, the processing goes to Step S212. The face image is obtained through the processing in Step S212, and the face image is transmitted to the biological information recognizer 821. In Step S215, the transmitter 203 transmits the face image to the biological information recognizer 821 while adding the attraction identification number identifying the attraction and the information on the entry clock time (the image capturing clock time) to the face image.

In Steps S221 to S225, the degree of similarity between the supplied face image and the registered face image is obtained to perform the matching.

When determining that the top degree of similarity is larger than a predetermined threshold in Step S225, the similarity determination unit 233 supplies the top face image to the database management unit 901 in Step S226. The database management unit 901 accesses the biological information DB 822 to search the face image data managed in association with the supplied face image. The database management unit 901 registers the entry date and time and the user rank while correlating the entry date and time and the user rank with the attraction identification number added to the face image. At this point, the database management unit 901 registers the time the face image is initially detected with respect to the entry date and time. The database management unit 901 calculates and registers the visiting frequency of the visitor managed by the face image based on the information on the entry date and time.

On the other hand, when the top degree of similarity supplied by the similarity calculator 232 is not larger than the predetermined threshold in Step S225, namely, when the degree of similarity of the face image of the most similar registered person is less than the predetermined threshold, the flow goes to the processing in Step S228.

In Step S228, the similarity determination unit 233 supplies the face image, which is supplied from the image processing unit 39, to the database management unit 901. The database management unit 901 accesses the biological information DB 822, newly generates the face image data using the supplied face image, and registers the face image data. The database management unit 901 registers the entry date and time and the user rank while correlating the entry date and time and the user rank with the attraction identification number added to the face image.

Through the above pieces of processing, based on the face image supplied by the image processing unit 39, the biological information recognizer 821 can sequentially accumulate the entry management information in the biological information DB 822 in each face image of the visitor.

[Event Strategy Analysis Processing in Amusement Park Sales Support System in FIG. 27]

Figure 33:
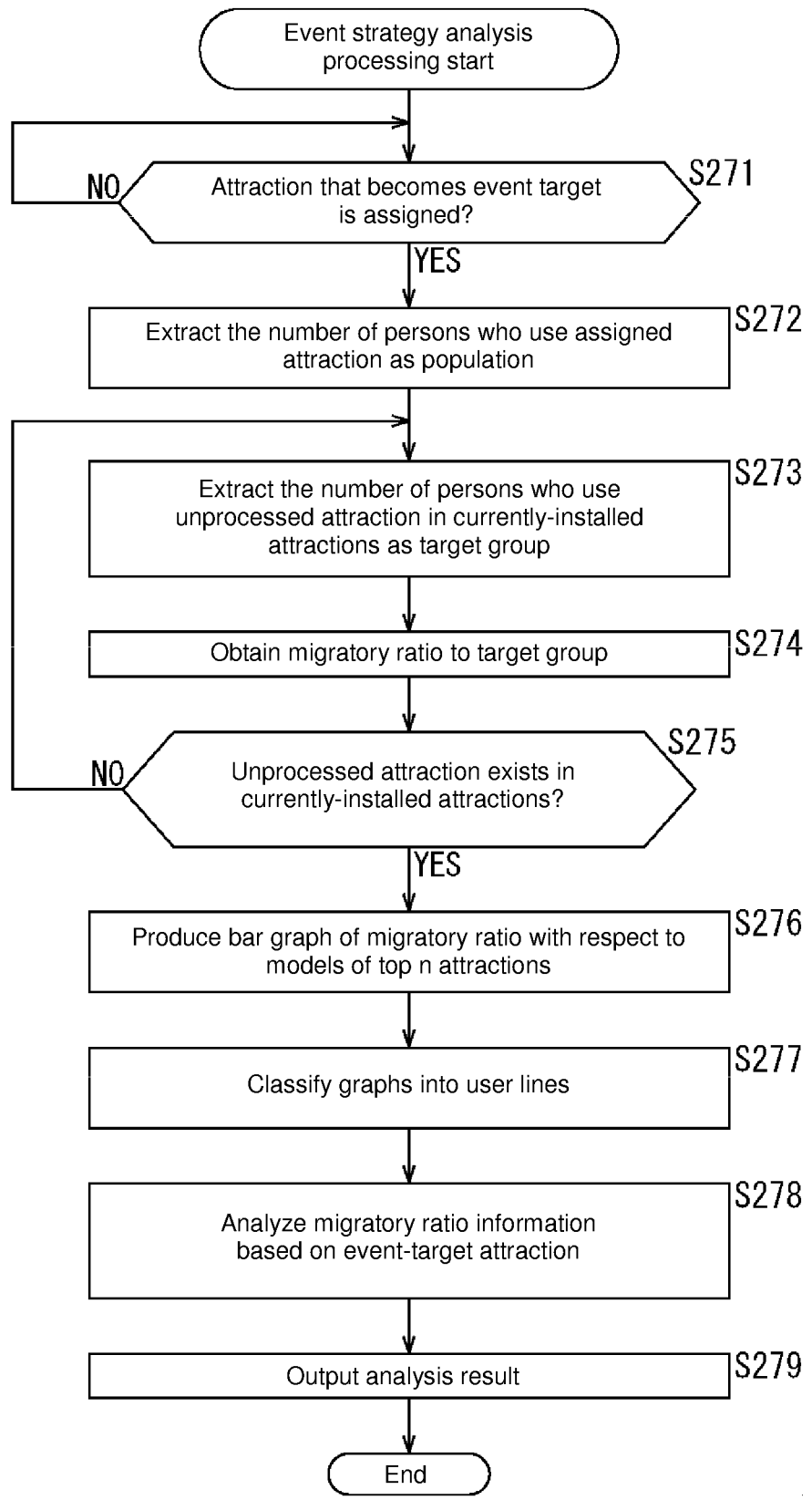
FIG. 33 is a flowchart illustrating event strategy analysis processing in the amusement park sales support system in FIG. 27.

Event strategy analysis processing will be described below with reference to a flowchart in FIG. 33.

In Step S271, the migratory ratio calculator 951 determines whether the operation unit 954 is operated to perform the input to the attraction that becomes the event target candidate in the currently-installed attractions. The migratory ratio calculator 951 repeats the same processing in Step S271 until the input is performed. When the operation unit 954 is operated to perform the input to the currently-installed attraction that becomes the event target candidate in Step S271, the flow goes to the processing in Step S272.

In Step S272, the population extraction unit 971 of the migratory ratio calculator 951 controls the communication unit 958 to access the attraction management DB 826 and the biological information DB 822, and extracts the number of visitors who use the attraction that becomes the event target candidate as the population of the migratory ratio.

In Step S273, the target group extraction unit 972 of the migratory ratio calculator 951 sets the unprocessed attraction in the currently-installed attractions to the processing target product, searches the face image data in which the entry management information indicating the use of the processing target attraction is registered from the pieces of face image data that become the population, and extracts the face image data as the target group.

In Step S274, the migratory ratio calculation result output unit 973 calculates the ratio of the number of persons of the target group to the number of persons of the population as the migratory ratio, and outputs the migratory ratio.

In Step S275, the target group extraction unit 972 determines whether the unprocessed attraction in which the migratory ratio is not obtained exists in the currently-installed attractions. When the unprocessed attraction in which the migratory ratio is not obtained exists, the flow returns to the processing in Step S273. That is, the pieces of processing in Steps S273 to S275 are repeated until the attraction in which the migratory ratio is not obtained is eliminated in the currently-installed attractions except the attraction assigned as the population.

When the target group extraction unit 972 determines that the unprocessed attraction does not exist in Step S275, the flow goes to the processing in Step S276.

In Step S276, the migratory ratio distribution analyzer 952 obtains the orders of the migratory ratios based on the pieces of information on all the obtained migratory ratios, and generates bar graphs with respect to the top n migratory ratios while correlating the bar graphs with the attractions.

In Step S277, the migratory ratio distribution analyzer 952 classifies the generated bar graph of the migratory ratio into the user ranks in terms of the ratio of the number of persons.

In Step S278, the migratory ratio distribution analyzer 952 analyzes the information obtained from the order of the migratory ratio in each attraction, and outputs the information on the attraction that should be the event target as an analysis result. In the case that the kind of the attraction is considered instead of the model of the amusement machine, assuming that the visitor who uses the attraction "AA" in FIG. 17 is the population, the visitor who uses the attraction "AA" tends to migrate to use the attractions "BB" and "AB". Therefore, for example, in the case that the event is held for the attraction "AA", the analysis result shows that the visitors who have the same taste disperse in each attraction to possibly reduce the customer attracting efficiency when the attractions "BB" and "AB" are also included in the target attraction. In FIG. 17, the analysis result also shows that, because the ratio of the visitor having the high visiting frequency is high with respect to the product "ABC" although the migratory ratio is low, when the product "ABC" is also set to the event target attraction, possibly the visitors disperse while the visitors having the high visiting frequency can be collected in the event.

In Step S279, the migratory ratio distribution analysis result output unit 953 displays the obtained bar graph and analysis result information on the display unit 25.

Through the above pieces of processing, how the user who uses the specific attraction installed in the amusement park migrates to use the attractions except the specific attraction can be obtained as the migratory ratio. By way of example, the product is specified in the third embodiment. Alternatively, the migratory ratio in each category of the attraction or the migratory ratio in each manufacturer of the attraction is obtained while the user who uses the specific attraction is set to the population, whereby the category or the manufacturer of the attraction that the user who uses the specific attraction tends to migrate to use can be understood, and the attraction that should be adopted in the event or the attraction that should not be adopted in the event can be studied from the view point of the category or the manufacturer. Not only the user who uses the specific attraction, but also the user who uses the attraction of the specific category or manufacturer may be set to the population.

[Replacement Attraction Analysis Processing in Amusement Park Sales Support System in FIG. 27]

Figure 34:
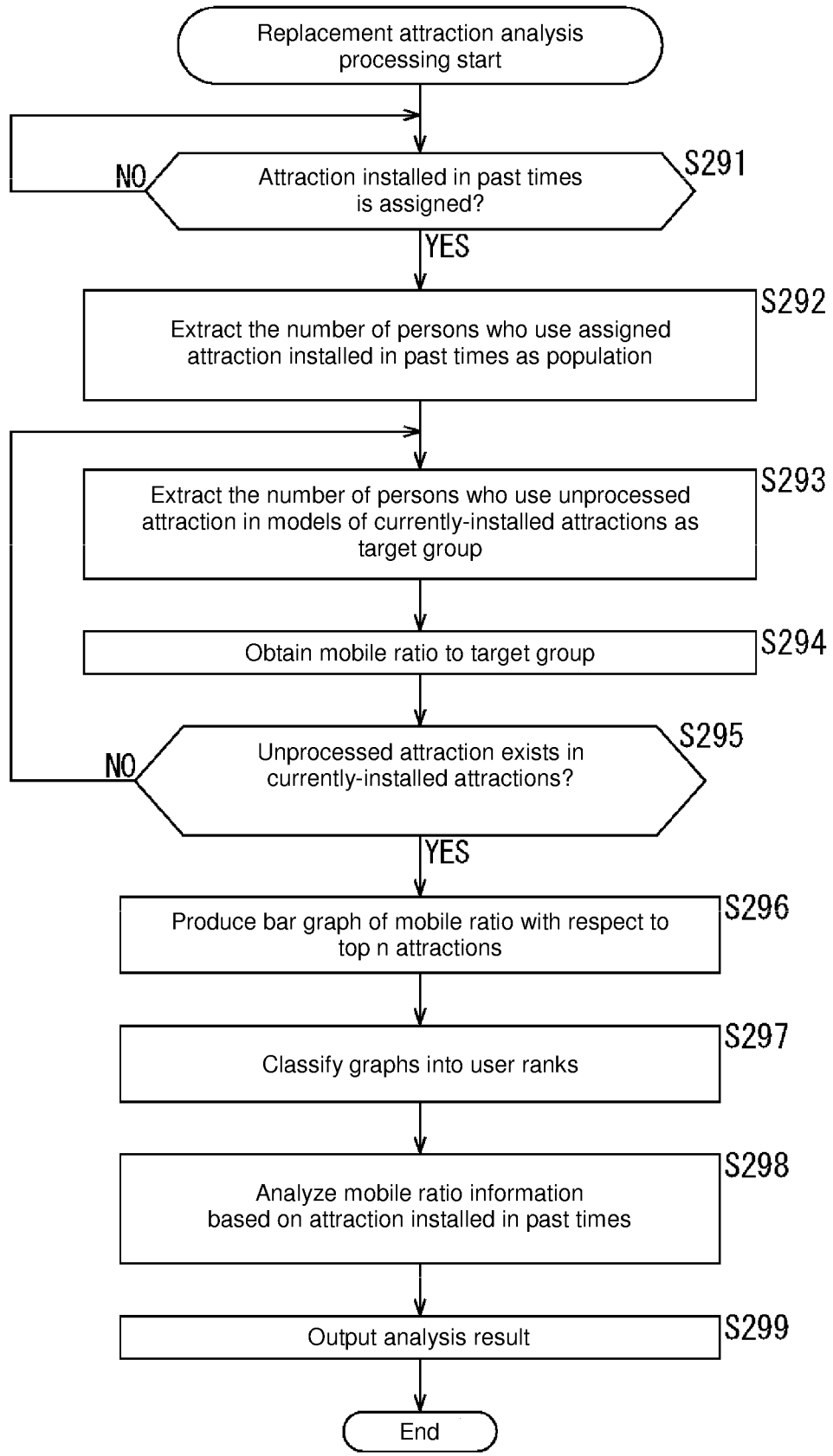
FIG. 34 is a flowchart illustrating replacement attraction analysis processing in the amusement park sales support system in FIG. 27.

Replacement attraction analysis processing will be described below with reference to a flowchart in FIG. 34.

In Step S291, the mobile ratio calculator 955 determines whether the operation unit 954 is operated to perform the input to the attraction, which was installed in past times and replaced by new another attraction. The mobile ratio calculator 955 repeats the same processing in Step S291 until the input is performed. When the operation unit 954 is operated to perform the input to the replaced attraction installed in past times in Step S291, the flow goes to the processing in Step S292.

In Step S292, the population extraction unit 981 of the mobile ratio calculator 955 controls the communication unit 958 to access the attraction management DB 826 and the biological information DB 822, and extracts the number of users who use the replaced attraction as the population of the mobile ratio.

In Step S293, the target group extraction unit 982 of the mobile ratio calculator 955 sets the unprocessed attraction in the currently-installed attractions to the processing target attraction, searches the face image data in which the entry management information indicating the use of the processing target attraction is registered from the pieces of face image data that become the population, and extracts the face image data as the target group.

In Step S294, the mobile ratio calculation result output unit 983 calculates the ratio of the number of persons of the target group to the number of persons of the population as the mobile ratio, and outputs the mobile ratio.

In Step S295, the target group extraction unit 982 determines whether the unprocessed attraction in which the mobile ratio is not obtained exists in the currently-installed attractions. When the unprocessed attraction in which the mobile ratio is not obtained exists, the flow returns to the processing in Step S293. That is, the pieces of processing in Steps S293 to S295 are repeated until the attraction in which the mobile ratio is not obtained is eliminated in the currently-installed attractions.

When the target group extraction unit 982 determines that the unprocessed attraction does not exist in Step S295, the flow goes to the processing in Step S296.

In Step S296, the mobile ratio distribution analyzer 956 obtains the orders of the mobile ratios based on the pieces of information on all the obtained mobile ratios, and generates bar graphs similar to those in FIG. 17 with respect to the top n mobile ratios while correlating the bar graphs with the attractions.

In Step S297, the mobile ratio distribution analyzer 956 classifies the generated bar graph of the mobile ratio into the user ranks in terms of the ratio of the number of persons. Because this is identical to that in FIG. 17, the description is omitted.

In Step S298, the mobile ratio distribution analyzer 956 analyzes the information obtained from the order of the mobile ratio in each attraction, and outputs the information indicating which attraction the user who used the attraction, which was installed in past times and already replaced, uses as the analysis result. In the case that the attraction is considered instead of the model of the amusement machine, assuming that the user who uses the attraction "B" in FIG. 17 is the population, the user who used the attraction "B" becomes the user of the attractions "BB" and "AB". Therefore, when the mobile ratio is maintained with respect to the attractions "BB" and "AB", it can be recognized that the user does not move to another store even if the attraction "B" is replaced. In FIG. 17, the analysis result also shows that, because the ratio of the user having the high visiting frequency is high with respect to the attraction "ABC" although the migratory ratio is low, the use of the attraction "ABC" is maintained, whereby the user having the high visiting frequency does not defect from the amusement park in the users who use the attraction "BB".

In Step S299, the mobile ratio distribution analysis result output unit 957 displays the obtained bar graph and analysis result information on the display unit 25.

Through the above pieces of processing, which product the user who uses the specific attraction installed in the amusement park uses can be obtained as the mobile ratio after the specific attraction is removed. By way of example, the attraction is specified in the third embodiment. Alternatively, the mobile ratio in each category of the attraction or the migratory ratio in each manufacturer of the attraction is obtained while the user who uses the specific attraction is set to the population, whereby the category or the manufacturer of the attraction to which the user who uses the specific attraction tends to change can be understood, and the attraction that should be replaced or the attraction that should not be replaced can be studied from the view point of the category or the manufacturer. Not only the user who uses the specific attraction, but also the user who uses the attraction of the specific category or manufacturer installed in past times may be set to the population.

By way of example, the amusement park sales support system is constructed by the plural devices. It is not necessary that the amusement park sales support system be constructed by the individual devices. For example, the biological information recognizer 821 and the amusement park management device 824 may be constructed as an information processing apparatus that acts as both the biological information recognizer 821 and the amusement park management device 824, or the whole amusement park sales support system may be constructed by one device.

4. Fourth Embodiment

Configuration Example of Commercial Complex Sales Support System

In the first to third embodiments, the mobile ratio and the migratory ratio are obtained with respect to the amusement machine in the amusement shop, the product in the dealer, and the attraction in the amusement park based on the configuration examples of the amusement shop sales support system, the dealer sales support system, and the amusement park sales support system. However, the sales support system based on the mobile ratio and the migratory ratio may be aimed at other fields except the amusement shop, the dealer, and the amusement park. For example, the sales support system may be used in a store in a commercial complex instead of the amusement machine in the amusement shop, the product in the dealer, or the attraction in the amusement park.

Figure 35:
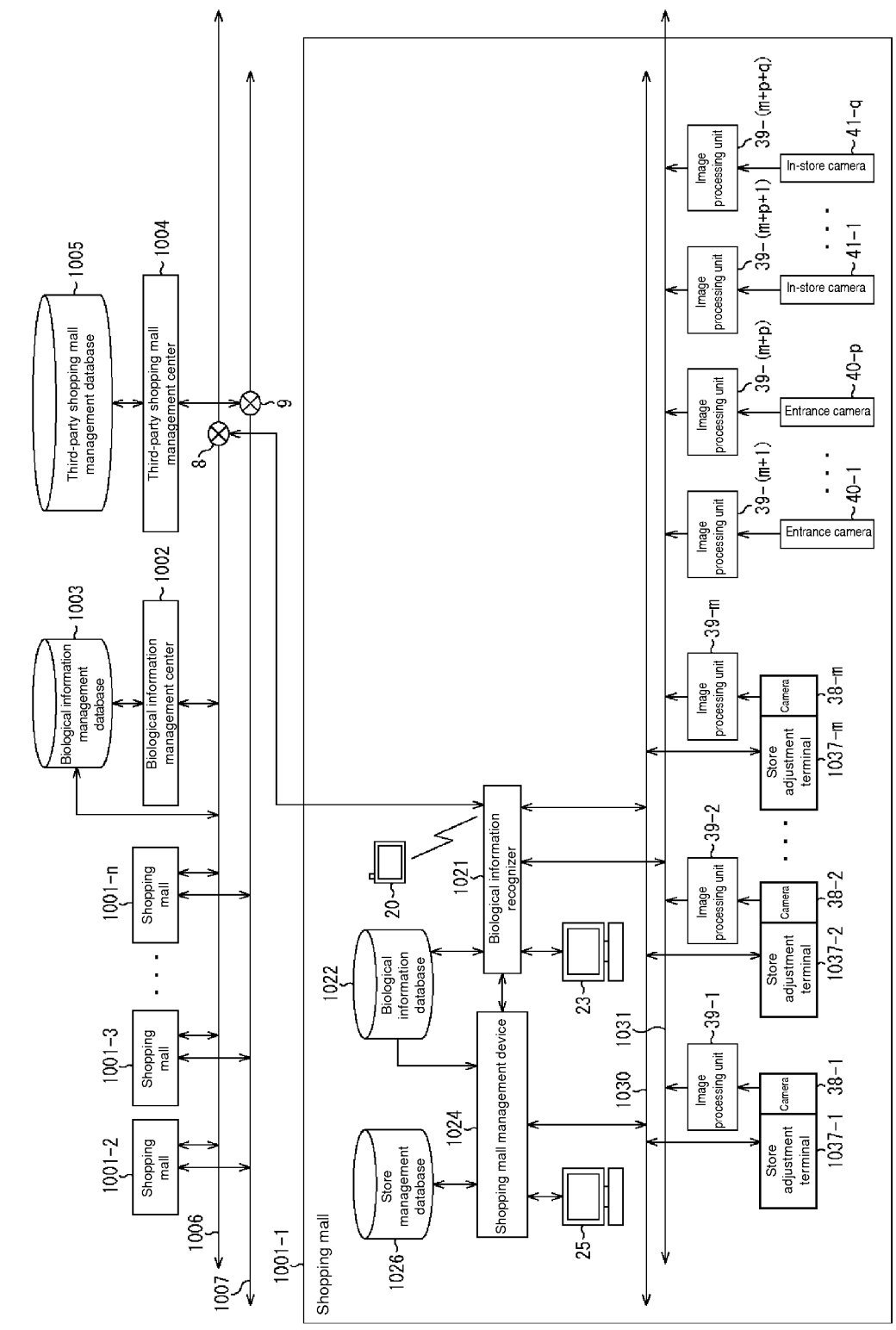
FIG. 35 is a view illustrating a configuration example of a commercial complex sales support system according to an embodiment.

FIG. 35 is a view illustrating a configuration of a sales support system of a shopping mall that is of the commercial complex according to an embodiment of the present invention. In FIG. 35, the configuration including the same function as that in FIGS. 1, 19, and 27 is designated by the same numeral, and the description is omitted as appropriate. The commercial complex sales support system in FIG. 35 includes a shopping mall 1001 to a third-party shopping mall management bus 1007, a biological information recognizer 1021, a biological information DB 1022, a shopping mall management device 1024, a store management DB 1026, a shopping mall management information bus 1030, a biological information bus 1031, and a store adjustment terminal 1037 instead of the amusement shop 1 to the third-party amusement shop management bus 7, the biological information recognizer 21, the biological information DB 22, the amusement shop management device 24, the amusement machine management DB 26, the amusement shop management information bus 30, the biological information bus 31, and the amusement machine peripheral terminal 37 in FIG. 1, the dealer 501 to the third-party dealer management bus 507, the biological information recognizer 521, the biological information DB 522, the dealer management device 524, the product management DB 526, the dealer management information bus 530, the biological information bus 531, and the adjustment terminal 537 in FIG. 19, or the amusement park 801 to the third-party amusement park management bus 807, the biological information recognizer 821, the biological information DB 822, the amusement park management device 824, the attraction management DB 826, the amusement park management information bus 830, the biological information bus 831, and the entry management terminal 837 in FIG. 27.

Shopping malls 1001-1 to 1001-n are what is called commercial complexes, and are commercial facilities each of which includes plural stores. The stores include facilities, such as a clothing store, a variety store, a grocery store, and a restaurant, which provide not only articles but also various kinds of service. The shopping malls 1001-1 to 1001-n are also affiliated shopping malls or member facilities of a biological information management center or a third-party shopping mall management center. In the shopping malls 1001-1 to 1001-n, plural shopping malls need to be integrally managed. The shopping malls 1001-1 to 1001-n are connected to one another by the biological information management bus 1006 and the third-party shopping mall management bus 1007. The shopping malls 1001-1 to 1001-n transmit and receive the biological information and third-party shopping mall management information to and from one another through the buses 1006 and 1007 and the public communication line networks 8 and 9 typified by the Internet.

The biological information management bus 1006 is identical to the biological information management bus 6, and acts as a transmission line through which the biological information mainly managed by the biological information recognizer 1021 of each shopping mall 1001 flows. The third-party shopping mall management bus 1007 acts as a transmission line through which use management information mainly managed by the store adjustment terminal 1037 of each shopping mall 1001 flows. The use management information is used to manage the kind of the store installed in the shopping mall and the number of users (purchases who purchase the products in the store).

The biological information management center 1002 corresponds to the biological information management center 2, and is a server that is used by a business operator who manages and operates the biological information management center.

The third-party shopping mall management center 1004 corresponds to the third-party amusement shop management center 4, and is a server that is used by a business operator who manages and operates the third-party shopping mall management center.

The biological information recognizer 1021 corresponds to the biological information recognizer 21, and matches the information on the face image, which is extracted from images captured by the cameras 38-1 to 38-*m*, the entrance cameras 40-1 to 40-*p*, and the in-store cameras 41-1 to 41-*q* by the image processing units 39-1 to 39-(*m*+*p*+*q*) and supplied through the biological information bus 1031, against the face image previously registered in the biological information DB 1022. The cameras 38-1 to 38-*m* are provided in the store adjustment terminal 1037 in order to capture the image of the purchaser (or the user) who checks out in purchasing the product of the store in the shopping mall 1001. When the face images matched with each other, entry management information on the registered person is added to the biological information DB 1022 to update the biological information DB 1022, and various pieces of information are displayed on the display unit 23 including the CRT (Cathode Ray Tube) or the LCD (Liquid Crystal Display) as needed basis.

The shopping mall management device 1024 corresponds to the amusement shop management device 24. The shopping mall management device 1024 manages information on a purchase clock time of the purchaser (the user) who purchases the product in the store while correlating the information on the purchase clock time with information identifying the store that is identified by the store adjustment terminal 1037 through the shopping mall management information bus 1030. The shopping mall management device 1024 obtains visiting information including the kind of the store, in which the purchase of the product is checked by the store adjustment terminal 1037, from the store adjustment terminal 1037, and displays the visiting information on the display unit 25 including the CRT or the LCD. Using the store management DB 1026, the shopping mall management device 1024 manages the visiting management information indicating the kind of the store, in which the purchase of the product is checked by each of the store adjustment terminals 1037-1 to 1037-*m*, while correlating the visiting management information with the identification information identifying each of them (for example, a store identification number). A store name, a category, and floor information are registered in the store management DB 1026 while correlated with the store identification number.

The store adjustment terminals 1037-1 to 1037-*m* correspond to the amusement machine 36 and the amusement machine peripheral terminal 37. In the adjustment, the store adjustment terminals 1037-1 to 1037-*m* read the product information identified by a barcode or a QR code, which is added to each product, calculates and present an adjustment amount, performs a change amount and credit card payment, and issues a receipt as needed basis. The camera 38, which is installed while corresponding to the adjustment terminal 1037, obtains the pieces of biological information, such as the face image of the purchaser who purchases the product, and transmits the pieces of biological information to the biological information recognizer 1021 from the corresponding image processing unit 39 together with the store identification information (the store identification number).

[Configuration Example of Biological Information Recognizer in Commercial Complex Sales Support System in FIG. 35]

Figure 36:
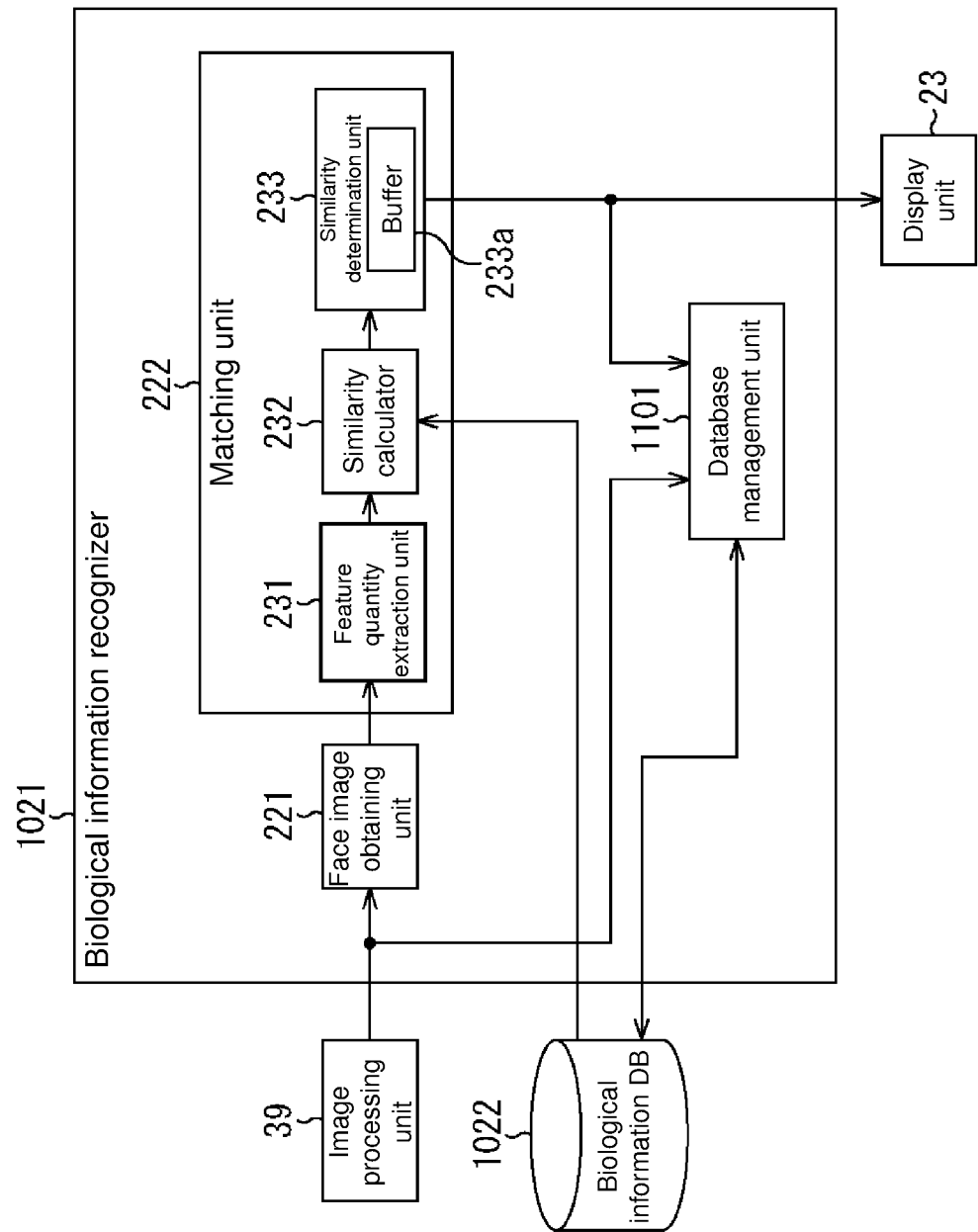
FIG. 36 is a view illustrating a configuration example of a biological information recognizer in FIG. 35.

A configuration example of the biological information recognizer 1021 will be described below with reference to FIG. 36. In FIG. 36, the configuration including the same function as the biological information recognizer 21 in FIG. 10, the biological information recognizer 521 in FIG. 20, and the biological information recognizer 821 in FIG. 28 is designated by the same numeral, and the description is omitted. The biological information recognizer 1021 in FIG. 36 differs from the biological information recognizer 21 in FIG. 10, the biological information recognizer 521 in FIG. 20, and the biological information recognizer 821 in FIG. 28 in that a database management unit 1101 is provided instead of the database management unit 223, 601, or 901.

The database management unit 1101 registers a clock time at which the person having the face image purchases the product of the store in the shopping mall (the clock time at which the face image is obtained) and the store identification information identifying the store in which the product is purchased in the biological information DB 1022.

[Configuration Example of Biological Information Database in Commercial Complex Sales Support System in FIG. 35]

A configuration example of the biological information database 1022 will be described below with reference to FIG. 37.

Figure 37:
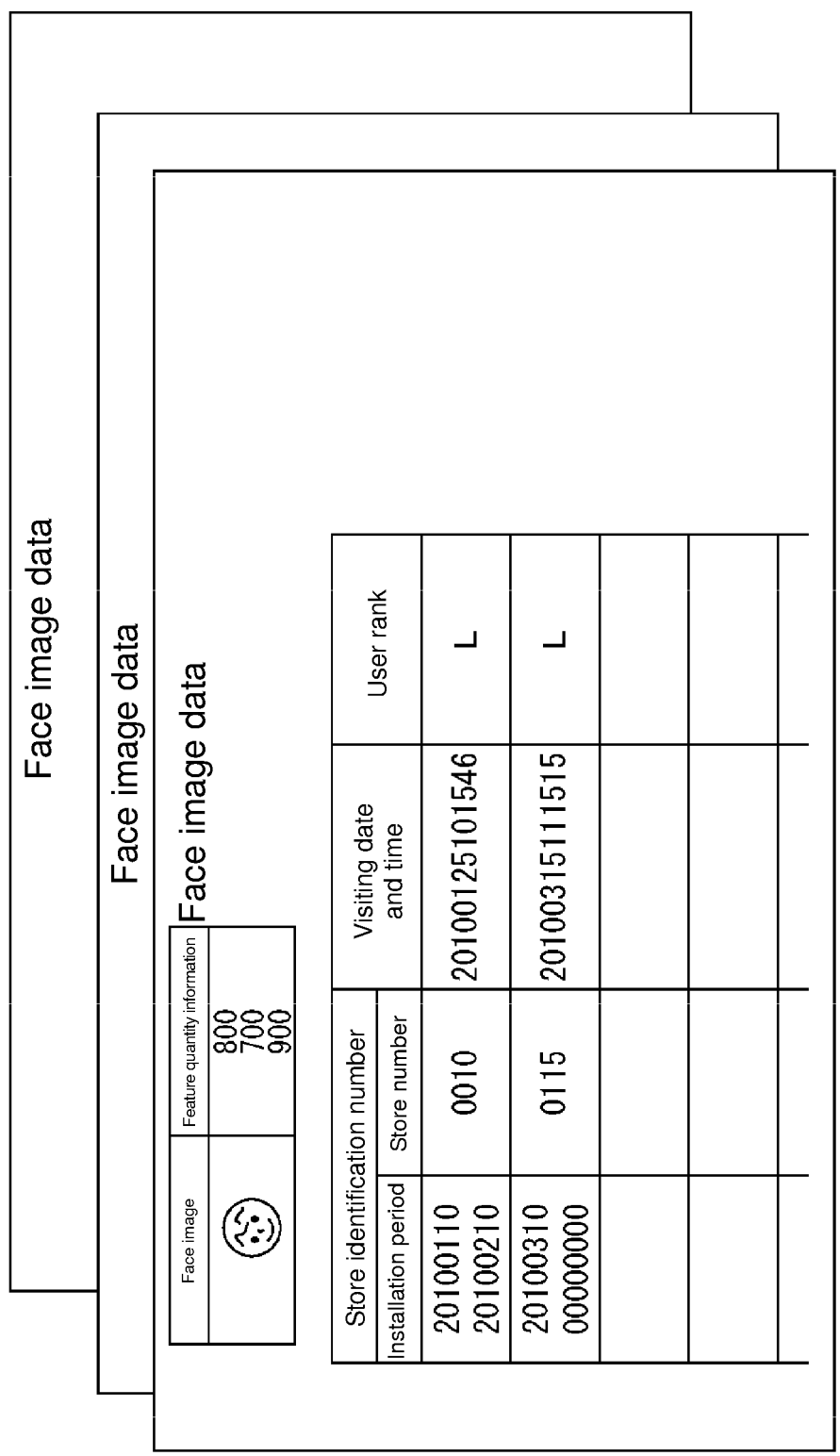
FIG. 37 is a view illustrating a configuration of a biological information database in FIG. 35.

As illustrated in FIG. 37, the biological information DB 1022 is a database including sheet-like face image data managed in each face image, and the database management unit 1101 registers the visiting information on the person having the face image while correlating the visiting information with the face image. Each sheet including the face image data, feature quantity information is registered in a feature quantity information field while correlated with the face image registered in a face image field. A store identification number field, a visiting date and time field, and a user rank field are also provided in the biological information DB 1022. The store identification number, the visiting date and time at which the product is purchased in the store, and the user rank that is set based on the visiting frequency to the shopping mall 1001 are registered in the store identification number field, the visiting date and time field, and the user rank field, respectively. The database management unit 1101 registers the face image obtained by the face image obtaining unit 221 in the face image field. The database management unit 1101 registers the store identification number, which is supplied together with the face image, in the store identification number field. The store identification number is information specifying the store, at which the product is purchased by the person in which the face image is supplied, and the store identification number is registered in the store identification number field.

The store identification number includes an installation period during which the store in which the purchase of the product is checked is installed and a store number used to identify the store. The installation period and the store number are recorded in an installation period field and a store number field.

For example, the installation periods are "20100110201002100010" and "20100310000000000115" as illustrated in the top stage and the second stage in FIG. 37. The store identification number of the top stage indicates the store, in which the product is sold from Jan. 10, 2010 to Feb. 10, 2010 and identified by the store number "0010". That is, in "20100110201002100010", the starting time of the installation period is "20100110", the ending time is "20100210", and the store number is "0010".

For the store identification number of the second stage, in "20100310000000000115", the starting time of the installation period is "20100110", the ending time is "00000000", and the store number is "0115". The ending time "00000000" indicates that the store is currently installed and that the ending time is not set. That is, the store identification number of the second stage indicates that the store is currently installed since Mar. 10, 2010 and identified by the store number "0115".

The information on the visiting date and time indicating the clock time, at which the person identified by the face image purchases the product in the store assigned by the store identification number, is recorded in the visiting date and time field. In FIG. 37, "20100125101546" and "20100315111515" are recorded in the top stage and the second stage of the visiting date and time field. That is, the top stage in FIG. 37 indicates that the person identified by the face image purchases the product in the store having the store identification number "20100110201002100010" at 10:15:46 on Jan. 25, 2010. The second stage in FIG. 37 indicates that the person identified by the face image purchases the product in the store having the store identification number "20100310000000000115" at 11:15:15 on Mar. 15, 2010.

The user rank is indicated on a scale of H (Heavy), M (Middle), and L (Light) according to the visiting frequency of the visitor identified by the face image, and the user rank is recorded in the user rank field. When updating the face image data, the database management unit 1101 records the user rank as L in the initial state. After that, the database management unit 1101 calculates the visiting frequency from the information on the visiting date and time. The database management unit 1101 records the user rank as M when the visiting frequency is higher than a predetermined frequency, and the database management unit 1101 records the user rank as H when the visiting frequency is further higher. On the other hand, when the visiting frequency decreases, the database management unit 1101 changes the user rank from H to M or from M to L.

[Configuration Example of Shopping Mall Management Device in Commercial Complex Sales Support System in FIG. 35]

Figure 38:
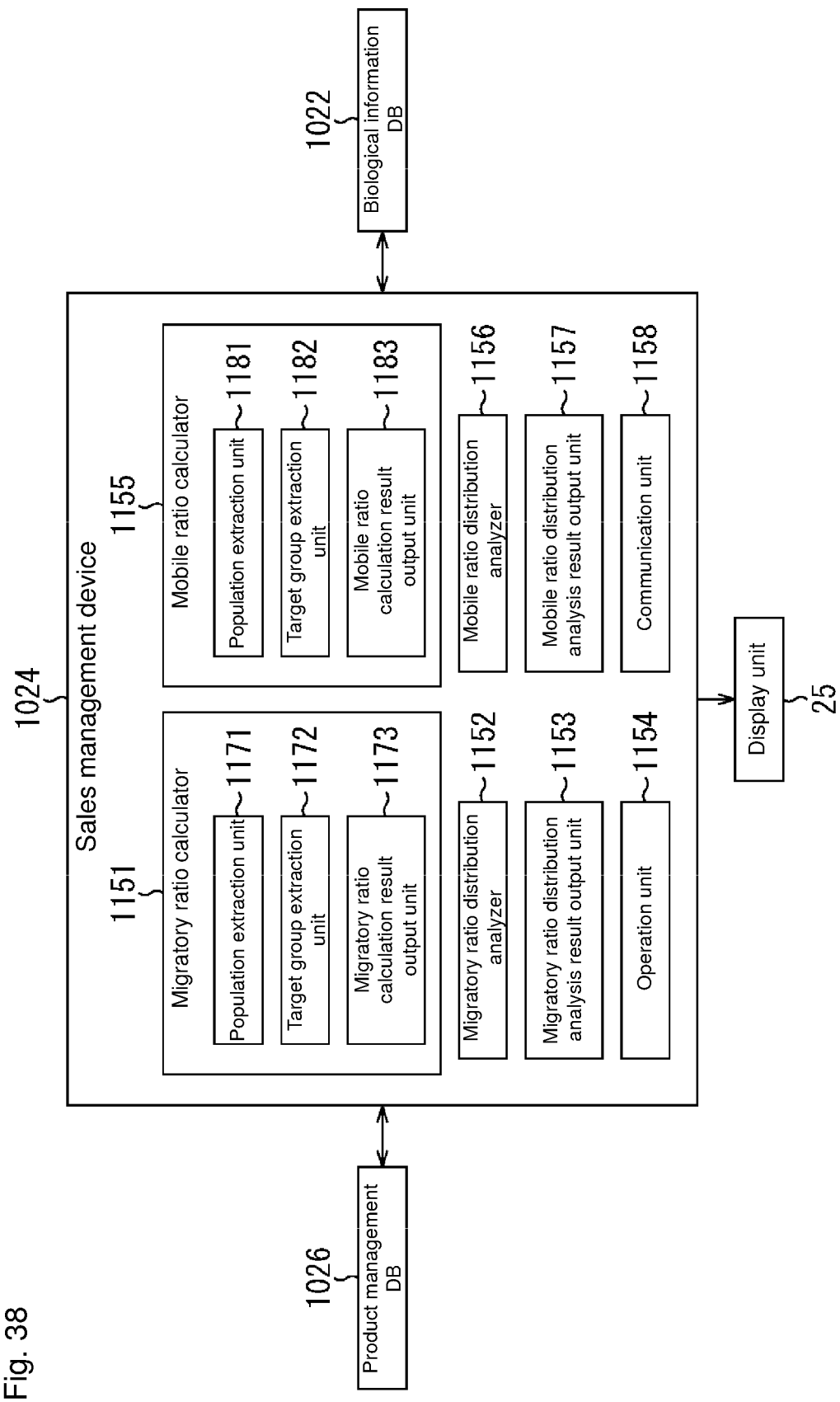
FIG. 38 is a view illustrating a configuration example of a shopping mall management device in FIG. 35.

A configuration example of the shopping mall management device 1024 will be described below with reference to FIG. 38.

The shopping mall management device 1024 corresponds to the amusement shop management device 24. The shopping mall management device 1024 obtains the migratory ratio and the mobile ratio with the visitors who purchase the product in the specific store (the users who have dinner or use the service) as the population from the face image data registered in the biological information DB 1022 and the individual information on the store registered in the store management DB 1026, and provides the sales support information.

More particularly, the shopping mall management device 1024 specifies the currently-installed store by the store name, the category, and the floor of the store, and calculates the migratory ratio indicating the ratio at which the user who uses the specified store migrates to other attractions in each of other attractions. The shopping mall management device 1024 specifies the store, which is not currently installed but installed in past times, by the store name, the category, and the floor of the store, and calculates the mobile ratio indicating the ratio at which the user who used the specified store moves to other currently-installed stores in each of other currently-installed stores. The shopping mall management device 1024 analyzes the migratory ratio or the mobile ratio in each store, and provides the sales support information based on the analysis result.

The shopping mall management device 1024 includes a migratory ratio calculator 1151, a migratory ratio distribution analyzer 1152, a migratory ratio distribution analysis result output unit 1153, an operation unit 1154, a mobile ratio calculator 1155, a mobile ratio distribution analyzer 1156, a mobile ratio distribution analysis result output unit 1157, and a communication unit 1158.

The migratory ratio calculator 1151 includes a population extraction unit 1171, a target group extraction unit 1172, and a migratory ratio calculation result output unit 1173, and calculates the migratory ratio. The population extraction unit 1171 extracts the information on the number of persons of the population necessary for the calculation of the migratory ratio. More specifically, when the operation unit 1154 including the keyboard and the operating button is operated to input the store name, the category, or the floor as the information specifying the store, which is currently installed in the shopping mall and used by the person who becomes the population, the population extraction unit 1171 accesses the store management DB 1026 to specify the store identification number of the currently-installed store, which should be specified, based on the input information. Based on the specified store identification number, the population extraction unit 1171 accesses the biological information DB 1022 to extract the face image data in which the visiting management information indicating the use of the store having the specified store identification number is recorded, and obtains the number of persons who become the population from the number of pieces of extracted face image data.

The target group extraction unit 1172 extracts the face image data including the visiting management information indicating the visit of the user is checked in each of the currently-installed stores except the specified store in the population necessary to obtain the migratory ratio, and obtains the number of pieces of face image data as the number of persons of the target group.

The migratory ratio calculation result output unit 1173 calculates the ratio of the target group to the population as the migratory ratio in each store by dividing the number of persons of the target group by the number of persons of the population.

The migratory ratio distribution analyzer 1152 collects the calculation results of the migratory ratio, which is obtained in each store, and obtains a distribution of the stores. For example, the migratory ratio distribution analyzer 1152 extracts pieces of information on the top n stores, and generates the sales support information as the analysis result based on the trend of the pieces of information.

The migratory ratio distribution analysis result output unit 1153 generates a graph indicating the migratory ratio information in each of the stores collected by the migratory ratio distribution analyzer 1152, and displays the graph on the display unit 25 together with the analysis result of the migratory ratio distribution analyzer 1152.

The mobile ratio calculator 1155 includes a population extraction unit 1181, a target group extraction unit 1182, and a mobile ratio calculation result output unit 1183, and calculates the mobile ratio. The population extraction unit 1181 extracts information on the number of persons of the population necessary for the calculation of the mobile ratio. More specifically, when the operation unit 1154 including the keyboard and the operating button is operated to input the store name, the category, or the floor as the information specifying the store, which was installed in past times in the shopping mall and used by the person who becomes the population, the population extraction unit 1181 accesses the store management DB 1026 to specify the store identification number of the store installed in past times, which should be specified, based on the input information. Based on the specified store identification number, the population extraction unit 1181 accesses the biological information DB 1022 to extract the face image data in which the visiting management information indicating the use of the store having the specified store identification number is recorded, and obtains the number of persons who become the population from the number of pieces of extracted face image data.

The target group extraction unit 1182 extracts the face image data including the visiting management information indicating the visit of the user in each of the currently-installed stores except the specified store in the population necessary to obtain the migratory ratio, and obtains the number of pieces of face image data as the number of persons of the target group.

The mobile ratio calculation result output unit 1183 calculates the ratio of the target group to the population as the mobile ratio in each store by dividing the number of persons of the target group by the number of persons of the population.

The mobile ratio distribution analyzer 1156 collects the calculation results of the mobile ratio, which is obtained in each store, and obtains a distribution of the stores. For example, the mobile ratio distribution analyzer 1156 extracts the pieces of information on the top n stores, and generates the sales support information as the analysis result based on the trend of the pieces of information.

The mobile ratio distribution analysis result output unit 1157 generates a graph indicating the mobile ratio information in each of the stores collected by the mobile ratio distribution analyzer 1156, and displays the graph on the display unit 25 together with the analysis result of the mobile ratio distribution analyzer 1156.

For example, the communication unit 1158 is constructed by an Ethernet board. The communication unit 1158 conducts communication with the biological information recognizer 1021, the amusement machine management DB 1026, and the biological information DB 1022 to transmit and receive various pieces of information to and from these units.
[Configuration Example of Store Management Database in Commercial Complex Sales Support System in FIG. 35]

A configuration example of the Store management database 1026 will be described below with reference to FIG. 39.

The pieces of information on the stores, such as the store name, the category, and the floor of the currently-installed store or the store installed in past times, are recorded in the store management DB 1026 based on the store identification number.

Because the store identification number is identical to that of the biological information DB 1022 in FIG. 37, the description is omitted. The individual store name of the store is registered in a store name field. The category of the product is recorded in a category field. For example, "CL" indicating the clothing store and "Food" indicating an eating house are recorded in the category field. Information indicating category except the categories in FIG. 39 may be recorded. Information on the floor on which the store is installed in the shopping mall is recorded in a floor field. Accordingly, in the store having the store identification numbers "20100310201004100001" and "20100310201004100002" in FIG. 37, the store name is "S", the category is "CL", and the floor is a "first floor". In the store having the store identification numbers "20100310201004100003" and "20100310201004100004", the store name is "T", the category is "CL", and the floor is a "third floor". In the store having the store identification numbers "20100510000000000001" and "20100510000000000002", the store name is "U", the category is "Food", and the floor is a "ninth floor".
[Visiting Management Information Management Processing in Commercial Complex Sales Support System in FIG. 35]

Figure 40:
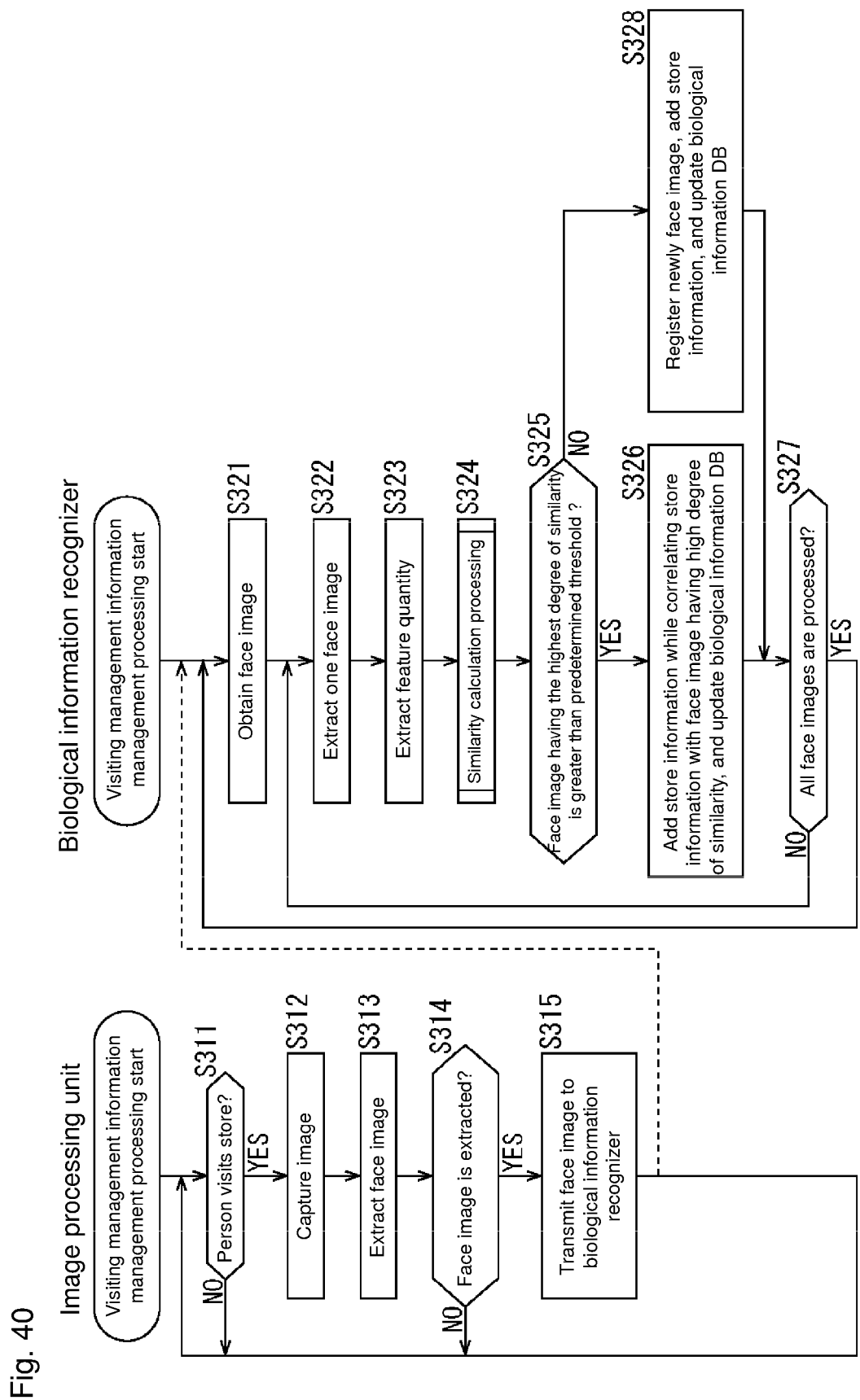
FIG. 40 is a flowchart illustrating visiting management information management processing.

Visiting management information management processing will be described below with reference to a flowchart in FIG. 40.

Because the pieces of processing in Steps S312 to S315 and Steps 321 to S325 and 3127 are identical to those in Steps S1 to S4 and Steps S21 to S25 and S27 in FIG. 14, the description is omitted.

In Step S311, the store adjustment terminal 1037 determines whether the customer who visits the checkout counter to purchase the product can be checked by reading the pieces of recognition information, such as the barcode of the product to perform the adjustment processing. The store adjustment terminal 1037 repeats the same processing in Step S311 until the purchase of the product by the customer is checked. When the purchase of the product by the customer is checked in Step S311, the store adjustment terminal 1037 determines that the customer visits the store. Then the processing goes to Step S312. The face image is obtained through the processing in Step S312, and the face image is transmitted to the biological information recognizer 1021. In Step S315, the transmitter 203 transmits the face image to the biological information recognizer 1021 while adding the store identification number identifying the store and the information on the visiting clock time (the image capturing clock time) to the face image.

In Steps S321 to S325, the degree of similarity between the supplied face image and the registered face image is obtained to perform the matching.

When determining that the top degree of similarity is larger than the predetermined threshold in Step S325, the similarity determination unit 233 supplies the top face image to the database management unit 1101 in Step S326. The database management unit 1101 accesses the biological information DB 1022 to search the face image data managed in association with the supplied face image. The database management unit 1101 registers the visiting date and time and the user rank while correlating the visiting date and time and the user rank with the store identification number added to the face image. At this point, the database management unit 1101 registers the time the face image is initially detected with respect to the visiting date and time. The database management unit 1101 calculates and registers the visiting frequency to the shopping mall of the customer managed by the face image based on the information on the visiting date and time.

On the other hand, when the top degree of similarity supplied by the similarity calculator 232 is not larger than the predetermined threshold in Step S325, namely, when the degree of similarity of the face image of the most similar registered person is less than the predetermined threshold, the flow goes to the processing in Step S328.

In Step S328, the similarity determination unit 233 supplies the face image, which is supplied from the image processing unit 39, to the database management unit 1101. The database management unit 1101 accesses the biological information DB 1022, newly generates the face image data using the supplied face image, and registers the face image data. The database management unit 1101 registers the visiting date and time and the user rank while correlating the visiting date and time and the user rank with the store identification number added to the face image.

Through the above pieces of processing, based on the face image supplied by the image processing unit 39, the biological information recognizer 1021 can sequentially accumulate the visiting management information in the biological information DB 1022 in each face image of the customer.

[Event Strategy Analysis Processing in Commercial Complex Sales Support System in FIG. 35]

Figure 41:
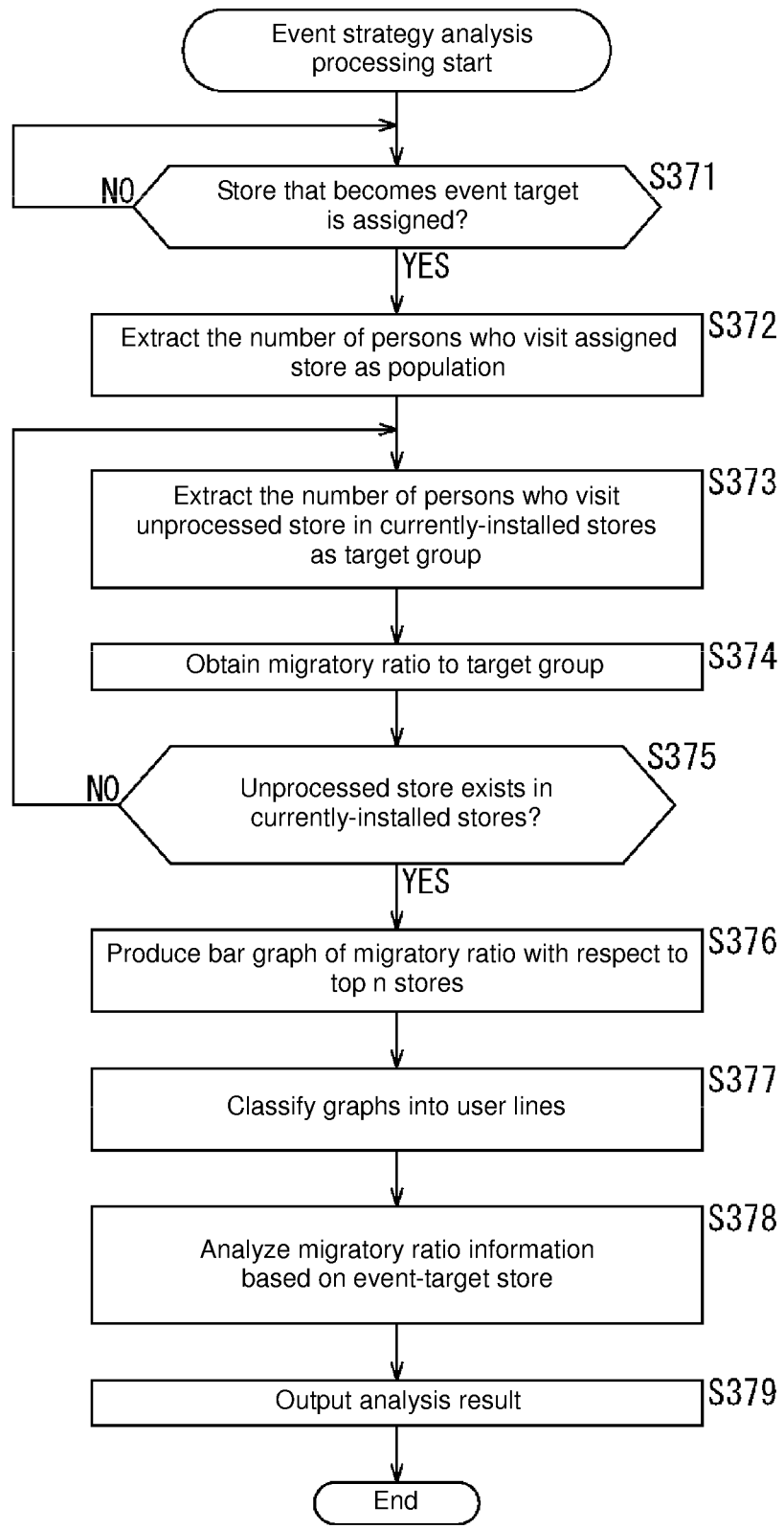
FIG. 41 is a flowchart illustrating event strategy analysis processing in the commercial complex sales support system in FIG. 35.

Event strategy analysis processing will be described below with reference to a flowchart in FIG. 41.

In Step S371, the migratory ratio calculator 1151 determines whether the operation unit 1154 is operated to perform the input to the store that becomes the event target candidate in the currently-installed stores. The migratory ratio calculator 1151 repeats the same processing in Step S371 until the input is performed. When the operation unit 1154 is operated to perform the input to the store that becomes the event target candidate in the currently-installed stores in Step S371, the flow goes to the processing in Step S372.

In Step S372, the population extraction unit 1171 of the migratory ratio calculator 1151 controls the communication unit 1158 to access the store management DB 1026 and the biological information DB 1022, and extracts the number of customers who use the store that becomes the event target candidate as the population of the migratory ratio.

In Step S373, the target group extraction unit 1172 of the migratory ratio calculator 1151 sets the unprocessed store in the currently-installed stores to the processing target store, searches the face image data in which the visiting management information indicating the visit to the processing target store is registered from the pieces of face image data that become the population, and extracts the face image data as the target group.

In Step S374, the migratory ratio calculation result output unit 1173 calculates the ratio of the number of persons of the target group to the number of persons of the population as the migratory ratio, and outputs the migratory ratio.

In Step S375, the target group extraction unit 1172 determines whether the unprocessed store in which the migratory ratio is not obtained exists in the currently-installed stores. When the unprocessed store in which the migratory ratio is not obtained exists, the flow returns to the processing in Step S373. That is, the pieces of processing in Steps S373 to S375 are repeated until the store in which the migratory ratio is not obtained is eliminated in the currently-installed stores except the store assigned as the population.

When the target group extraction unit 1172 determines that the unprocessed store does not exist in Step S375, the flow goes to the processing in Step S376.

In Step S376, the migratory ratio distribution analyzer 1152 obtains the orders of the migratory ratios based on the pieces of information on all the obtained migratory ratios, and generates bar graphs with respect to the top n migratory ratios while correlating the bar graphs with the stores.

In Step S377, the migratory ratio distribution analyzer 1152 classifies the generated bar graph of the migratory ratio into the user ranks in terms of the ratio of the number of persons.

In Step S378, the migratory ratio distribution analyzer 1152 analyzes the information obtained from the order of the migratory ratio in each store, and outputs the information on the store that should be the event target as the analysis result.

In the case that the kind of the store is considered instead of the model of the amusement machine, assuming that the customer who uses the store "AA" in FIG. 17 is the population, the customer who uses the store "AA" tends to migrate to use the stores "BB" and "AB". Therefore, for example, in the case that the event is held for the store "AA", the analysis result shows that the customers who have the same taste disperse in each store to possibly reduce the customer attracting efficiency when the stores "BB" and "AB" are also included in the target store. In FIG. 17, the analysis result also shows that, because the ratio of the customer having the high visiting frequency is high with respect to the store "ABC" although the migratory ratio is low, when the store "ABC" is also set to the event target store, possibly the customers disperse while the customers having the high visiting frequency can be collected in the event.

In Step S379, the migratory ratio distribution analysis result output unit 1153 displays the obtained bar graph and analysis result information on the display unit 25.

Through the above pieces of processing, how the user who uses the specific store installed in the shopping mall migrates to use the stores except the specific store can be obtained as the migratory ratio. By way of example, the store is specified in the fourth embodiment. Alternatively, the migratory ratio in each category of the store or the migratory ratio in each floor of the store is obtained while the user who uses the specific store is set to the population, whereby the category or the floor of the store that the user who uses the specific store tends to migrate to use can be understood, and the store that should be adopted in the event or the store that should not be adopted in the event can be studied from the view point of the category or the floor. Not only the user who uses the specific store, but also the user who uses the store of the specific category or floor may be set to the population.

[Replacement Store Analysis Processing in Commercial Complex Sales Support System in FIG. 35]

Figure 42:
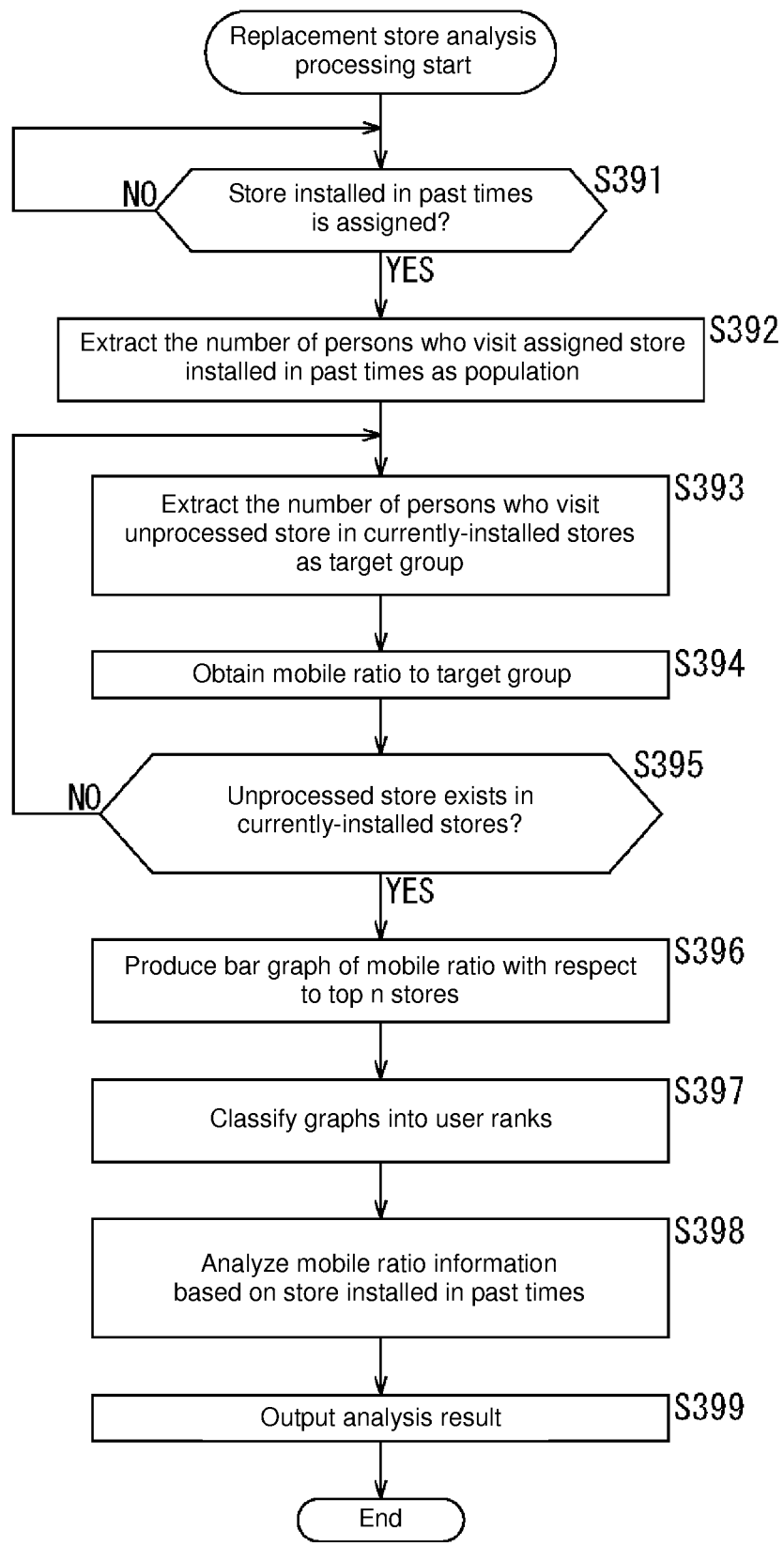
FIG. 42 is a flowchart illustrating replacement store analysis processing in the commercial complex sales support system in FIG. 35.

Replacement store analysis processing will be described below with reference to a flowchart in FIG. 42.

In Step S391, the mobile ratio calculator 1155 determines whether the operation unit 1154 is operated to perform the input to the store, which was installed in past times and replaced by new another store. The mobile ratio calculator 1155 repeats the same processing in Step S391 until the input is performed. When the operation unit 1154 is operated to perform the input to the replaced store installed in past times in Step S391, the flow goes to the processing in Step S392.

In Step S392, the population extraction unit 1181 of the mobile ratio calculator 1155 controls the communication unit 1158 to access the store management DB 1026 and the biological information DB 1022, and extracts the number of users who use the replaced store as the population of the mobile ratio.

In Step S393, the target group extraction unit 1182 of the mobile ratio calculator 1155 sets the unprocessed store in the currently-installed stores to the processing target store, searches the face image data in which the visiting management information indicating the visit to the processing target store is registered from the pieces of face image data that become the population, and extracts the face image data as the target group.

In Step S394, the mobile ratio calculation result output unit 1183 calculates the ratio of the number of persons of the target group to the number of persons of the population as the mobile ratio, and outputs the mobile ratio.

In Step S395, the target group extraction unit 1182 determines whether the unprocessed store in which the mobile ratio is not obtained exists in the currently-installed stores. When the unprocessed store in which the mobile ratio is not obtained exists, the flow returns to the processing in Step S393. That is, the pieces of processing in Steps S393 to S395 are repeated until the store in which the mobile ratio is not obtained is eliminated in the currently-installed stores.

When the target group extraction unit 1182 determines that the unprocessed store does not exist in Step S395, the flow goes to the processing in Step S396.

In Step S396, the mobile ratio distribution analyzer 1156 obtains the orders of the mobile ratios based on the pieces of information on all the obtained mobile ratios, and generates bar graphs similar to those in FIG. 17 with respect to the top n mobile ratios while correlating the bar graphs with the attractions.

In Step S397, the mobile ratio distribution analyzer 1156 classifies the generated bar graph of the mobile ratio into the user ranks in terms of the ratio of the number of persons. Because this is identical to that in FIG. 17, the description is omitted.

In Step S398, the mobile ratio distribution analyzer 1156 analyzes the information obtained from the order of the mobile ratio in each store, and outputs the information indicating which store the user who used the store, which was installed in past times and already replaced, uses as the analysis result. In the case that the store is considered instead of the model of the amusement machine, assuming that the user who uses the store "B" in FIG. 17 is the population, the user who used the store "B" becomes the user of the stores "BB" and "AB". Therefore, when the mobile ratio is maintained with respect to the stores "BB" and "AB", it can be recognized that the user does not move to another store even if the store "B" is replaced. In FIG. 17, the analysis result also shows that, because the ratio of the user having the high visiting frequency is high with respect to the store "ABC" although the migratory ratio is low, the use of the store "ABC" is maintained, whereby the user having the high visiting frequency does not defect from the shopping mall in the users who use the store "BB".

In Step S399, the mobile ratio distribution analysis result output unit 1157 displays the obtained bar graph and analysis result information on the display unit 25.

Through the above pieces of processing, which store the user who uses the specific store installed in the shopping mall uses can be obtained as the mobile ratio after the specific store is removed. By way of example, the store is specified in the fourth embodiment. Alternatively, the mobile ratio in each category of the store or the mobile ratio in each floor of the store is obtained while the user who uses the specific store is set to the population, whereby the category or the floor of the store to which the user who uses the specific store tends to change can be understood, and the store that should be replaced or the store that should not be replaced can be studied from the view point of the category or the floor. Not only the user who uses the specific store, but also the user who uses the store of the specific category or floor may be set to the population.

By way of example, the shopping mall sales support system is constructed by the plural devices. It is not necessary that the shopping mall sales support system be constructed by the individual devices. For example, the biological information recognizer 1021 and the shopping mall management device 1024 may be constructed as an information processing apparatus that acts as both the biological information recognizer 1021 and the shopping mall management device 1024, or the whole shopping mall sales support system may be constructed by one device.

Accordingly, the trend of the customer is correctly understood by obtaining the migratory ratio or the mobile ratio of the customer, which allows the support to the marketing strategy for attracting customers.

The sequence of pieces of processing can be performed by either hardware or software. In the case that the sequence of pieces of processing is performed by the software, a program constituting the software is installed from a recording medium to a computer incorporated in dedicated hardware or a general-purpose personal computer in which various functions can be performed by installing various programs.

Figure 43:
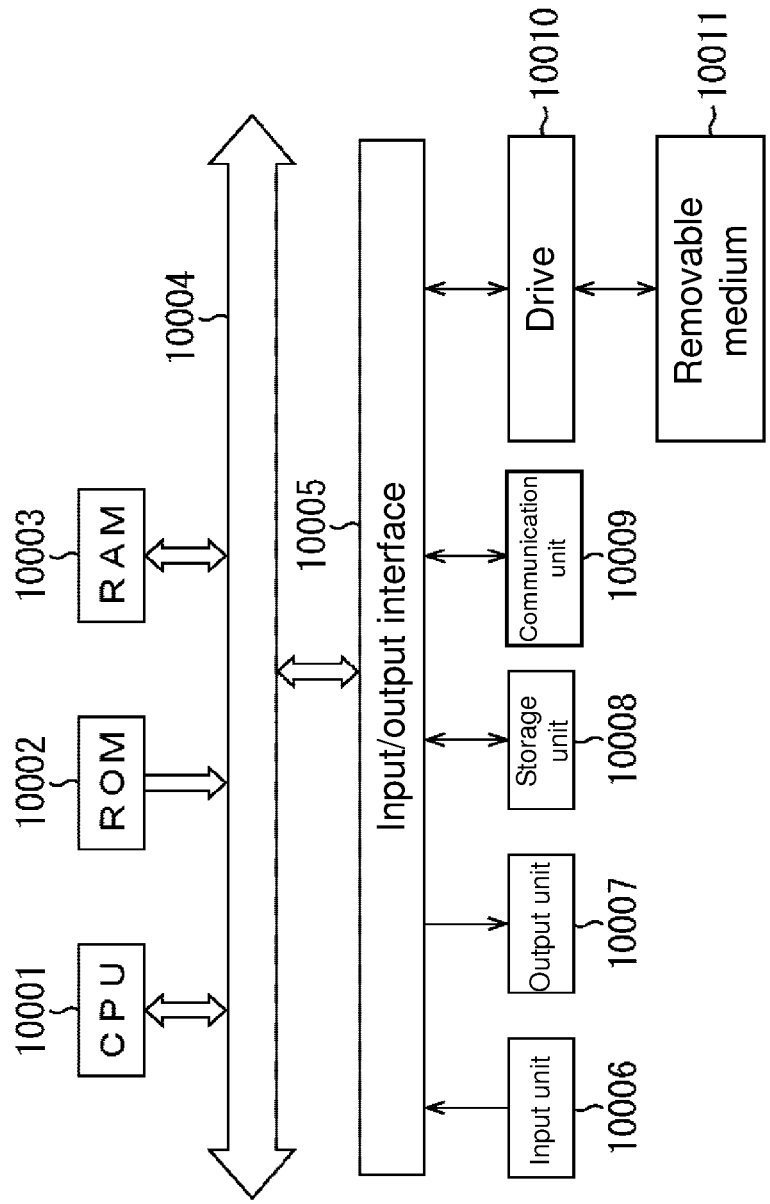
FIG. 43 is a view illustrating a configuration example of a personal computer.

FIG. 43 illustrates a configuration example of the general-purpose personal computer. The personal computer is provided with a CPU (Central Processing Unit) 10001. An input/output interface 10005 is connected to the CPU 10001 through a bus 10004. A ROM (Read Only Memory) 10002 and a RAM (Random Access Memory) 10003 are connected to the bus 10004.

An input unit 10006, an output unit 10007, a storage unit 10008, and a communication unit 10009 are connected to the input/output interface 10005. The input unit 10006 includes input devices, such as the keyboard and the mouse, through which the user inputs an operating command. The output unit 10007 outputs the image of a processing operating screen or a processing result to the display device. The storage unit 10008 includes a hard disk drive in which the program and various pieces of data are stored. The communication unit 10009 includes a LAN (Local Area Network) adapter and the like to perform communication processing through the network typified by the Internet. A drive 10010 is also connected to the input/output interface 10005. A drive 10010 is connected to the input/output interface 10005. The drive 10010 reads and write the data from and in removable mediums 10011, such as a magnetic disk (including a flexible disk), an optical disk (including a CD-ROM (Compact Disc-Read Only Memory) and a DVD (Digital Versatile Disc)), a magneto-optical disk (including a MD (Mini Disc)), and a semiconductor memory.

The CPU 10001 performs various pieces of processing according to the program stored in the ROM 10002 or the program, which is read from the removable mediums 10011, such as the magnetic disk, the optical disk, the magneto-optical disk, and the semiconductor memory, installed in the storage unit 10008, and loaded from the storage unit 10008 to the RAM 10003. The data necessary for the CPU 10001 to perform various pieces of processing are properly stored in the RAM 10003.

In the description, the step that describes the program recorded in the recording medium includes not only the processing that is performed in time series in the described order but also the processing that is not necessarily performed in time series but concurrently or individually performed.

In the description, the system means the whole apparatus including plural apparatuses.

Accordingly, the trend of the customer is correctly understood by obtaining the migratory ratio or the mobile ratio of the customer, which allows the support to the marketing strategy for attracting customers.

The sequence of pieces of processing can be performed by either hardware or software. In the case that the sequence of pieces of processing is performed by the software, a program constituting the software is installed from a recording medium to a computer incorporated in dedicated hardware or a general-purpose personal computer in which various functions can be performed by installing various programs.

FIG. 19 illustrates a configuration example of the general-purpose personal computer. The personal computer is provided with a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input unit 1006, an output unit 1007, a storage unit 1008, and a communication unit 1009 are connected to the input/output interface 1005. The input unit 1006 includes input devices, such as the keyboard and the mouse, through which the user inputs an operating command. The output unit 1007 outputs the image of a processing operating screen or a processing result to the display device. The storage unit 1008 includes a hard disk drive in which the program and various pieces of data are stored. The communication unit 1009 includes a LAN (Local Area Network) adapter and the like to perform communication processing through the network typified by the Internet. A drive 1010 is also connected to the input/output interface 1005. The drive 1010 reads and write the data from and in removable mediums 1011, such as a magnetic disk (including a flexible disk), an optical disk (including a CD-ROM (Compact Disc-Read Only Memory) and a DVD (Digital Versatile Disc)), a magneto-optical disk (including a MD (Mini Disc)), and a semiconductor memory.

The CPU 1001 performs various pieces of processing according to the program stored in the ROM 1002 or the program, which is read from the removable mediums 1011, such as the magnetic disk, the optical disk, the magneto-optical disk, and the semiconductor memory, installed in the storage unit 1008, and loaded from the storage unit 1008 to the RAM 1003. The data necessary for the CPU 1001 to perform various pieces of processing are properly stored in the RAM 1003.

In the description, the step that describes the program recorded in the recording medium includes not only the processing that is performed in time series in the described order but also the processing that is not necessarily performed in time series but concurrently or individually performed.

In the description, the system means the whole apparatus including plural apparatuses.

DESCRIPTION OF SYMBOLS 1, 1-1 to 1-$n$ Amusement shop
2 Biological information management center
3 Biological information management database
4 Third-party amusement shop management center
5 Third-party amusement shop management database
6 Biological information management bus
7 Third-party amusement shop management bus
8, 9 Public communication line network
21 Biological information recognizer
22 Biological information database
24 Amusement shop management device
26 Amusement machine management database
27 Medium lending management device
29 Medium lending management database
30 Amusement shop management information bus
31 Biological information bus
33 Adjustment/vending machine
34 Lending machine
35 Counter
36, 36-1 to 36-$m$ Amusement machine
37, 37-1 to 37-$m$ Amusement machine peripheral terminal
38, 38-1 to 38-$m$ Camera
39, 39-1 to 39-$(m+p+q)$ Image processing unit
40, 40-1 to 40-$p$ Entrance camera
41, 41-1 to 41-$q$ In-store camera

The invention claimed is:

1. An information processing apparatus comprising:
   storage for storing a face image as a face image of an accumulator in an accumulator database;
   a obtaining unit for obtaining a face image of a matching target person who uses or purchases one of a plurality of articles together with identification information identifying the article that is used or purchased by the matching target person;
   a matching unit for performing matching by calculating a degree of similarity between the face image of the matching target person, which is obtained by the obtaining unit, and the face image of the accumulator, which is stored in the storage;
   a similarity determination unit for determining whether the face image of the matching target person is the face image of the accumulator by comparing the degree of similarity, which is of a matching result of the matching unit, to a predetermined threshold;
   a recorder for recording detection of the accumulator, which is of the matching target person, in the accumulator database together with the identification information while correlating the detection of the accumulator with the face image of the accumulator, when the similarity determination unit determines that the face image of the matching target person is the face image of the accumulator;
   a population extractor for extracting the number of face images, each of which is recorded together with identification information identifying a predetermined article registered in past times, as the number of persons of a population from pieces of information included in the accumulator database; and
   a mobile ratio calculator for, assuming that the number of persons of a target group is the number of face images for each article recorded together with the pieces of identification information identifying the currently-registered articles in the pieces of information included in the accumulator database, calculating a ratio of the number of persons of the target group to the number of persons of the population as a mobile ratio of the person who uses or purchases the predetermined article with respect to the currently-registered article.

2. The information processing apparatus according to claim 1, further comprising:
   an image capturing unit for capturing an image;
   a face image extractor for extracting the face image of the matching target person from the image captured by the image capturing unit; and
   a feature quantity extractor for extracting a feature quantity from the face image of the matching target person,
   wherein the matching unit calculates the degree of similarity using feature quantities of the face image of the matching target person, which is obtained by the obtaining unit, and the face image of a registrant, which is accumulated in the storage, and matches the face image of the matching target person, which is obtained by the obtaining unit, against the face image of the registrant, which is accumulated in the storage.

3. The information processing apparatus according to claim 1, wherein the article is an amusement machine,
the obtaining unit obtains the face image of the matching target person who plays one of the plurality of amusement machines together with identification information identifying the amusement machine that is used by the matching target person,
the population extractor extracts the number of persons, in whom use of an amusement machine registered in past times is recorded, as the number of persons of the population from the pieces of information included in the accumulator database, and
the mobile ratio calculator calculates, assuming that the number of persons of the target group is the number of face images for each article recorded together with the pieces of the identification information identifying the currently-registered articles in the pieces of information included in the accumulator database, the ratio of the number of persons of the target group to the number of persons of the population as the mobile ratio of the person who uses or purchases the predetermined article with respect to the currently-registered article.

4. The information processing apparatus according to claim 3, further comprising a display for displaying proper selection of the model of the replaced amusement machine when the model of the amusement machine replaced with the model of the amusement machine, which is registered in past times and in which the use of the number of persons obtained as the population is recorded, is included as the model of the amusement machine in which the mobile ratio is higher than a predetermined order, the display displaying improper selection of the model of the replaced amusement machine when the model of the amusement machine replaced with the model of the amusement machine, which is registered in past times and in which the use of the number of persons obtained as the population is recorded, is not included as the model of the amusement machine in which the mobile ratio is higher than the predetermined order.

5. An information processing method for an information processing apparatus including:
storage for storing a face image as a face image of an accumulator in an accumulator database;
obtaining unit for obtaining a face image of a matching target person who uses or purchases one of a plurality of articles together with identification information identifying the article that is used or purchased by the matching target person;
matching unit for performing matching by calculating a degree of similarity between the face image of the matching target person, which is obtained by the obtaining unit, and the face image of the accumulator, which is accumulated in the storage;
similarity determination unit for determining whether the face image of the matching target person is the face image of the accumulator by comparing the degree of similarity, which is of a matching result of the matching unit, to a predetermined threshold;
recorder for recording detection of the accumulator, which is of the matching target person, in the accumulator database together with the identification information while correlating the detection of the accumulator with the face image of the accumulator, when the similarity determination unit determines that the face image of the matching target person is the face image of the accumulator;
population extractor for extracting the number of face images, each of which is recorded together with identification information identifying a predetermined article registered in past times, as the number of persons of a population from pieces of information included in the accumulator database; and
mobile ratio calculator for, assuming that the number of persons of a target group is the number of face images for each article recorded together with the pieces of identification information identifying the currently-registered articles in the pieces of information included in the accumulator database, calculating a ratio of the number of persons of the target group to the number of persons of the population as a mobile ratio of the person who uses or purchases the predetermined article with respect to the currently-registered article, the information processing method comprising:
an obtaining step of obtaining, in the obtaining unit, the face image of the matching target person who uses or purchases one of the plurality of articles together with the identification information identifying the article that is used or purchased by the matching target person;
a matching step of performing, in the matching unit, matching by calculating the degree of similarity between the face image of the matching target person, which is obtained in the obtaining step, and the face image of the accumulator, which is stored in the storage;
a similarity determination step of determining, in the similarity determination unit, whether the face image of the matching target person is the face image of the accumulator by comparing the degree of similarity, which is of the matching result of the processing in the matching step, to the predetermined threshold;
a recording step of recorder, detection of the accumulator, which is of the matching target person, in the accumulator database together with the identification information while correlating the detection of the accumulator with the face image of the accumulator, when the determination that the face image of the matching target person is the face image of the accumulator is made through the processing in the similarity determination step;
a population extraction step of extracting, in the population extractor, the number of face images, each of which is recorded together with the identification information identifying the predetermined article registered in past times, as the number of persons of the population from the pieces of information included in the accumulator database; and
a mobile ratio calculation step of, assuming that the number of persons of the target group is the number of face images for each article recorded together with the pieces of identification information identifying the currently-registered articles in the pieces of information included in the accumulator database, in the mobile ratio calculator, calculating the ratio of the number of persons of the target group to the number of persons of the population as the mobile ratio of the person who uses or purchases the predetermined article with respect to the currently-registered article.

6. A computer that causes a program to perform processing, the computer controlling an information process apparatus, the information processing apparatus including:

storage for storing a face image as a face image of an accumulator in an accumulator database;

a obtaining unit for obtaining a face image of a matching target person who uses or purchases one of a plurality of articles together with identification information identifying the article that is used or purchased by the matching target person;

a matching unit for performing matching by calculating a degree of similarity between the face image of the matching target person, which is obtained by the obtaining unit, and the face image of the accumulator, which is stored in the storage;

a similarity determination unit for determining whether the face image of the matching target person is the face image of the accumulator by comparing the degree of similarity, which is of a matching result of the matching unit, to a predetermined threshold;

a recorder for recording detection of the accumulator, which is of the matching target person, in the accumulator database together with the identification information while correlating the detection of the accumulator with the face image of the accumulator, when the similarity determination unit determines that the face image of the matching target person is the face image of the accumulator;

a population extractor for extracting the number of face images, each of which is recorded together with identification information identifying a predetermined article registered in past times, as the number of persons of a population from pieces of information included in the accumulator database; and a mobile ratio calculator for, assuming that the number of persons of a target group is the number of face images for each article recorded together with the pieces of identification information identifying the currently-registered articles in the pieces of information included in the accumulator database, calculating a ratio of the number of persons of the target group to the number of persons of the population as a mobile ratio of the person who uses or purchases the predetermined article with respect to the currently-registered article, the processing comprising:

an obtaining step of obtaining, in the obtaining unit, the face image of the matching target person who uses or purchases one of the plurality of articles together with the identification information identifying the article that is used or purchased by the matching target person;

a matching step of performing, in the matching unit, matching by calculating the degree of similarity between the face image of the matching target person, which is obtained in the obtaining step, and the face image of the accumulator, which is stored in the storage;

a similarity determination step of determining, in the similarity determination unit, whether the face image of the matching target person is the face image of the accumulator by comparing the degree of similarity, which is of the matching result of the processing in the matching step, to the predetermined threshold;

a recording step of recording, in the recorder, detection of the accumulator, which is of the matching target person, in the accumulator database together with the identification information while correlating the detection of the accumulator with the face image of the accumulator, when the determination that the face image of the matching target person is the face image of the accumulator is made through the processing in the similarity determination step;

a population extraction step of extracting, in the population extractor, the number of face images, each of which is recorded together with the identification information identifying the predetermined article registered in past times, as the number of persons of the population from the pieces of information included in the accumulator database; and a mobile ratio calculation step of, assuming that the number of persons of the target group is the number of face images for each article recorded together with the pieces of identification information identifying the currently-registered articles in the pieces of information included in the accumulator database, in the mobile ratio calculator, calculating the ratio of the number of persons of the target group to the number of persons of the population as the mobile ratio of the person who uses or purchases the predetermined article with respect to the currently-registered article.

* * * * *